United States Patent [19]

Menezes

[11] 4,340,916
[45] Jul. 20, 1982

[54] APPARATUS AND METHOD FOR DETECTING DISCONTINUITIES IN TIME CODE ADDRESSES

[75] Inventor: William A. Menezes, Mountain View, Calif.

[73] Assignee: Sony Corporation, Tokyo, Japan

[21] Appl. No.: 139,702

[22] Filed: Apr. 11, 1980

[51] Int. Cl.³ .................... G11B 15/00; G11B 27/12; G11B 27/32; H04N 5/795
[52] U.S. Cl. .................................. 360/72.2; 360/14; 360/33
[58] Field of Search .................. 360/14, 72.2, 74.4, 360/33, 69, 71; 364/900 MS File, 200 MS File

[56] References Cited

U.S. PATENT DOCUMENTS 4,167,028 9/1979 Tobey ............................... 360/72.2
4,167,759 9/1979 Tachi ............................... 360/72.2

OTHER PUBLICATIONS

Davies, "Versatile System for the Automation of Video-Tape Editing", J. of the SMPTE, vol. 79, 3/70, pp. 197-202.
Bates et al., "Time Code Error Correction Utilizing a Microprocessor", J. of the SMPTE, vol. 88, 10/79, pp. 712-715.

Primary Examiner—Raymond F. Cardillo, Jr.
Attorney, Agent, or Firm—Alvin Sinderbrand; Lewis H. Eslinger

[57] ABSTRACT

An apparatus and a method are provided for detecting discontinuities in a sequence of time code addresses recorded on a tape, such as a video tape, which also has control pulses recorded serially along its length to synchronize the motion of the tape relative to transducer heads which read and write information signals on the tape. The apparatus and method of this invention read the current time code address from the tape, count the control pulses read as the tape moves, establish a known relationship between the current time code address and the count of control pulses, so that the count represents a counted tape address, and compare the current time code address with the counted tape address for producing a non-compare signal in the event of a difference between these two compared values. A time code discontinuity signal is generated when a predetermined number of successive comparisons result in non-compare signals, indicating that the time code addresses read from the tape have not varied sequentially in a uniform relation to the control pulses. The value of the current time code address and the counted tape address at the time a discontinuity is detected can be used to define both the location and the magnitude of the discontinuity or to enable accurate calculation of the distance between two time code addresses each located on an opposite side of such a discontinuity.

35 Claims, 31 Drawing Figures

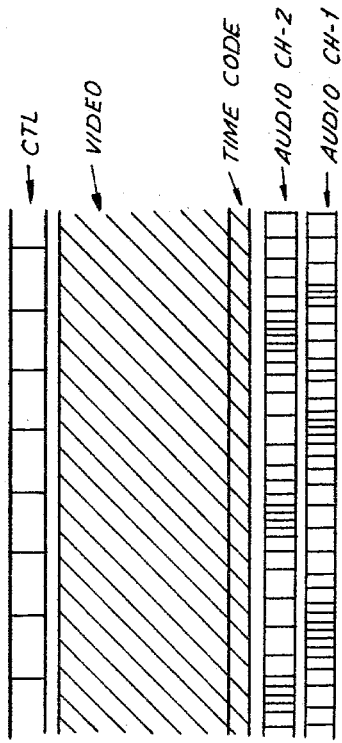
FIG. 1
PRIOR ART
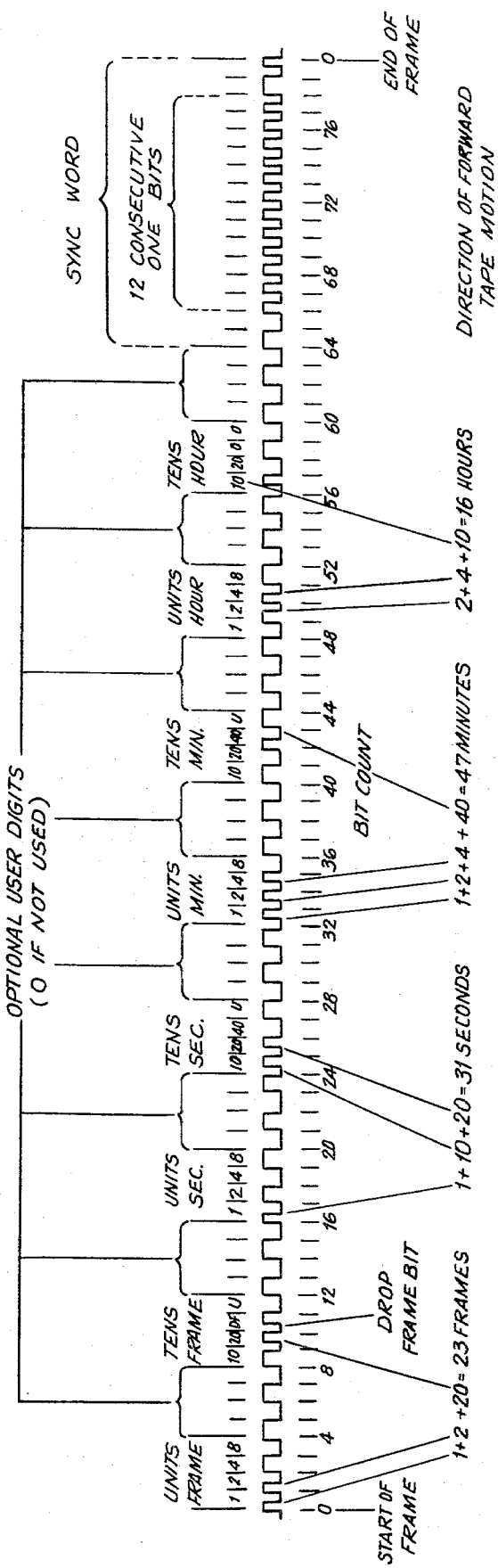
FIG. 2A
PRIOR ART
FIG. 2B
FIG. 2C

FIG. 6

| | Time Code Transfer Buffer | Tape Position Buffer | 4-Bit Address Value | 16 Phase Clock Value |
|---|---|---|---|---|
| Upper Half | USER DIGIT 8 | TENS HOUR | 15 | 7B |
| | USER DIGIT 7 | UNITS HOUR | 14 | 6B |
| | USER DIGIT 6 | TENS MIN | 13 | 5B |
| | USER DIGIT 5 | UNITS MIN | 12 | 4B |
| | USER DIGIT 4 | TENS SEC | 11 | 3B |
| | USER DIGIT 3 | UNITS SEC | 10 | 2B |
| | USER DIGIT 2 | TENS FRAME | 9 | 1B |
| | USER DIGIT 1 | UNITS FRAME | 8 | 0B |
| Lower Half | TENS HOUR | TENS HOUR | 7 | 7A |
| | UNITS HOUR | UNITS HOUR | 6 | 6A |
| | TENS MIN | TENS MIN | 5 | 5A |
| | UNITS MIN | UNITS MIN | 4 | 4A |
| | TENS SEC | TENS SEC | 3 | 3A |
| | UNITS SEC | UNITS SEC | 2 | 2A |
| | TENS FRAME | TENS FRAME | 1 | 1A |
| | UNITS FRAME | UNITS FRAME | 0 | 0A |

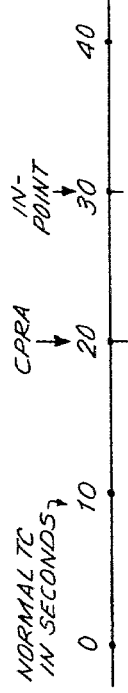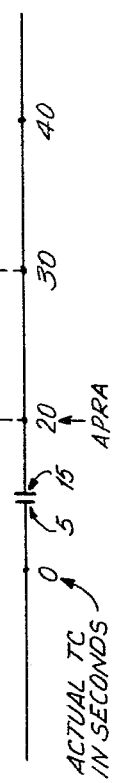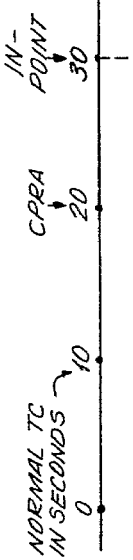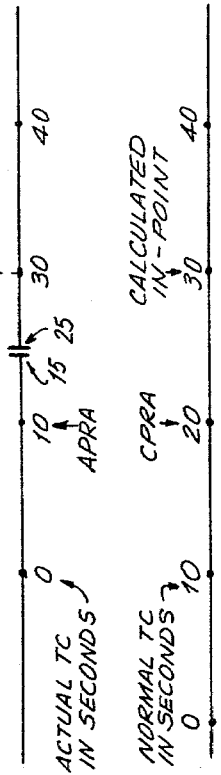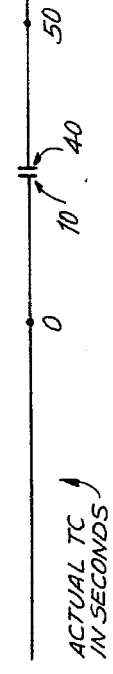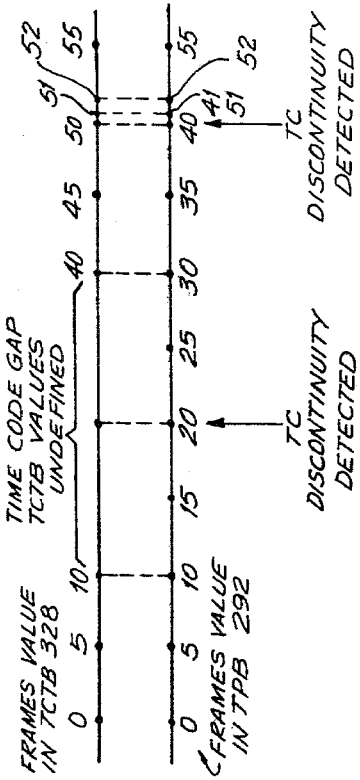
FIG.20A FIG.20B FIG.21A FIG.21B FIG.22A FIG.22B FIG.23A FIG.23B

APPARATUS AND METHOD FOR DETECTING DISCONTINUITIES IN TIME CODE ADDRESSES

BACKGROUND OF THE INVENTION

1. Field of the Invention

This invention relates generally to tape recorders and playback machines and, more particularly, is directed to detecting discontinuities in the time code addresses which are often recorded upon tapes, particularly video tapes, to identify the location of corresponding recorded information signals.

2. Description of the Prior Art

There are many functions performed with tape recorders, particularly video tape recorders (VTRs), in which it is desirable to provide means for accurately addressing a recording tape. Such addressing means makes it possible to easily and accurately determine the position or address of selected signals recorded upon a tape, and subsequently to quickly relocate such selected signals. In the field of broadcast and commercial video tape recording, in which sophisticated machinery has been developed for the control of VTRs, such addresses are used to automatically cause VTRs to cue to, and to initiate and terminate playback at specified tape positions. In video tape editing, such addresses are used to control the relatively complicated task of automatically causing a playback VTR and a record VTR to each locate at a pre-roll position a predetermined number of frames before the respective cut-in points selected separately for the playback and record tapes, to start up, to achieve synchronization with each other, and to simultaneously reach their respective cut-in points at which time the signal being reproduced from the tape in the playback VTR commences to be recorded on the tape in the record VTR. In addition, such addresses are used in video editing to determine when the edit ends, to preview the edit, to initiate slow motion or the operation of special effect generators and to cause various of the signals which can be recorded on a VTR, such as the video signal and one or more audio signals, to be cut in or out at different times.

One method which has been used in the past to address video tapes is the counting of the control pulses or control track signals which are recorded in a track along many video tapes for the purpose of synchronizing the motion of such tapes relative to the moving of rotary transducer heads which are used to record and playback video signals. Since each recording format records a predetermined number of such control pulses in conjunction with each frame, counting of the control pulses can provide an accurate relative address for each frame.

Unfortunately, determining tape addresses by counting control pulses has several major disadvantages. Most important is the fact that the counting of control pulses provides nothing more than a measure of the distance along the tape occupied by the counted control pulses and thus can only provide a tape address that is relative to a point on the tape from which the control pulses have been continuously counted. In order to obtain an absolute tape address, it is necessary to set the counter to zero or another predetermined value at a known location, usually near the start of the tape, and to continuously count control pulses from such known location. If, for any reason, the count value is lost, it is necessary to return to the known location and reset the counter. As the tape is moved over greater distances, and as it is stopped and started and moved alternately in forward and reverse directions, as tapes often are in the editing process, it becomes increasingly likely that an occasional control pulse will be miscounted, owing to drop out, random noise, or the passage of a control pulse past the control pulse reading head at a time when the speed of the tape is too low for the control pulse to be reliably read. Each such miscount adversely affects the accuracy of all subsequently counted tape addresses until the count is again reset.

Because of the foregoing problems associated with determining tape addresses by counting control pulses, professional or broadcast video tape equipment often provides means for recording and reading time code addresses on a video tape which separably identify each frame of the recorded video signal. Such time codes commonly identify each frame of the video signal in terms of an hour, a minute, a second, and a frame number.

At least two types of time codes are used, namely, longitudinal time codes in a track along a longitudinal margin of the tape and vertical interval time codes which are recorded on the same tracks as the video signal, but in the portion of such tracks corresponding to the vertical blanking periods or intervals. It is common for each of these two time codes to designate each frame of a video signal by a corresponding frame number which contains an hour, a minute, a second, and a frame value, each of which values is represented by two decimal digits. For example, the Society of Motion Picture and Television Engineers (SMPTE) time code for NTSC signals varies sequentially from a lowest possible frame number of 00 hours, 00 minutes, 00 seconds, and 00 frames to a maximum possible frame number of 23 hours, 59 minutes, 59 seconds, and 29 frames. In addition, the SMPTE NTSC time code provides room in the so-called "user digits and user bits" for a user to insert data of his choice, such as numbers designating the reel of tape, or the date, on which the recording is made. Such time code frame numbers are provided by electronic equipment known as time code generators, which are either part of, or connected to, a VTR upon which a corresponding video signal is recorded.

Time codes provide an accurate and reliable means for determining tape location. Unlike an address determined by the counting of control pulses, an address determined by the reading of time codes is affected only temporarily by an occasional inability to read a time code, it does not require resetting, and it is not subject to more than a brief loss if a register which is storing the address temporarily malfunctions. For these reasons, it is commmon for professional video tape equipment, particularly video tape editors, to control tape position and tape motion by reference to time code addresses.

Unfortunately, such time code controlled video tape equipment is likely to function erratically if the length of tape on which it operates does not have a continuous sequence of time code addresses, that is, a sequence of time code addresses in which the frame number associated with each successive frame of the recorded video signal is one greater than its predecessor. This is because time code controlled equipment performs those functions which involve moving tape a specified distance by adding or subtracting a number of frames corresponding to such a specified distance to or from a known frame number, so as to derive a calculated frame number, and then by moving the tape until that calculated frame number is read. If there is a discontinuity in the sequence of time code between that identifying the known frame number and the desired point which is the specified distance from it, it is most unlikely that the desired point will have thereon a time code identifying the calculated frame number. In such case, the time code requesting the calculated frame number may be read way before the desired point, way after the desired point, or perhaps not at all, even after searching to the end of the tape.

Similarly, if the desired point occurs on a portion of the tape on which time code addresses have not even been recorded, or from which they cannot be read, for example, because of drop out, the time code requesting the calculated frame number associated with the desired point will probably never be read, thereby causing the equipment to continue searching for the calculated time code all the way to the end of the tape.

Time code discontinuities of the type which cause the above-mentioned problems often occur in video recording. If, as is often done, a plurality of independent or separate video sequences or segments are recorded on a tape at different times, the time code addresses on the tape will be discontinuous between successive video segments, that is, the time code addresses at the end of one segment and at the beginning of the next segment, respectively, are likely to vary by an undefined amount and/or to have gaps between them in which no time codes are recorded. Similarly, time code discontinuities result when video sequences from different tapes are recorded one after the other on one tape in the process of assemble editing. Discontinuities also result when a video sequence having no accompanying time codes is recorded on a tape by assemble editing next to a video sequence having time codes.

In order to prevent the above difficulties caused by time code discontinuities, it is common to assemble recorded video tape signals onto a new tape using a so-called jam sync time code generator which provides a new sequence of time codes for the assembled tape, with the time code at the start of each successive video sequence edited onto the tape having a frame number one higher than that at the end of the previous sequence. Unfortunately, such jam sync generators are complicated and expensive, and, since they record the respective time code in place of any time codes which may have been recorded on the original tapes from which assembled video sequences come, they cause the time code information recorded on such original tapes to be lost. This is undesirable because the time code originally recorded with a video sequence, in addition to indicating the time of day that such a video sequence was recorded, can contain, in the user digits and bits, information which makes it possible to determine the tape reel, or the date, on which such a video signal was recorded.

A Japanese published unexamined patent application No. 16538/1978, filed July 29, 1976, and which was laid open to the public on Feb. 15, 1978, and has a common assignee with this application, discloses a time code address reader for use in video tape equipment and containing a dropout compensation circuit for time codes. In such time code address reader, current time codes are read from a tape into a time code register, means are provided for detecting when time codes can and cannot be read, and the value in the time code register is incremented or decremented in response to control pulses which are read during periods when time codes cannot be read as a result of drop out. Although such disclosure does provide means for maintaining an accurate time code address during brief periods in which the time code cannot be read, for example, as a result of drop out, it fails to provide means for detecting or providing information about a discontinuity in which two adjacent time code addresses have non sequential frame numbers, as results from the assembling, without a jam sync time code generator, of video sequences originally recorded at substantially different times.

OBJECTS AND SUMMARY OF THE INVENTION

Accordingly, it is an object of this invention to provide an apparatus and method for use with time code controlled tape equipment that avoids the above-described difficulties encountered with the prior art.

More particularly, it is an object of this invention to provide an apparatus and method for detecting discontinuities in time code addresses.

Another object is to provide an apparatus and method for detecting discontinuities in time code addresses and which also provides information as to the nature of the discontinuity.

Still another object is to provide an apparatus and method for detecting discontinuities in time code addresses which also provides information to determine the distance between time code addresses on opposite sides of a detected discontinuity.

In accordance with an aspect of this invention an apparatus is provided for detecting discontinuities in a sequence of time code addresses recorded on a tape for identifying respective information signals recorded on the tape and which are in addition to the control pulses recorded in a control track along the length of the tape for the purpose of synchronizing the motion of the tape relative to transducer means which read the information signals. The apparatus for detecting time code discontinuities includes time code reading means for reading a current time code address of the tape, control pulse reading means for reading the control pulses on the tape as the latter moves lengthwise, counting means for counting the control pulses that are read and thereby providing a count of control pulses, setting means for establishing a predetermined relationship between the current time code address read by said time code reading means and the count of control pulses, so that the count of control pulses represents the current time code address at the time the known relationship is established and so that the count of control pulses thereafter represents a counted tape address, and comparing means for comparing the current time code address with the counted tape address and producing a non-compare signal in the event of a difference between the two.

It is a further feature of the invention that the apparatus for detecting time code discontinuities further includes means for performing a subtraction between the current time code address and the counted tape address in response to the generation of a predetermined number of the non-compare signals, so as to derive a time code address shift which varies as a function of the result of the substraction. Such a time code address shift represents the extent to which the number of frames between two time addresses on opposite sides of a time code discontinuity greater or less than the difference between the time code frame numbers of those two addresses. According to a related aspect of the invention, this time code address shift is used to correct the value of time code addresses at which a desired tape function is to be performed to reflect the address shift caused by the detected time code discontinuity.

It is still a further feature of the invention that the apparatus embodying the latter includes means for storing the current time code address and counted tape address each time a time code discontinuity is detected, and for storing the relative order along the tape at which each such discontinuity is detected, so that a map of all the discontinuities on a specified portion of the tape can be made.

It is still another feature of the invention that the apparatus embodying the latter includes means for sensing when the tape has moved a specified distance without the proper reading of a time code address thereon so that the apparatus can respond in one way to discontinuities represented by adjacent non-sequential time code addresses, and in another way to discontinuities caused by an absence of recorded time code addresses.

The above, and other objects, features, and advantages of the invention, will be apparent in the following detailed description of illustrative embodiments of the invention which is to be read in connection with the accompanying drawings.

BRIEF DESCRIPTION OF THE DRAWINGS

FIG. 1 is a diagram of a length of video tape showing one of the formats commonly used in magnetically recording a plurality of signals upon such tape;

FIG. 2A is a diagram of the SMPTE time code;

FIGS. 2B and 2C are wave form diagrams illustrating the difference between a one-bit and a zero-bit in the SMPTE time code shown on FIG. 2A;

FIG. 6 is a memory map of two separate memory buffers shown in FIG. 5;

FIGS. 20A, 20B, 21A, 21B, 22A and 22B are diagrams of normal and discontinuous time code sequences to which reference will be made in explaining the steps shown on FIG. 18;

FIGS. 23A and 23B are a graphic representation of time code and tape position values produced by the time code/CTL board shown in FIGS. 3 and 5 during reading of a section of tape from which time codes are absent.

DETAILED DESCRIPTION OF PREFERRED EMBODIMENTS

Figure 3:
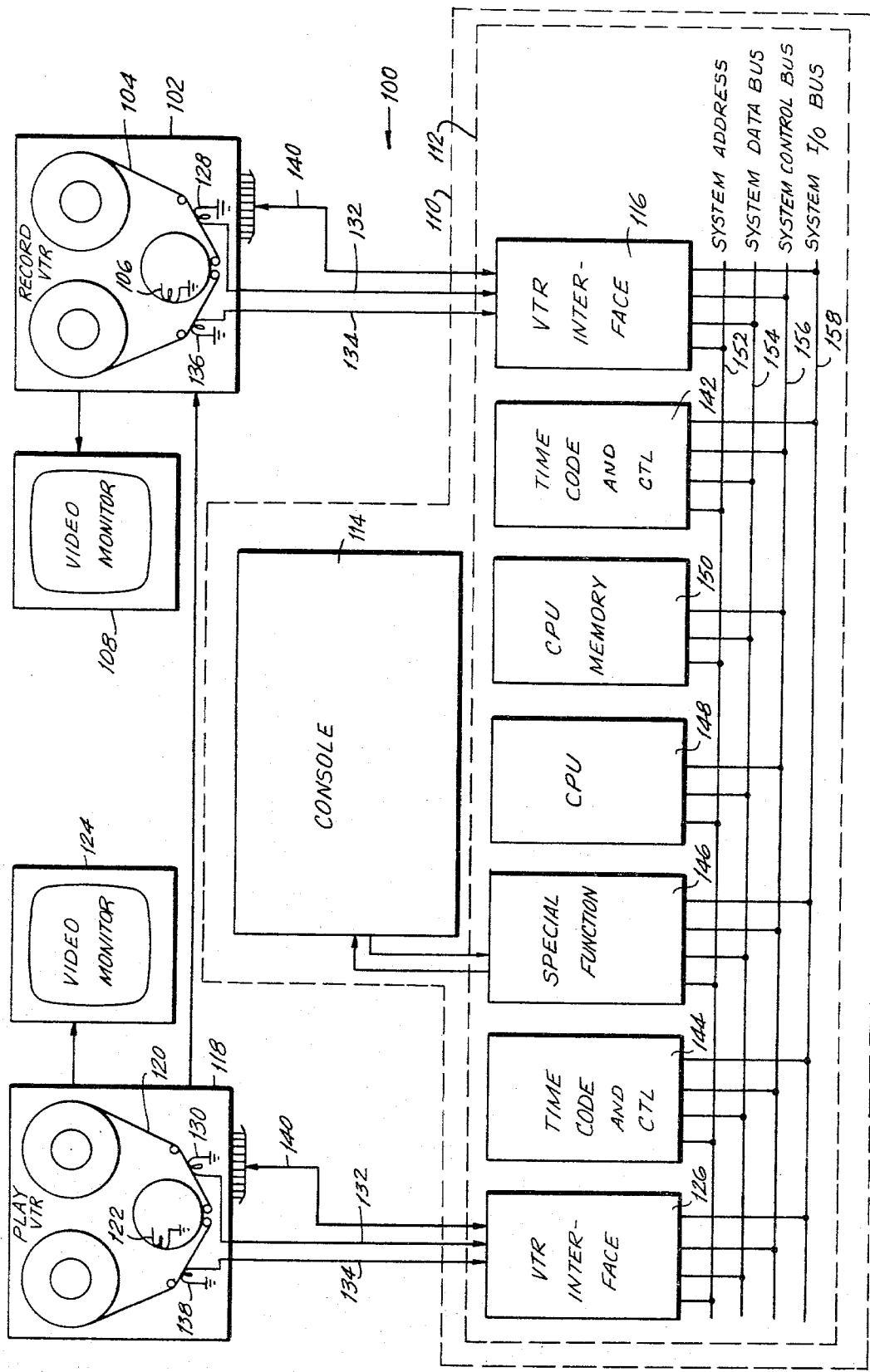
FIG. 3 is a diagram of a video tape editing system employing time code discontinuity detecting apparatus according to an embodiment of the present invention.

Referring initially to FIG. 3, a video tape editing system 100 is there shown which employs an apparatus according to the present invention for detecting discontinuities in time code address recorded on a video tape. The editing system 100 generally includes a record video tape recorder (VTR) 102, in which a record tape 104 is placed for the recording thereon of edited video information by means of a rotary record/playback head 106, and a record video monitor 108 for displaying video information read or played back by head 106 of record VTR 102.

Figure 4:
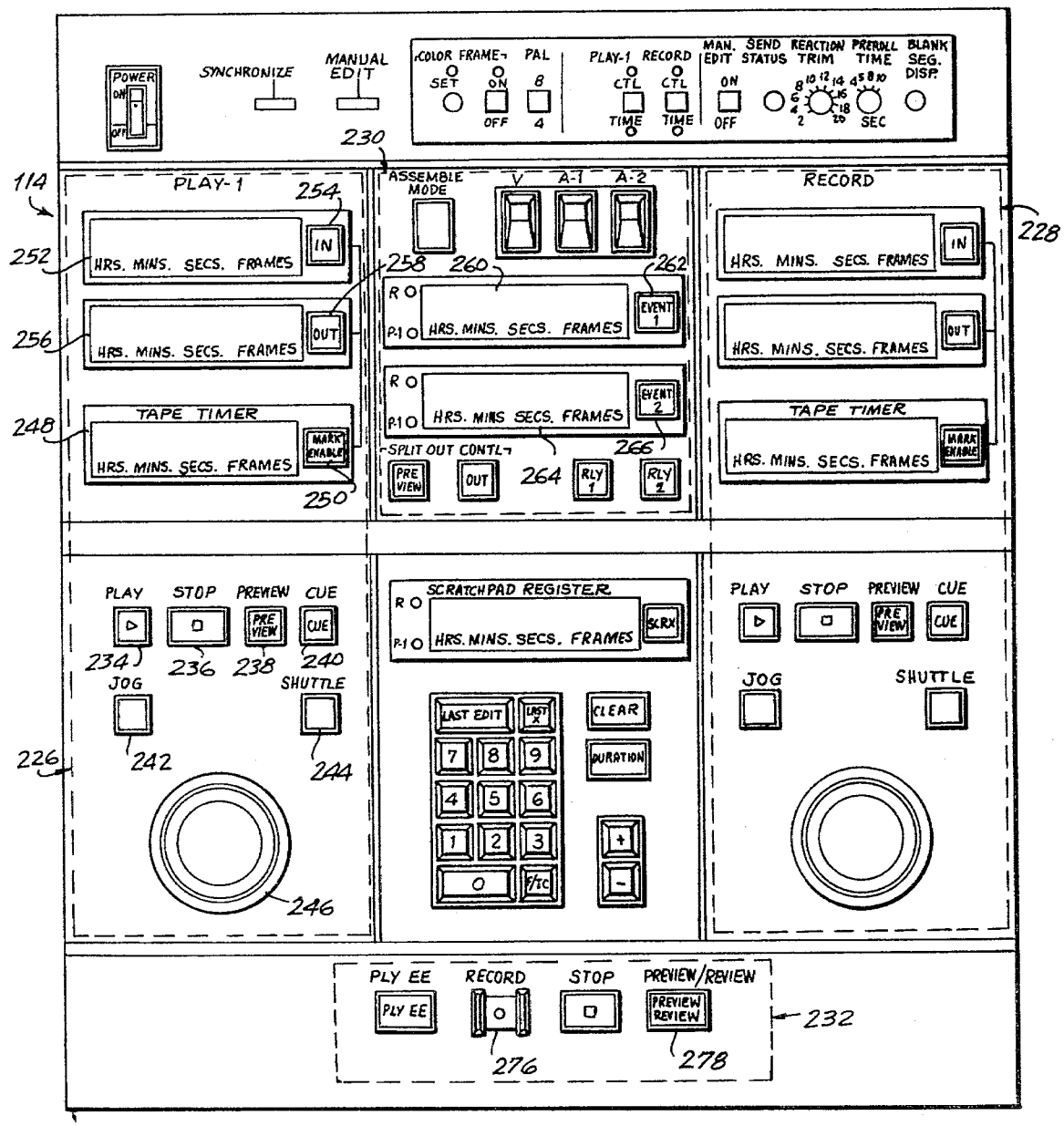
FIG. 4 is a front view of the console of the video tape editing system shown in FIG. 3.

The video tape editing system 100 also comprises an editor 110 which, in turn, is comprised of a card bay 112 and a console 114 which is shown in greater detail in FIG. 4. The card bay 112 contains a plurality of boards on which are disposed electronic circuitry for performing various functions. One of these boards is a record VTR interface board 116 which is connected to record VTR 102 and receives all signals coming from that VTR to the editor 110 and which transmits all commands from the editor 110 to VTR 102.

The editing system 100 further comprises a play VTR 118 containing a play tape 120 on which there is recorded video information which is to be reproduced by a playback head 122 for selective recording on the record tape 104, and a play video monitor 124 for displaying the video information being played back from tape 120. The card bay 112 of the editor 110 also contains a play VTR interface board 126 which is connected to the play VTR 118 and which similarly receives all information from that VTR and supplies all commands to it from editor 110.

The record and play VTRs 102 and 118, respectively, have fixed heads 128 and 130 connected to their respective VTR interface boards by means of respective control pulse (CTL) connections 132, which each communicate a pulse to the respective interface board 116 or 126 in the editor 110 each time the head 128 or 130 reads one of the control pulses which are recorded in a control track extending along the tape 104 or 120, as indicated at CTL on FIG. 1. Such control pulses CTL are used in helical scan VTRs, such as VTRs 102 and 118, for the purpose of synchronizing the longitudinal motion of the tape relative to the rotary movements of transducer heads 106 and 122, which are used in helical scan VTRs to read and write video information in the skewed or slant tracks which are also shown on the tape in FIG. 1. The VTRs 102 and 118 are also shown on FIG. 3 to be connected to the respective interface boards 116 and 126 by time code connections 134 which deliver to the respective interface boards within the editor 110 the signals read by time code heads 136 and 138 contained within the respective VTRs 102 and 118.

The longitudinal time code signals read by time code heads 136 and 138 are recorded serially along the video tapes 102 and 118, as is shown in FIG. 1. Although various longitudinal time codes can be used with various embodiments of the present invention, the VTRs shown in FIG. 3 are assumed to use the SMPTE time code shown in FIG. 2A, which contains one 80-bit longitudinal time code per video frame. Of the 80 bits of this time code, 16 comprise a sync word at the end of the time code for the purpose of enabling the circuitry which reads such time codes to determine the beginning and end of each time code and to determine the direction in which the time code is being read. The remaining 64 bits of the time code are divided into sixteen 4-bit digits, eight of such digits being used to give a time designation to each video frame. Such time designation specifies an hour, a minute, a second, and a frame value for each frame, these values each having two decimal digits. The remaining eight 4-bit digits in the time code can be used as desired, for example, for labeling the number of the reel of tape upon which a given video signal is recorded.

Each of the VTRs 102 and 118 is also connected to its respective interface board 116 or 126 within editor 110 by means of a respective VTR control and status connection 140, by which the respective interface board can determine such information from the VTR as its direction of motion, and further by which the interface board can set the corresponding VTR to a play mode, a record mode, a forward or reverse direction of motion, a still motion mode of playback, or a stop mode.

The card bay 112 of the editor 110 also includes two time code/CTL boards 142 and 144 associated with the VTRs 102 and 118, respectively. These boards 142 and 144 perform the functions of reading the time code addresses, and counting the control pulses recorded on the tapes in the respective VTRs.

The card bay 112 further includes a special function board 146 providing a console interface which receives parallel information from the time code/CTL boards 142 and 144 and from a central processing unit (CPU) board 148, and communicates such information to the console 114, and which receives information from the console 114 and communicates it to the CPU board 148. The special function board 146 also includes an input/output (I/O) decoder which, as is known in the art of computer electronics, is a device capable of receiving a parallel input or output address from a CPU and of decoding that command so as to select and supply a specified signal level to a corresponding one of a plurality of input or output signal lines. In the card bay 112, these input or output signal lines are used to control specific devices on the VTR interface boards 116 and 126 and the time code/CTL boards 142 and 144. The special function board 146 also has a direct memory access (DMA) controller, which will be described in greater detail below, and an interrupt handler which, as is known in the art of computer electronics is a device capable of interrupting a central processing unit so that it stops performing whatever portion of a program it was executing and starts to execute a portion of a program determined by the signal supplied to the interrupt handler.

The central processing unit on board 148 of editor 110 is a programmable computing device, such as, an 8080 microprocessor, made by Intel Corporation of 3065 Bowers Ave., Santa Clara, Calif., and which controls the apparatus of the editor 110. The card bay 112 also contains a CPU memory board 150 which includes read-only memory containing the program to be executed by the CPU 148 and also read and write memory, known as random access memory (RAM), which the CPU can address for the purpose of storing and reading information.

In addition to the above-mentioned boards 116, 126, 142, 144, 146, 148 and 150, the card bay 112 contains a system address bus 152, a system data bus 154, a system control bus 156, and a system I/O bus 158. The system address bus 152 provides means by which the CPU can address the memory on the CPU memory board 150 and by which address information can be supplied to the other boards in the card bay. Bus 152 also allows the time code/CTL boards 142 and 144 to address information into the CPU memory board 150 during the desired memory access (DMA) procedure described below. The system data bus 154 allows the CPU to read and write data in the other boards in the card bay 112, and it is also used to transmit data into the CPU memory board 150 during DMA. The system I/O bus 158 connects the output of the I/O decoder contained within special function board 146 to the time code/CTL boards 142 and 144 and to the VTR interface boards 116 and 126.

Referring now to FIG. 4, it will be seen that the console 114 for use with the video editing system 100 is divided into a play control section 226, a record control section 228, a split edit control section 230 and a master control section 232. The play control section 226 includes a play push button 234, a stop push button 236, a preview push button 238, a cue push button 240, a jog push button 242, a shuttle push button 244 and a control knob 246. The play push button 234 is actuated to cause the play VTR to operate in the playback mode. The stop push button 236 is actuable to stop the motion of the play VTR. The preview push button 238 is actuable to cause the play VTR to preview a segment of the video information which has been marked as described below. In the case of the play control section 226, actuation of preview button 238 causes the marked video segment on play tape 120 to be shown on monitor 124 preceded and followed by a blank video display. The cue push button 240 is used to cause the play VTR to locate the tape therein at a frame having a time code address earlier marked by actuation of one of the marking push buttons, and to repeatedly display that frame in still motion, generally as described below and in greater detail in copending application Ser. No. 126018, filed Sept. 29, 1980, now U.S. Pat. No. 4,318,050. Cueing of the tape is effected by first actuating the desired marking push button and then actuating the cue button 240. When jog button 242 is pushed, the rotatable control knob 246 on the play control section 226 can be manipulated to cause the tape on the play VTR 118 to be moved a distance proportional to the angular distance through which the knob 246 is turned. This enables an operator to view the video information on a tape while that tape is made to move at a very slow speed by slowly turning the knob 246. It also gives an operator the ability to view the video information on a tape while that tape is at a standstill merely by allowing or causing the knob 246 to stop its rotation. When shuttle push button 244 is pushed, the operator can view the video information recorded upon tape 120 in any of a wide range of speeds, varying from considerably above normal playback speed to considerably below normal playback speed, as is determined by the angular position to which its respective control knob 146 is displaced.

The play control section 226 also contains a tape timer register 248, a mark enable push button 250 placed at the right hand end of the tape timer register 248, and in-point register 252, an in-point push button 254 placed at the right hand end of the in-point register 252, an out-point register 256 and an out-point push button 258 placed at the right hand end of the out-point register 256.

The tape timer register 248 displays an 8-digit time code address which contains two hour-digits, two minute-digits, two second-digits and two frame-digits. The time code address displayed by tape timer register 248 is the time code address value stored on a tape position buffer in the time code/CTL board 144 associated with the play VTR 118. This time code address value will normally reflect the current time code address of the tape 120 in play VTR 118.

Actuation of the mark enable button 250 establishes the mark enable mode of the CPU on the CPU board 148. In this mode, if either the in-point push button 254 or the out-point push button 258 is actuated, the value currently in the tape timer register 248 is transferred to the register 252 or 256 to the left of the push button 254 or 258 which has been actuated. Thus, with the CPU in its mark enable mode, push buttons 254 and 258 can be selectively actuated to mark the in-and out-points on tape 120 desired for a video edit. For this reason the in-point and out-point push buttons 254 and 248 can be considered marking push buttons.

The record control section 228 contains controls, in the form of push buttons and registers, corresponding to those described above with reference to play control section 226 and the controls in record control section 228 operate in the same manner and are identified by the same reference numerals as the corresponding controls of control section 226, except for the fact that they all relate to record VTR 102, rather than play VTR 118, and except for the further fact that, in the case of the record control section 228, preview button 238 causes the video information both before and after a marked segment on record tape 104 to be displayed on monitor 108 separated by a blank display corresponding to the marked segment itself and, in which, during an actual edit, video information played back from tape 120 on the play VTR 118 will be recorded on tape 104.

The split edit control section 230 contains an event (1) register 260, an event (1) push button 262 to the right of the event (1) register 260, an event (2) register 264, and an event (2) push button 266 to the right of the event (2) register 264. The event (1) and event (2) registers 260 and 264 are both eight-digit display registers each capable of displaying a time code address. When either the play control section 226 or the record control section 228 is in the mark enable mode, the event (1) or event (2) push button 262 or 266 can be actuated for causing the current value of the tape timer register 248 in the control section which is in the mark enable mode to be transferred to the event register 260 or 264 which has had its corresponding push button actuated. When this is done, one or the other of two lamps disposed to the left of the respective event register and labeled P1 and R will light for indicating whether the address in that event register is one which has come from the play tape timer register or the record tape timer register, respectively. The major use of the event registers 260 and 264 is in so-called split edits in which the in-points and/or out-points for the video signal, the audio channel 1 and the audio channel 2, shown in FIG. 1, respectively, may be different. Copending application Ser. No. 139,448, filed Apr. 11, 1980, having a common assignee with this application explains in much greater detail the manner of performing split-in and split-out edits by use of the control section 230.

The master control section 232 is shown to include a record push button 276 and a preview/review push button 278. The preview/review push button 278 is actuated to cause the apparatus to preview an edit which has been set up by the selection of in-points on both the play and record in-point registers 252 and by the selection of an out-point on either the play out-point or the record out-point register 256. If push button 278 is actuated at the same time that the record button 276 is actuated, the editing system will actually perform the selected edit.

The editing system 100 includes apparatus according to the present invention for detecting dicontinuities in the sequence of time code addresses recorded on record tape 104 and play tape 120. This apparatus includes a time code reader 80 located on each of the time code/CTL boards 142 and 144 for receiving the time code signals read by the time code head 136 or 138 of the respective VTR. The apparatus for detecting time code discontinuities also includes control pulse receiving means which include a CTL delay and synchronizing circuit 280, shown in FIG. 5 and FIG. 10, for receiving control pulses which are read by the control pulse head 128 or 130 of the respective VTR as the tape in that VTR moves in the direction of its length.

Figure 5:
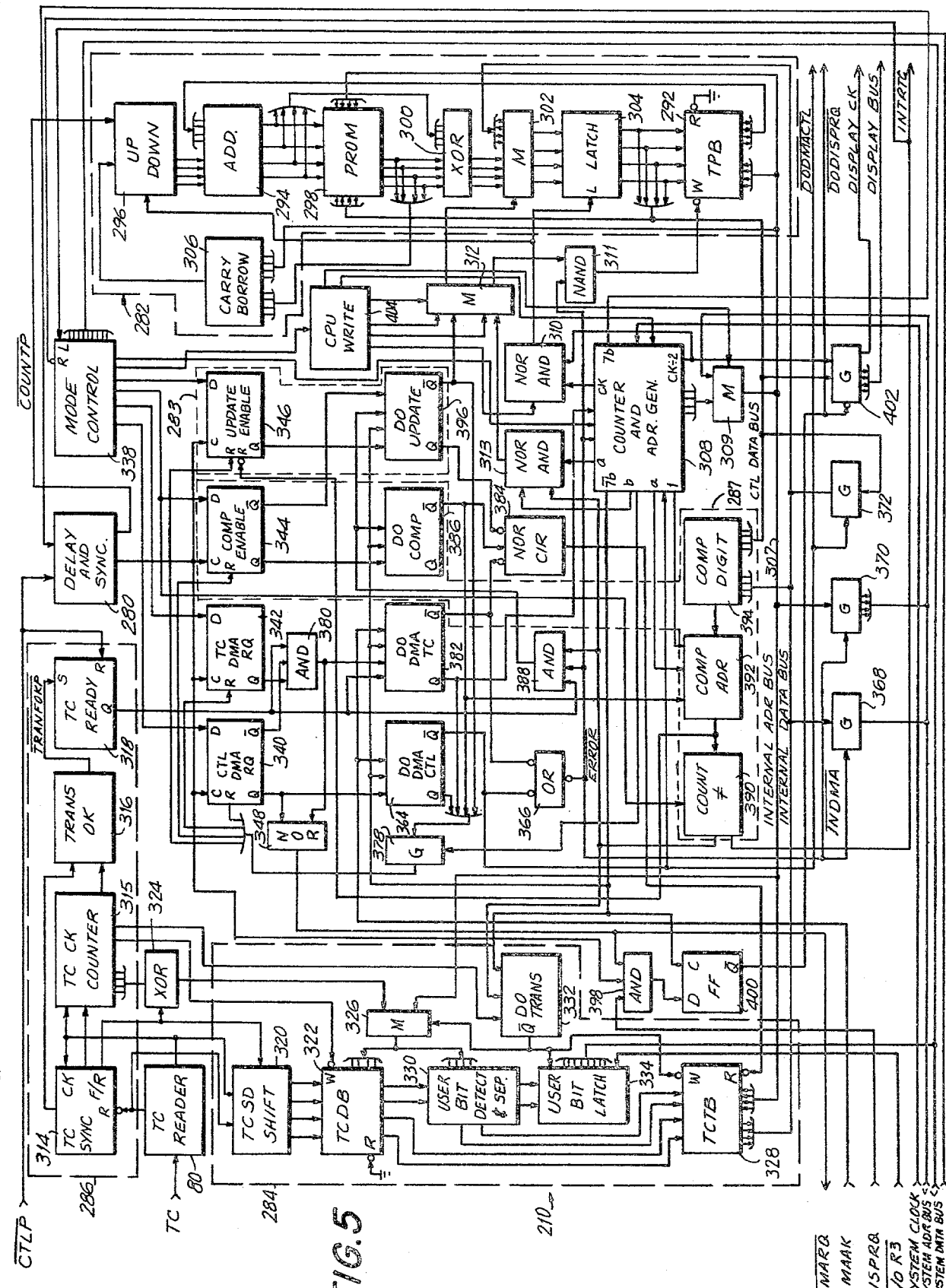
FIG. 5 is a detailed block diagram of a time code/CTL board included in the video tape editing system of FIG. 3.

In addition to the above, the apparatus for detecting time code discontinuities includes means, in the form of a tape position counter 282 shown on FIG. 5, for counting the control pulses received by the CTL delay and synchronizing circuit 280 and thereby providing a count of such received control pulses; a setting means including update control circuitry 283 for establishing a known relationship between the current time code address read by the time code reader 80 and the count of the tape position counter 282 so that the count of that tape position counter thereafter represents a counted tape address; and comparing means, including compare circuitry 287, for comparing the current time code address read by the time code reader 80 with the counted tape address produced by the tape position counter 282, and for producing a non-compare signal in the event of a difference between those two values.

Figure 13:
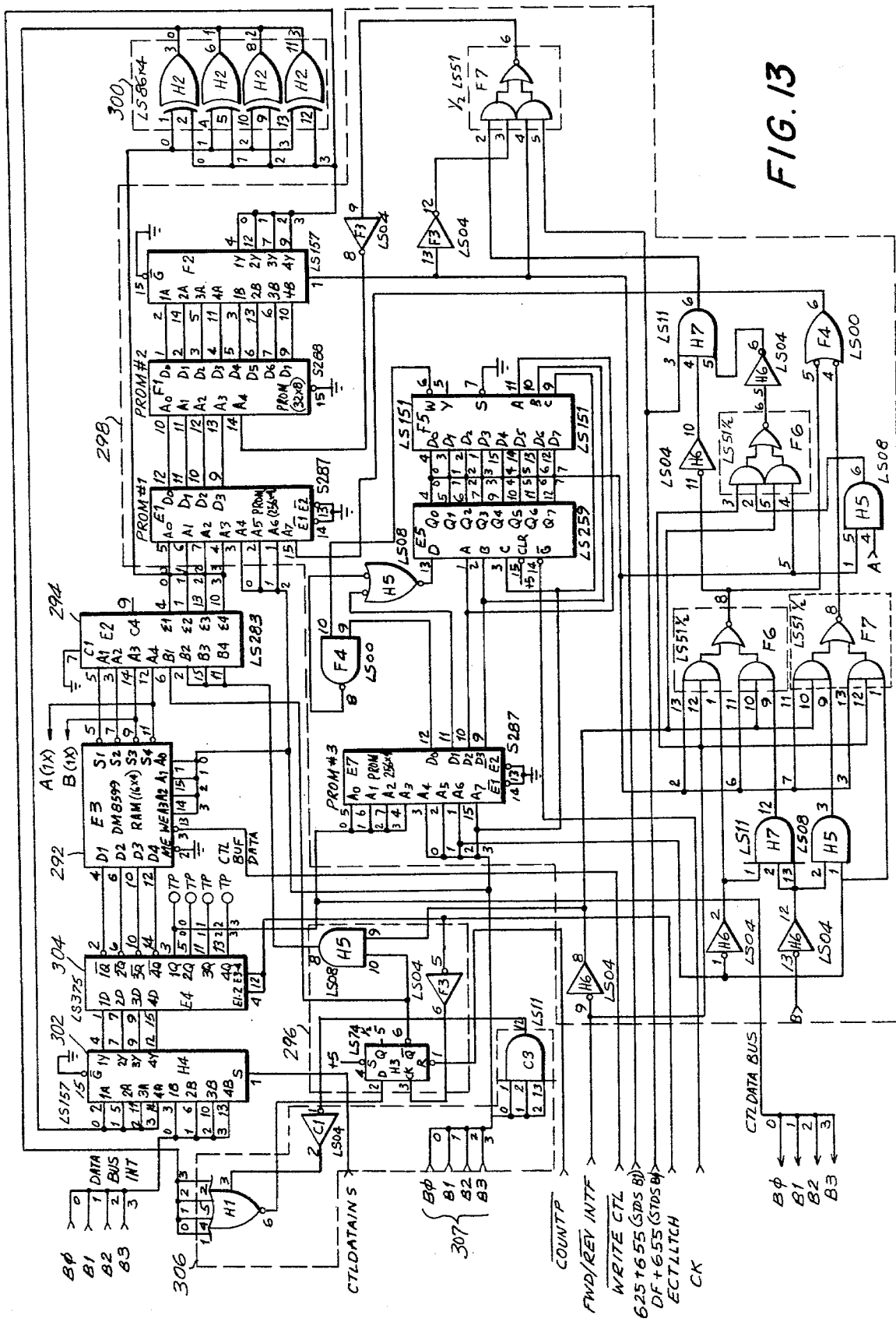
FIG. 13 is a schematic representation of a PROM decoder used with the present invention.

The tape position counter 282 is shown on FIG. 5 to include a tape position buffer 292, which is shown in greater detail on FIG. 13 and which is capable of storing sixteen 4-bit binary coded decimal digits. The 4-bit output of tape position buffer 292 is connected to one input of an adding circuit 294. The other input of this adding circuit 294 is the output of an up-down input circuit 296 which, as is shown in FIG. 13, comprises a flip-flop H3, an AND gate H5 and an inverter F3. The 4-bit output of adder 294 is supplied as one input to a programmable read-only memory (PROM) decoder 298 which, as can be seen from FIG. 13, comprises three programmable read-only memory (PROM) circuits, E1, E7, and F1, a multiplexer F2, a decoder E5, an encoder F5, and a plurality of inverters and logic gates. The 4-bit output of PROM decoder 298 is supplied as one input to an EXCLUSIVE OR circuit 300 which is shown in FIG. 13 to comprise four EXCLUSIVE OR gates H2. The other input to this EXCLUSIVE OR circuit 300 is the 4-bit output of adder circuit 294. The output of EXCLUSIVE OR circuit 300 is supplied as one input to a multiplexer 302 which is shown as the multiplexer circuit H4 in FIG. 13. Under normal conditions, multiplexer 302 provides the output of EXCLUSIVE OR circuit 300 to the 4-bit input of a latch 304, which is shown as the latch circuit E4 in FIG. 13. The 4-bit output of latch 304 is provided as an input to tape position buffer 292. In addition, tape position counter 282 includes a carry/borrow circuit 306 which, as is shown in FIG. 13, comprises a NOR gate H1 and an inverter C1 and which receives the 4-bit output from PROM decoder 298 and provides an output to up-down input circuit 296. The 4-bit addressing input of tape position buffer 292 is connected to an internal address bus 307 of time code/CTL board 210. This internal address bus 307 is normally separate from the system address bus 152 of card bay 112.

Figure 11:
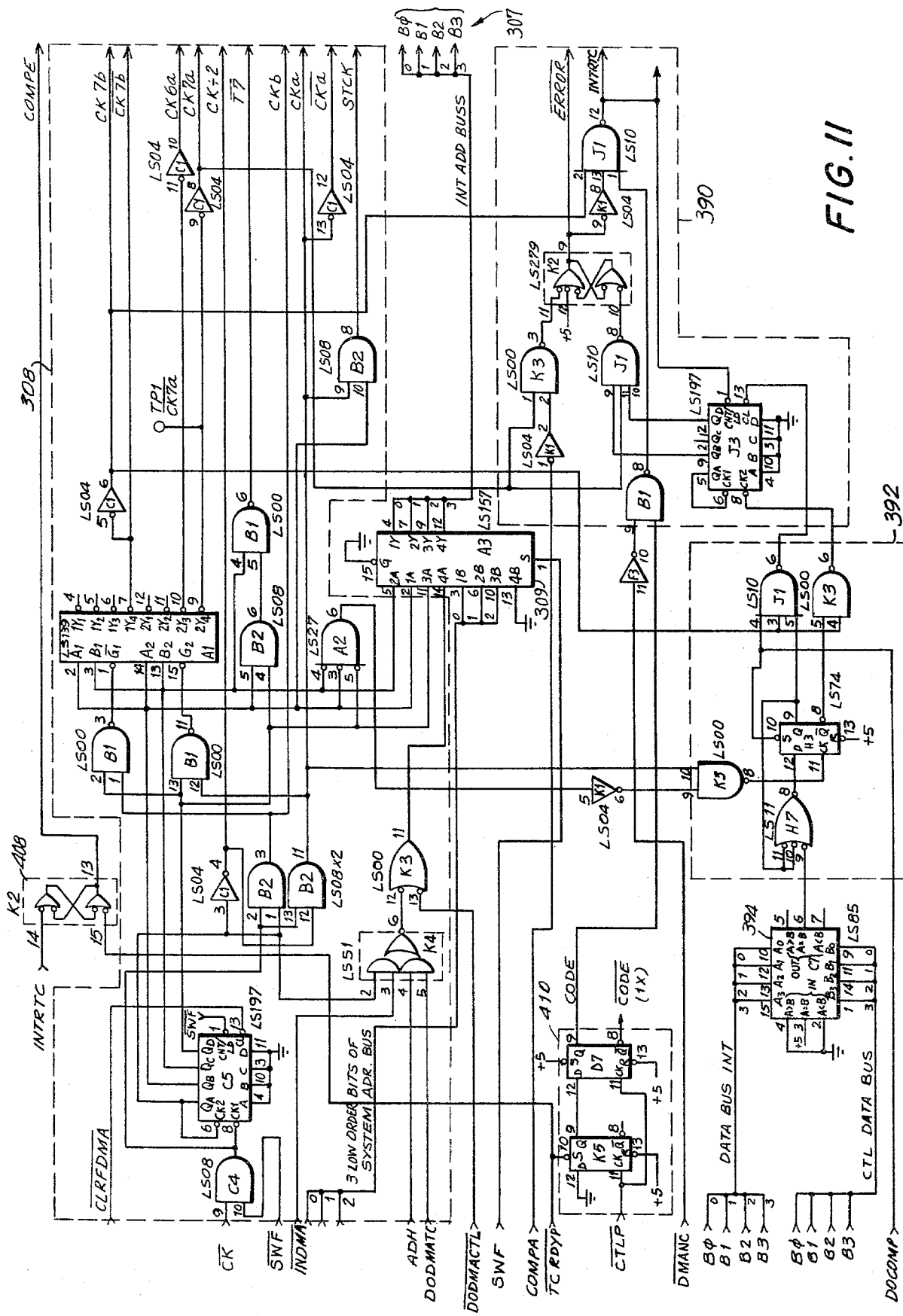
FIG. 11 is a schematic diagram of one embodiment of an address generator, an address comparator and a counter used with the present invention.

The circuitry of FIG. 5 also includes a system clock counter and address generator 308 which, as is shown in FIG. 11, comprises a 4-bit counter C5 for counting system clock pulses CK from the CPU board 148, a decoder A1 for generating signals at certain ones of the 16 possible count values of the counter C5, a NAND gate K3, two NORRED AND gates K4 which determine the value of the high order bit of a 4-bit address generated by the counter and address generator 308, and a plurality of other logic gates. The system clock signal has a high frequency, approximately 2 MHz, and it is counted by the counter and address generator 308 which, in response to the clock signal, generates a 16-phase clock signal which has its successive phases generated at the frequency of the system clock. The 16-phase clock signal repeatedly varies according to the following sequence: 0A, 0B, 1A, 1B, 2A, 2B, ... 7A, 7B.

It takes sixteen cycles of the system clock for this sequence of sixteen clock values to repeat itself. The counter and address generator 308 also generates a 4-bit counted address signal. As is well known in the art of digital electronics, a 4-bit binary signal can assume any one of sixteen possible values from 0 to 15. The counted address generated by the counter and address generator 308 has a different value for each of the sixteen clock phases of the 16-phase clock signal. The high order bit of this counted address varies at twice the frequency of the low order bit, so that the sequence of counted address values varies in the following sequence: 0,8,1,9,2,10, ... 7,15.

Figure 7:
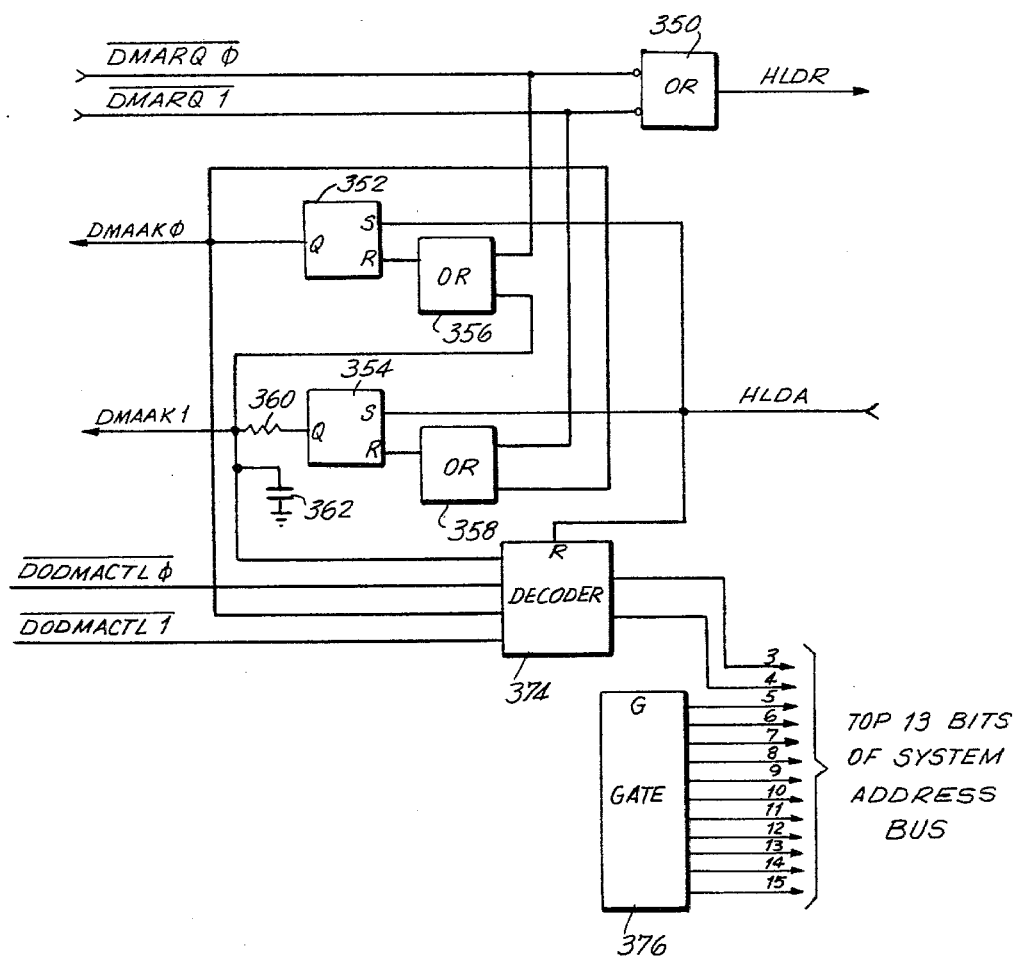
FIG. 7 is a simplified block diagram of a DMA controller included in a special function board shown in FIG. 3.
Figure 8:
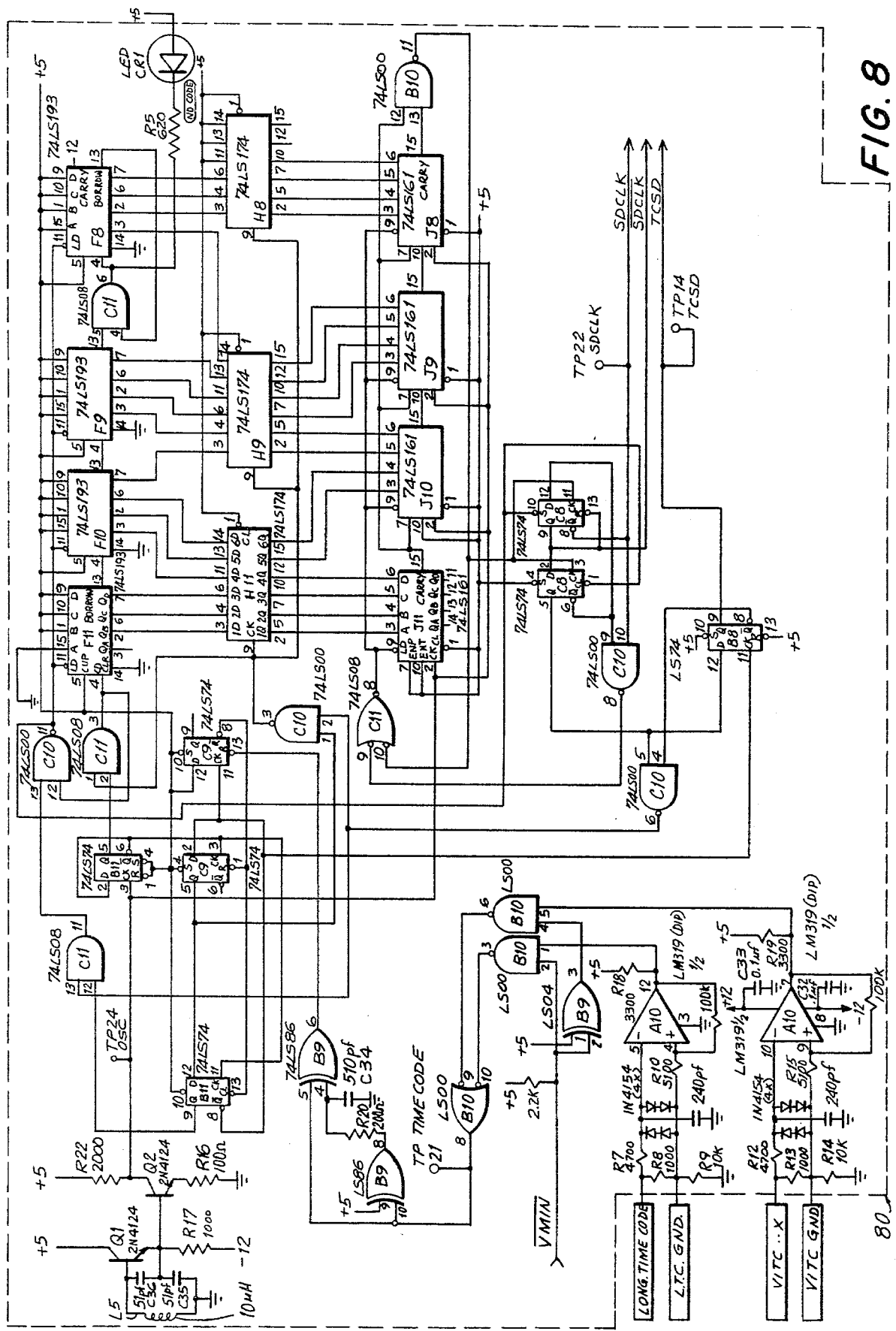
FIG. 8 is a schematic diagram of one embodiment of a time code reader which can be used with the present invention.

Under normal circumstances, the counted address is passed from the address output of generator 308 through a multiplexer 309 (FIG. 11) to internal address bus 307, by which it is supplied to the addressing input of tape position buffer 292 (FIG. 7). As shown in FIG. 6, the sixteen addresses for storing 4-bit digits contained within tape position buffer 292 can be divided into two halves, each of which is capable of storing an 8-digit time code. The lower half ranges from the address 0 to the address 7, and the upper half ranges from the address 8 to the address 15. In response to the counted addresses generated by generator 308 at the clock phase 0A, the units frame digit at the address 0 in the lower half of buffer 292 will be read, followed by the reading, at the clock phase 0B, of the units frame digit at the address 8 in the upper half of buffer 292. At the next clock phase 1A, the tens frame digit at the address 1 in the lower half of buffer 292 is addressed, followed, at the next clock phase 1B, by the addressing of the tens frame digit at the address 9 in the upper half of buffer 292. This sequence of alternately reading digits from the lower and upper halves of tape position buffer 292 is continued until all of the 8 digits in each of the lower and upper halves of the tape position buffer 292 have been read, and, during normal operation of the time code/CTL board 142 or 144, the reading sequence is continually repeated under the influence of the counted address signal.

Each digit which is addressed and read from tape position buffer 292 is supplied as one input to adding circuit 294. When a control pulse is read from the VTR 102 or 118 associated with a given time code/CTL board 142 or 144, a pulse is supplied to the CTL delay and synchronizing circuit 280 on that board (FIG. 7). This delay and synchronizing circuit 280 is also supplied with a signal from the counter and address generator 308 at the clock phase 7B at the end of the 16-phase clock count. At the end of the 16-phase clock count following the reading of a control pulse, the $\overline{\text{CTL delay}}$ and synchronizing circuit 280 generates a $\overline{\text{COUNT P}}$ pulse which is supplied as one input to up-down input circuit 296. Another input to circuit 296 is a forward-/reverse signal which comes through the respective VTR interface board 116 or 126 from the VTR 102 or 118 in which the control pulse has been read, and which indicates whether the tape in that VTR is moving in a forward or reverse direction. If the VTR 102 or 118 is moving in a forward direction, up-down input circuit 296 of the respective board 142 or 144 will supply a binary input of 0001 to adder 294. This is the binary equivalent of the decimal number 1, and it causes the next digit read from tape position buffer 292 and supplied to adding circuit 294 to have its value increased by one. This digit will be the units frame digit from the lower half of buffer 292, since that is the digit read during the clock phase 0A which follows the clock phase 7B during which the $\overline{\text{COUNT P}}$ pulse is generated. Thus, when VTR 22 or 32 is moving in a forward direction, the tape position counter 282 of the respective board 210 will cause a value of one to be added by adder 294 to the units frame digit of the lower half of its tape position buffer 292. If the VTR is moving in the reverse direction, the up-down input circuit 296 will cause a binary value 1111, instead of 0001, to be supplied to the adder 294. As is known by those skilled in the art of digital electronics, adding a value of 1111 to a 4-bit binary number is equivalent to substracting the number 1 from that 4-bit binary number, providing that the 5th bit resulting from such an addition is disregarded. Thus, when VTR 102 or 118 reads a control pulse while traveling in the reverse direction, its associated tape position counter 282 will decrement the value contained in the units frame digit of the lower half of the tape position buffer 292 by 1.

As earlier noted, the output of adder 294 is supplied as one of the inputs to EXCLUSIVE OR circuit 300 and also as one of the inputs to PROM decoder 298. The PROM decoder 298 also receives inputs from internal address bus 307 and the output of latch 304. As can be seen in FIG. 13, the PROM decoder 298 contains a plurality of logic gates and programmable read-only memory (PROM) circuits which, in combination, as shown, provide a predetermined 4-bit output to EXCLUSIVE OR circuit 300 in response to each of the possible sets of inputs which can be supplied to PROM decoder 298. The input from the internal address bus 307 tells the PROM decoder 298 which of the eight digits of the time code is being supplied to it from adder circuit 294. Other inputs to PROM decoder 298 (which are not shown in FIG. 7), inform the PROM decoder which of various possible formats is characteristic of the time code currently being read. The video editing system 100 can be operated with at least four different time code formats: to wit, the NTSC 525 lines per frame, black and white time code format; the NTSC 525 lines per frame, color or drop frame time code format; the 625 lines per frame, 50 fields per second European time code format; and the 655 lines per frame, 48 fields per second time code format which is used in video tapes to be converted to motion picture films. In each of these different time code formats the sequence of time codes is different.

In the black and white NTSC format, the time codes vary sequentially from a lowest possible frame number of 00 hours, 00 minutes, 00 seconds and 00 frames, to a highest possible frame number of 23 hours, 59 minutes, 59 seconds and 29 frames. In this time code format, any one of the digits will be set to zero and the next highest digit, if one exists, will be increased by 1 any time an attempt is made to increase the value of the units frame digit beyond the value of 9, the tens frame digit beyond the value of 2, the units second digit beyond the value of 9, the tens second digit beyond the value of 5, the units minute digit beyond a value of 9, the tens minute digit beyond a value of 5, the units hour digit beyond a value of 3, and the tens hour digit beyond a value of 2.

The NTSC color or drop frame time code format is identical to that of the NTSC black and white time code format except for the fact that two frame numbers are skipped at the beginning of every minute other than the tenth minute. Accordingly, a frame number having a second value of 59 and a frame value of 29 is immediately followed by a frame number having a minute value which is one greater and a second value equal to zero and a frame value equal to 2, unless incrementing the minute value would cause that minute value to be an integral multiple of ten, in which case the second and frame values of the subsequent frame number both take a value of 00.

The European and film time code formats are similar to the NTSC black and white formats except for the fact that the European format causes a carry to take place between the frames digit and the seconds digit any time an attempt is made to increase the frame value beyond the value 24, and the film format causes such a carry to take place any time an attempt is made to increase the frames value beyond a value of 23 frames.

The PROM decoder 298 is basically a read only memory device which, when supplied with a predetermined group of address bits, produces a predetermined group of data bits. More particularly, the bits on the internal address bus 307, the bits which indicate the time code format being read, a bit which indicates whether the tape is being read in a forward or a reverse direction and the bits produced at the output of adder 294, all combine to provide an address word which causes the PROM decoder 298 to produce a corresponding predetermined 4-bit output to EXCLUSIVE OR circuit 300. This 4-bit output of PROM decoder 298 is always zero unless the value produced by adder 294 constitutes an improper value in the particular time code format being read, and thus indicates the need for a carry or a borrow, depending upon the direction of tape motion in the corresponding VTR. For example, if the units frame digit read from the lower half of tape position buffer 292 at the clock phase 0A immediately following generation of a $\overline{\text{COUNT P}}$ pulse during forward motion of the respective VTR has a decimal value of 9, the resulting output of the adding circuit 294 has a decimal value of 10. This is an illegal or improper value for any digit of any time code, and it requires a carry operation. In response to this input PROM decoder 298 will generate a 4-bit output which, when supplied to EXCLUSIVE OR circuit 300, will cause the binary-coded-decimal value supplied to circuit 300 to change from 10 to zero. The EXCLUSIVE OR circuit 300 reverses the value, from 0 to 1 or from 1 to 0, of each of the 4 bits, 0–3, supplied to it from the adder 294 when corresponding bit, 0–3, supplied to it from PROM decoder 298 has a 1 value. For example, to change the binary-coded-decimal value of 10, which is 1010, to the binary-coded-decimal value of zero, which is 0000, PROM decoder 298 should supply a similar binary value of 1010 to EXCLUSIVE OR circuit 300.

Whenever, PROM decoder 298 supplies an output which is other than zero, carry/borrow circuit 306, which includes a NOR gate H1 (FIG. 13), generates an input to up-down input circuit 296 which causes that circuit to add a 1 to the next digit which is supplied to adder 294 when the associated VTR is moving in a forward direction and to subtract 1 from that next digit when the associated VTR is moving in the reverse direction, so as to cause, respectively, a carry or a borrow to take place.

The output of EXCLUSIVE OR gate 300 is supplied through multiplexer 302 to the input of latch circuit 304. The counter and address generator 308 supplies a latch pulse to latch circuit 304, which causes it to latch, or store, the 4-bit value supplied to it from multiplexer 302 during each of the A clock phases, that is, during each of the clock phases 0A, 1A, 2A, . . . 7A. The latching pulse supplied from generator 308 is also connected to up-down input circuit 296, and it causes the latter circuit to have its output set to zero, unless the carry-borrow circuit 306 has indicated that a carry or a borrow is to take place to the next digit of the time code address. In the latter case, the output of up-down input circuit 296 to adder 294 will not be changed by the latching pulse. As is shown in FIG. 13, the carry/borrow circuit 306 includes an AND gate C-3, which is connected to the three low order bits of the internal address bus 307. When these three low order bits are high during the clock phases 7A and 7B, the AND gate C-3 supplies a signal to the carry/borrow circuit 306 which prevents the up-down input circuit 296 from causing a carry or a borrow to the next time code digit supplied to it. This prevents a carry or a borrow from the tens hour digit of one time code to the units frame digit of the next time code.

It should be noted that, in normal operation, that is, unless a $\overline{\text{CTLP}}$ pulse has just been counted, successive digits from both the upper and lower halves of tape position buffer 292 are continuously being supplied to the input of adder 294, however, under these conditions, the input from up-down input circuit 296 is zero and thus each digit read from tape position buffer 292 is supplied unchanged to the input of latch circuit 304.

The process of reading a digit from tape position buffer 292, passing it through adder 294 and EXCLUSIVE OR circuit 300, in which circuits it is either incremented, decremented or passed through unchanged, and then passing it through the multiplexer 302 to the input of latch 304 is performed for all the digits of both the upper and lower halves of the tape position buffer 292 under the influence of the counted address signal generated by the counter and address generator 308. However, latch signal supplied to latch circuit circuit 304 by the NORRED AND circuit 310 (FIGS. 5 and 10) is only generated during the A phase clock signals at the time when digits from the lower half of tape position buffer 292 are cycled through adding circuit 294, EXCLUSIVE OR circuit 300 and multiplexer 302 to the input of latch circuit 304. Thus, only digits read from the lower half of tape position buffer 292, are supplied to the input of tape position buffer 292 through latch 304, so as to allow those values to be recorded into the tape position buffer. The write enable input to tape position buffer 292 is supplied from a $\overline{\text{WRITE CTL}}$ line which is the output of a NAND gate 311. When the signal on the $\overline{\text{WRITE CTL}}$ line goes low, the 4-bit output of latch 304 is recorded in tape position buffer 292 at the address currently on internal address bus 307. Normally, one input of NAND gate 311 is connected through a multiplexer 312 (FIGS. 5 and 10) to the output of a NORRED AND circuit 313, and the $\overline{\text{WRITE CTL}}$ line goes low whenever NORRED AND circuit 313, generates a positive output. This output from circuit 313 normally goes positive briefly during both the A and B clock phases, causing each of the 4-bit digits originating from the lower half of tape position buffer 292 to be recorded, with whatever changes, if any, that have been made to it in adder 294 and EXCLUSIVE OR gate 300, back in buffer 292 at the address from which it came in the lower half of buffer 292 as well as in the corresponding address in the upper half of buffer 292. As a result, the values stored in the lower and upper halves of tape position buffer 292 are normally identical. As is described below, if a discontinuity is detected in the time code read by the time code reader 80, the $\overline{\text{WRITE CTL}}$ signal is not generated during the B clock phases in which the upper half of the tape position buffer 292 is being addressed. Therefore, when such a discontinuity is detected, the time code address in the upper half of tape position buffer 292 will not be incremented by the counting of control pulses and thus will maintain the tape address at which such a discontinuity is detected.

It should be noted that the $\overline{\text{CTLP}}$ pulse which is counted by the tape position counter 282, is supplied to the time code/CTL board 142 or 144 from its associated VTR interface board 116 or 126 and that such VTR interface board only supplies one $\overline{\text{CTLP}}$ pulse to its time code/CTL board 142 or 144, in response to the reading by the control pulse head 128 or 130 in its associated VTR of the number of control pulses which are associated with each frame of the recorded video signal. As earlier noted, in most VTRs, one or two control pulses are recorded per frame. Thus, it can be seen that the tape position counter 282 provides a means for incrementing, or decrementing a time code address stored in the tape position buffer 292 in response to the distance or number of frames by which the tape in its corresponding VTR has moved.

As is stated above, the time code reader 80 located on each of the time code/CTL boards 142 and 144 receives time code signals read by the time code head 136 or 138 of its respective VTR. Such time code signals are transmitted to reader 80 from head 136 or 138 through a time code connection 134 and a VTR interface board 116 or 126 associated with the time code/CTL board 142 or 144 on which a given time code reader 80 is located. As is shown in FIG. 2A, each SMPTE time code is comprised of 80 bits. Each bit is either a zero or a one, with the magnetic orientation of the recorded signal changing direction once every clock period, as shown in FIG. 2B, to represent a zero bit, and twice every clock period, as shown in FIG. 2C, to represent a one bit. As a tape upon which longitudinal time codes have been recorded passes time code head 138 or 138, these changes of magnetic orientation are sensed by that time code head, causing a signal to be generated in it, which is transmitted to the time code reader 80 through the time code connection 134 and the associated VTR interface board 116 or 126. The time code reader 80 receives that signal and from it determines the current clock period of the time code currently being read and whether one or two transitions are taking place during each such clock period, so as to determine whether the bit being read during such clock period is either a zero or a one. Time code reader 80 supplies, as an output, a serial data clock signal which has a frequency equal to the current clock period of the time code signal being read by its associated time code head. The time code reader 80 also supplies a time code serial data signal which is synchronized with the serial data clock signal of the time code reader. Such time code serial data signal has a high value when the bit just read is a one, and a low value when the bit just read is a zero. The serial data clock signal and the time code serial data signal produced by the time code reader 80 are supplied to a time code address extracting circuit 284 and a time code ready indicating circuit 286, both of which are shown in FIG. 5.

The time code ready indicating circuit 286 may comprise a time code sync word detecting circuit 314 which receives both the time code serial data and the serial data clock from time code reader 80. As can be seen from FIG. 9, this sync word detecting circuit 314 includes a latch E8 which is used for the purpose of providing delays to signals supplied to it, a NAND gate E9, two inverters E10, an AND gate D11, and a counter D10. The counter D10 counts the pulses of the serial data clock signal supplied from time code reader 80, and it is reset through the NAND gate E9 any time that a zero bit is read by the time code reader. If the counter D10 counts 12 consecutive bits of a time code which are all one, this indicates that the sync word shown in FIG. 2A, has been received and, after an appropriate delay, there is emitted a signal indicating that the sync word has been so received. The sync word detecting circuit 314 also includes a flip-flop B8 which can be used, in conjunction with counter D10 and latch E8, to determine whether the 12 consecutive one-bits of the sync word of the SMPTE time code shown in FIG. 2A, are followed by a zero bit and then a one-bit, or whether they are followed by two zero bits. As is shown in FIG. 2A, when the tape is traveling in a forward direction, the 12 consecutive bits of the sync word are followed by a zero bit and then a one bit, whereas, when the tape is moving in a reverse direction, these 12 consecutive one bits are followed by two zero bits. Thus, the operation of the flip-flop B8 enables the time code sync word detecting circuit 314 to emit a signal which indicates the direction of tape movement.

Figure 9:
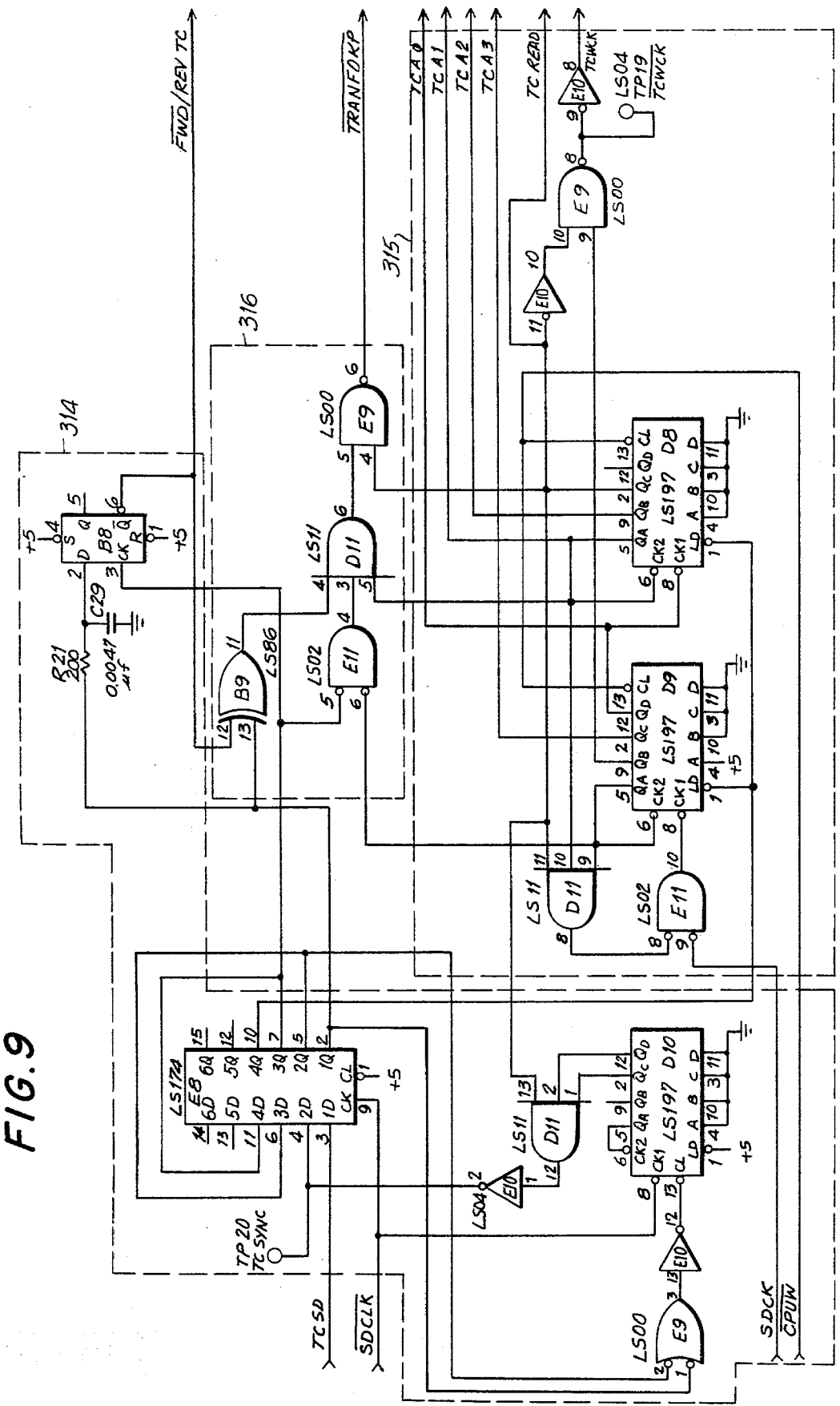
FIG. 9 is a schematic diagram of one embodiment of the interconnection of a sync word detector, time code counter and gating circuit used with the present invention.

The time code ready indicating circuit 286 also includes a time code clock counter 315 which, as can be seen from FIG. 9, includes a two AND gate E11 and D11, two inverters E10, a NAND gate E9 and two counters D8 and D9. These counters D8 and D9 count the pulses of the serial data clock signal produced by the time code reader 80, and they emit a signal every time that eighty of such clock pulses have been counted. Such output from counters D8 and D9 is supplied as one input to a transfer OK gating circuit 316 which, as can be seen from FIG. 9, includes an EXCLUSIVE OR gate B9, a NOR gate E11, an AND gate D11, and a NAND gate E9. The transfer OK gating circuit 316 receives the output from time code sync word detecting circuit 314 indicating that a sync word has been read, and, if this sync word is read at the same time that time code clock counter 315 emits a pulse indicating that it has counted eight time code clock pulses since the last such detection of a sync word, then the transfer OK gating circuit 316 emits a $\overline{\text{TRANFOKP}}$ pulse. This $\overline{\text{TRANFOKP}}$ pulse is supplied as a setting input to a time code ready flip-flop circuit 318, which is reset by the subsequent $\overline{\text{CTLP}}$ received from the associated VTR interface board 116 or 126. The time code ready flip-flop circuit 318 is shown on FIG. 10 to be comprised of two AND gates K9 constituted by OR gates with inverted inputs and outputs and a flip-flop K2. The output of time code ready flip-flop circuit 318 is the time code ready signal TCRDY, the use of which will be explained below.

The time code clock counter 315, in addition to supplying an input to transfer OK gating circuit 316, also generates a 4-bit time code address, the value of which varies as a function of which of the 16 digits contained within the SMPTE time code is currently having, or has just had, its bits read by time code reader 80. The time code clock counter 315 also generates a time code write signal TCWCK which is generated after each of the 16 separate digits of the time code has been read, and a time code read signal TC READ which is generated after all 16 digits of a time code have been read.

The time code address extracting circuit 284 is shown on FIG. 5 to include a time code serial data shift register 320, which receives both the time code serial data signal and the serial data clock signal supplied by the time code reader 80. In response to the serial data clock signal, each of the bits of the time code serial data signal is shifted into shift register 320, which may be in the form of a 4-bit bi-directional shift register (FIG. 12) also receiving, as an input, the forward/reverse signal produced by time code sync word detecting circuit 314. Thus, when the tape from which a time code is being read is moved in a forward direction, the bits of the time code serial data original are shifted in a forward manner into register 320, whereas, if the tape is moving in a reverse direction, such bits are shifted in a reverse direction into the shift register 320, so that they will have the proper order within that shift register, regardless of tape direction.

Figure 12:
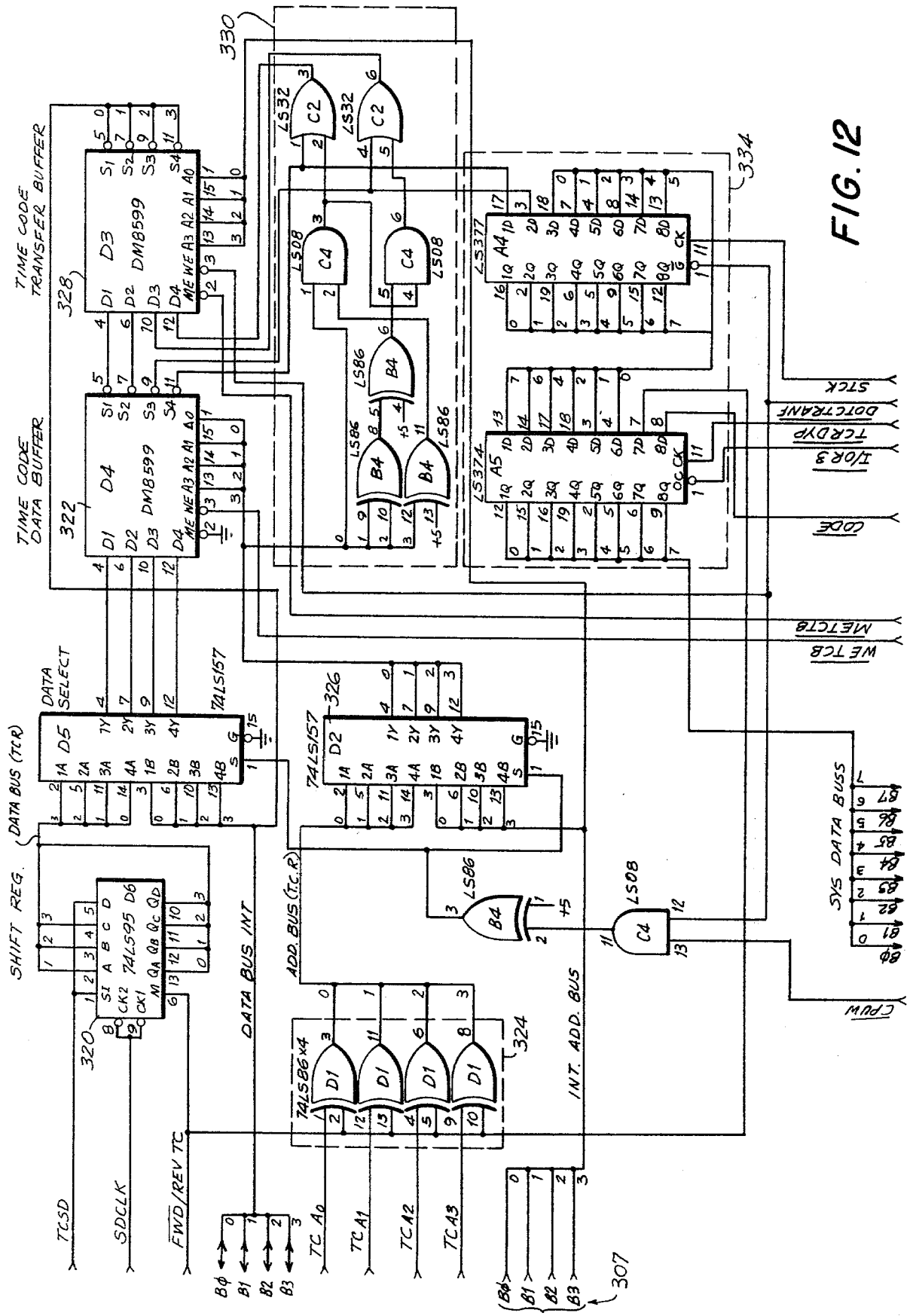
FIG. 12 is a schematic representation of the interconnection of buffer, detector and latch circuitry which can be used with the present invention.

The 4-bit output of shift register 320 is supplied, as the input to a time code data buffer 322, shown in both FIGS. 5 and 12. This data buffer 322, like the tape position buffer 292, is a 16-by-4-bit addressable memory circuit. The time code addresses generated by time code clock counter 315 are supplied through an EXCLUSIVE OR circuit 324 and a multiplexer 326 to the addressing input of time code data buffer 322. Thus, as each of the 16 digits of the SMPTE time code is read by time code reader 80, its 4 bits will be shifted into time code serial data shift register 320 and, once each of the 4 bits of each digit has been placed in this shift register, time code clock counter 315 will generate a time code write signal TCWCK which will cause time code data buffer 322 to write the value then in shift register 320 into one of its 16 memory locations. At this same time, the address generated by clock counter 315 will be supplied through EXCLUSIVE OR circuit 324 and multiplexer 326 to the addressing input of time code data buffer 322 so as to assure that each individual 4-bit digit recorded from shift register 320 into data buffer 322 is stored in the appropriate address for such digit. The addressing scheme within time code data buffer 322 is such that the 8 address digits of the SMPTE time code are stored in the bottom half of its memory space, that is, in addresses 0–7, and the 8 user digits of the time code are stored in the upper half of the data buffer 322, that is, at the addresses 8–15. The EXCLUSIVE OR gate 324 receives the forward/reverse signal generated by time code sync word detector 314. When this signal indicates that the tape from which time codes are being read is moving in a reverse direction, it causes each of the 4 digits of the time code address supplied to EXCLUSIVE OR circuit 324 to have its value complemented, that is, to change zeros to ones and ones to zeros. As a result, the sequence of addresses which exit from EXCLUSIVE OR gate circuit 324 and which are supplied to the addressing input of data buffer 322 when a tape is moving in a reverse direction are exactly opposite the sequence of time code addresses which are supplied to data buffer 322 when the tape is moving in a forward direction so that, regardless of tape direction, each digit of the time code is stored in the same memory address within buffer 322.

The 4-bit output of time code data buffer 322 has its two low order bits supplied directly to the two low order bits of a time code transfer buffer 328. The time code transfer buffer 328, like time code data buffer 322 and tape position buffer 292, is a 16 by 4-bit addressable memory circuit. The other two output bits of time code data buffer 322 are supplied as inputs to a user bit detect and separate circuit 330 which, as can be seen from FIG. 12, is comprised of three EXCLUSIVE OR gates B4, two AND gates C4 and two OR gates C2. This detect and separate circuit 330 has a 2-bit output which is supplied to the upper 2 bits of the 4-bit data input of transfer buffer 328.

Figure 10:
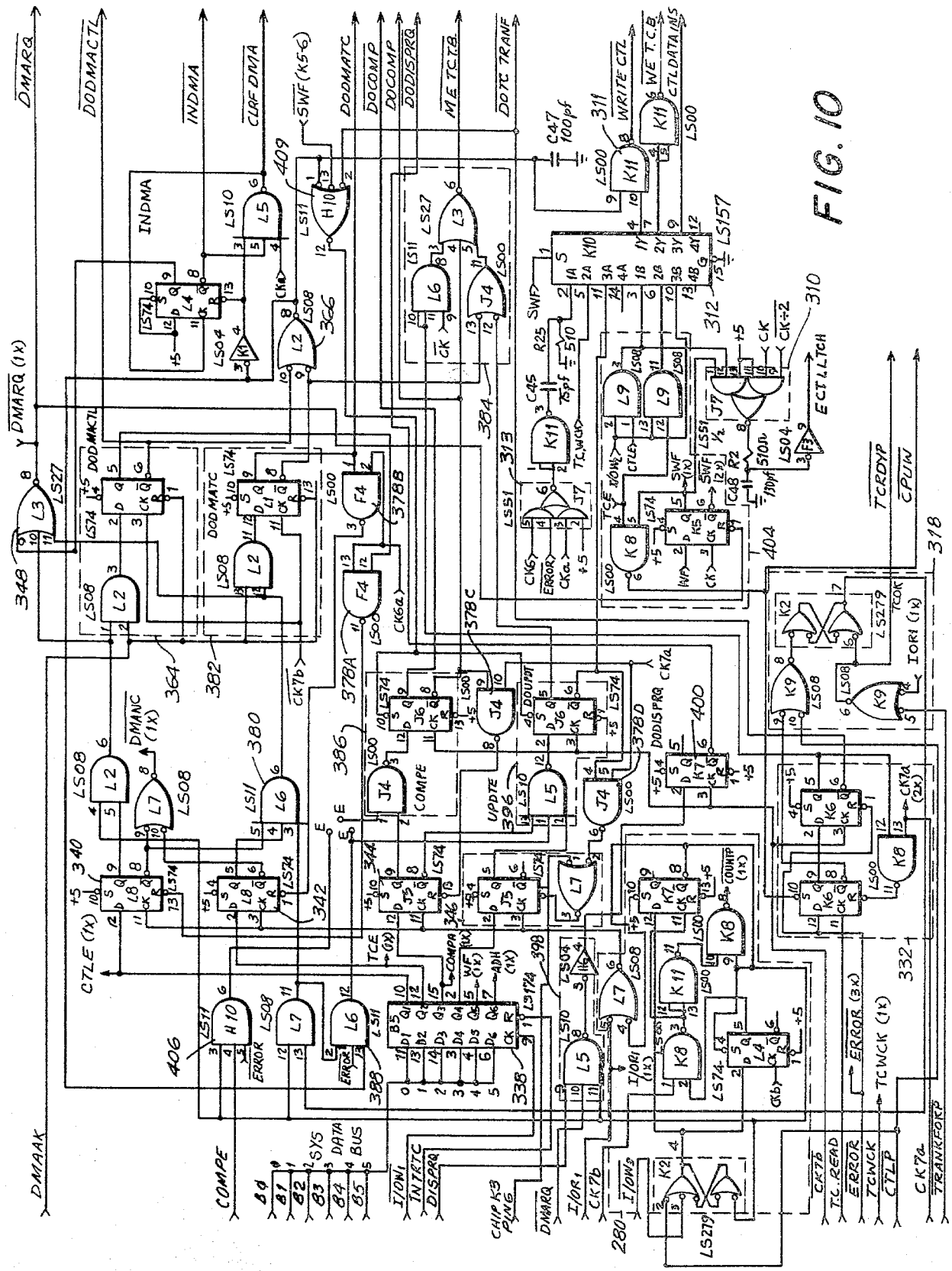
FIG. 10 is a logic diagram of circuitry that is used to process the signals produced by the circuit shown in FIG. 9 in accordance with the present invention.

A write enable input of transfer buffer 328 is connected to the output of a do time code transfer flip-flop circuit 332 which, as can be seen from FIG. 10, may be comprised of two flip-flops K6 and a NAND gate K8. Under normal conditions, this flip-flop circuit 332 generates a signal $\overline{\text{DOTCTRANF}}$ every time that a time code read signal TC READ is generated by time code clock counter 315 indicating that all 16 digits of a time code have been read and, thus, should have been stored in their proper locations within time code data buffer 322. The do time code transfer flip-flop circuit 332 receives clocking signals from the system clock counter and address generating circuit 308, which cause circuit 332 to emit its $\overline{\text{DOTCTRANF}}$ signal for a period equivalent to the 16 phases of the 16-phase clock signal generated by generator 308. The $\overline{\text{DOTCTRANF}}$ signal is also supplied, as a switching input, to multiplexer 326 which causes that multiplexer to connect internal address bus 307 to the addressing input of time code data buffer 322 which otherwise receives the time code address signals from the time code clock counter 315. The addressing inputs of time code transfer buffer 328 are always connected to internal address bus 307. Thus, during the period that the $\overline{\text{DOTCTRANF}}$ signal is generated, both time code data buffer 322 and time code transfer buffer 328 are simultaneously addressed by each of the sixteen 4-bit address values generated by system clock counter and address generator 308. The read enable input to buffer 322 is enabled at all times that the write enable input to that data buffer is not enabled. Since the write enable input to buffer 322 is only enabled after each of the separate 16 digits of the time code has been read by time code reader 80, the write input to buffer 322 is not enabled during the period in which the $\overline{\text{DOTCTRANF}}$ signal is generated, which period takes place after all 16 of the digits of the SMPTE time code have been read. Thus, during the generation of the $\overline{\text{DOTCTRANF}}$ signal, each of the sixteen 4-bit memory locations in data buffer 322 is addressed, thereby causing the 4-bit value stored at each addressed location to be placed on the output of data buffer 322. The two low order bits of this 4-bit value are supplied directly to the input of time code transfer buffer 328, while two high order bits of this 4-bit value pass through user bit detect and separate circuit 330.

The circuit 330 also receives the 4-bit address value on internal address bus 307 from the output of multiplexer 326. The detect and separate circuit 330 detects which of the bits passing through it are user bits and which are not. The SMPTE time code, as noted above, places a maximum value on each of its eight address digits. For example, the tens frame digit of the time code address cannot exceed the value of 2, since the highest allowable frame number occurring within a second is the frame number 29. Since all of the digits that range between the value of 0 and 2 can be expressed with only 2 binary digits, the 4-bit digit in the tens frame digit of the time code address has two digits which are not used to convey address information. Since these upper two bits of the tens frame digit are not necessary to convey address information, they can be used for other purposes. One of them is used to indicate whether the time code currently being read is the NTSC 525 lines per frame standard time code format, or the NTSC 525 lines per frame color or drop frame time code format discussed above. The other of the two high order bits in the tens frame digit of the time code is a user bit which can be employed to convey a piece of binary information which an operator of the system desires to record upon the tape. Similarly, the tens hour digit never exceeds the value of 2 since the hour value of the time code cannot exceed the maximum value of 23. Thus, the two high order bits of the tens hour digit are also free for use in recording non-address information. In addition, the tens second digit and the tens minute digit of a time code address can never exceed the value of 5, because the highest possible value for minutes and for seconds within a time code is 59. Thus, in these two digits the highest order bit is free to record user information.

Although the user bits which have just been discussed can be used to record information unrelated to the time code addresses, these user bits must be removed from the the time code address digits in order for the latter digits to accurately reflect their time code value. For example, if the two user bits located in the upper half of the 4-bit tens frame digit of the time code address were both high, these two user bits would make a tens frame digit indicating an actual tens frame value of 2 appear to have a value of 14. Thus, the function of the user bit detect and separate circuit 330 is to remove user bits from those digits in the time code address in which such user bits occur, and to store the user bits in a user bit latch circuit 334 where they can be read under the command of the CPU on CPU board 148. More particularly, when the CPU generates a signal on the I/O $R_3$ line, the values stored in the user bit latch are gated onto the system data bus so that the values in latch circuit 334 can be read by the CPU on board 148. As is shown on FIG. 12, the user bit latch circuit 334 may comprise two latches, A4 and A5. Latch A4 is connected as a shift register and it shifts in the user bits which are separated from time code digits by the operation of the user bit detect and separate circuit 330, and latch A5 latches all of the user bits from latch A4 once all of such bits have been removed from a specific time code.

The user bit detect and separate circuit 330 causes all user bits which are supplied to it from the time code data buffer 322 to be replaced with zero bits. Thus, during the period in which the $\overline{\text{DOTCTRANF}}$ signal is generated, each of the sixteen digits stored in one of the sixteen address locations in time code data buffer 322 is transferred to, and stored at, a corresponding one of the sixteen address locations on transfer buffer 328, with the only change being that user bits contained in the time code address values stored in the lower half of time code data buffer 322 are all replaced with zero values in the equivalent address digits stored in the lower half of time code transfer buffer 328. The addresses at which data is stored in the time code transfer buffer 328 are shown on FIG. 6. The digits stored in time code data buffer 322 are stored according to a similar addressing scheme. It should be noted that the user digits 1 through 8 which are stored at the addresses 8-15 in both the time code data buffer 322 and time code transfer buffer 328, are separate from the user bits which are stored in various of the address digits occurring in the lower half of the memory, that is, addresses 7-0, in time code data buffer 322.

After the 16-phase clock signal generated by system clock counter and address generator 308 has caused each of the sixteen digits in time code data buffer 322 to be transferred to time code transfer buffer 328, a signal is supplied from generator 308 to the do time code transfer flip-flop circuit 332 so as to reset that flip-flop circuit and terminate the $\overline{\text{DOTCTRANF}}$ signal, and thus to terminate the transfer of data between time code data buffer 322 and time code transfer buffer 328.

Each time code/CTL board 142 or 144, as shown in FIG. 5, further includes circuitry for controlling the automatic transfer of data from tape position buffer 292 and time code transfer buffer 328 to designated memory locations in the CPU memory board 150 (FIG. 3), for comparing the values contained in time code transfer buffer 328 with the corresponding values stored in tape position buffer 292, and for updating the value in tape position buffer 292 from the time code address value stored in time code transfer buffer 328. More particularly, each time code/CTL board 142 or 144 includes a mode control latch 338 which determines which of the following four functions are to be performed: the transfer of the CTL count in tape position buffer 292 to CPU memory board 150; the transfer of time code address from time code transfer buffer 328 to CPU memory board 250; the comparing of the time code address values in time code transfer buffer 328 and tape position buffer 292; and the updating of tape position buffer 292 from the value contained in time code transfer buffer 328.

As is shown in greater detail on FIG. 10, mode control latch 338 is connected to the six low order bits of the system data bus and, when latch 338 receives a latching signal on the I/O $\overline{W1}$ line at the command of CPU board 148, it latches the first six bits of the data put on the system data bus at that time by CPU board 148. This, CPU board 148 has the ability to store any desired combination of six bits in latch 338 under the control of the program it is currently executing. In normal operation, the first four bits of mode control latch 338 are all set high. The first of these four bits is supplied as a D input to a CTL DMA request flip-flop 340; the second of these four low order bits of latch 338 is supplied as a D input to a time code DMA request flip-flop 342; the third of these four low order bits is supplied as a D input to a compare enable arm flip-flop 344 included within the compare circuitry 287 (FIG. 5); and the fourth of these four bits of latch 338 is supplied as the D input to an update enable arm flip-flop 346 included within the updated control circuitry 283 (FIG. 5). Each of these four flip-flops, 340, 342, 344 and 346, which has its D input connected to a respective one of the four lower bits of the output of mode control latch 338, has its clocking input connected to an output of the CTL delay and synchronizing circuit 280. Each time that a CTL pulse designating a tape movement of one frame is read by the VTR associated with a given time code/CTL board 142 or 144, the reproduced CTL pulse is supplied to the input of the CTL delay and synchronizing circuit 280. Just before the beginning of the next cycle of the 16-phase clock signal generated by system clock counter address generator 308, a $\overline{\text{COUNT P}}$ pulse is supplied to tape position counter 282 so that the latter can either increment or decrement its value by 1, depending upon the direction of tape movement in the VTR from which the control pulse was read. After one full cycle of the 16-phase clock signal from generator 308, during which tape position counter 282 has time to count the $\overline{\text{COUNT P}}$ pulse supplied to it, the output of CTL delay and synchronizing circuit 280 supplied to the clocking inputs of flip-flops 340, 342, 344 and 346 goes high, thereby causing each of the flip-flops 340, 342, 344 and 346 which receives a high signal from the mode control latch 338 to be set.

The CTL DMA request flip-flop 340 is used to initiate a Direct Memory Access (DMA) procedure in which the time code address value stored in tape position buffer 292 is placed in a specified memory location, called the DMA tape position register, in CPU memory board 150. The term Direct Memory Access refers to either the reading, or the writing of memory data from or into memory address locations which are normally addressed by a central processing unit under the control of addressing circuitry other than that of the central processing unit itself. Such direct memory access is used by the time code/CTL boards 142 and 144 in editing system 100 for saving time because the time code address values can be written into CPU memory board 150 more rapidly under the influence of addressing circuitry on the time code/CTL boards 142 and 144 and the special function board 146 than it can be by the CPU itself.

When CTL DMA request flip-flop 340 is set by the combined operation of CTL delay and synchronizing circuit 280 and mode control latch 338, it supplies a high signal on its Q output which is delivered to one input of a NOR gate 348 (FIG. 10), which causes the output $\overline{\text{DMARQ}}$ of that NOR gate to go low.

Each of time code/CTL boards 142 and 144 is capable of generating a $\overline{\text{DMARQ}}$ output or signal. One of these $\overline{\text{DMARQ}}$ outputs is labeled $\overline{\text{DMARQ0}}$ and the other is labeled $\overline{\text{DMARQ1}}$. These two signals $\overline{\text{DMARQ0}}$ and $\overline{\text{DMARQ1}}$ are supplied to a DMA controller located on special function board 146, and which is shown in simplified form on FIG. 7. The $\overline{\text{DMARQ0}}$ and $\overline{\text{DMARQ1}}$ signals are supplied to respective inverting inputs of an OR gate 350. Whenever a Direct Memory Access or DMA is requested by one time code/CTL boards 142 and 144, its respective $\overline{\text{DMARQ}}$ signal will go low, causing the output of OR gate 350 to go high, which generates a hold request signal HLDR. This hold request signal causes the microprocessor located on CPU board 148 to enter a hold state when it completes execution of its current instruction. As soon as the microprocessor enters the hold state, it generates a hold acknowledge signal HLDA which is supplied to the DMA controller located on the special function board 146. More particularly, as shown on FIG. 7, the hold acknowledge signal HLDA is applied to the setting input of two flip-flops 352 and 354. The flip-flops 352 and 354 have OR circuits or gates 356 and 358, respectively, connected to their reset inputs. The OR gate 356 receives the $\overline{\text{DMARQ0}}$ signal of one of its inputs, and the OR gate 358 has the $\overline{\text{DMARQ1}}$ signal applied to one of its inputs. Thus, each of the flip-flops 352 and 354 can only be set to, and remain in its set state while the associated $\overline{\text{DMARQ}}$ signal is low for indicating that the associated time code/CTL board 142 or 144 is requesting a DMA procedure. Thus, when a hold acknowledge signal HLDA is received by the circuit shown in FIG. 7, it will set whichever of the two flip-flops 352 and 354 has its associated $\overline{\text{DMARQ}}$ signal at a low level. However, as can be seen on FIG. 7, the Q output DMAAK0 of flip-flop 352 is applied to the other input of OR gate 358. Similarly, the Q output DMAAK1 of flip-flop 354 is applied to the other input of OR gate 356, but it should be noted that this connection between the output of flip-flop 354 and an input of OR gate 356 has an interposed integrating circuit comprised of a resistor 360 and a capacitor 362 which will slightly delay the arrival of a high signal generated by flip-flop 354 to the specific input of OR gate 356. Thus, if the $\overline{\text{DMARQ0}}$ and $\overline{\text{DMARQ1}}$ signals are both low, indicating that both of the time code/CTL boards 142 and 144 are requesting a DMA procedure, the following hold acknowledge signal HLDA will initially set both flip-flops 352 and 354, but the described connection between the Q output of flip-flop 352 and the respective input of OR gate 358, will immediately cause flip-flop 254 to be reset. Such resetting of flip-flop 354 will take place so rapidly that the brief high output produced by flip-flop 354 will not have time to reset flip-flop 352 through OR gate 356. Thus, the DMA controller located on the special function board 146 establishes a priority whereby if both the $\overline{\text{DMARQ0}}$ and $\overline{\text{DMARQ1}}$ signals go low before a hold acknowledge signal HLDA is generated, the DMAAK0 output signal will go high before the DMAAK1 output signal, and the DMAAK1 output signal will not be allowed to go high until the $\overline{\text{DMARQ0}}$ goes high, indicating that the time code/CTL board 142 or 144 associated with the latter signal is no longer requesting a DMA procedure. It should be noted, however, that the DMA controller of FIG. 7 will prevent a $\overline{\text{DMARQ0}}$ signal from one of the boards 142 and 144 from interrupting a DMA procedure which is already underway in the other time code/CTL board 142 or 144. Thus, if only the $\overline{\text{DMARQ1}}$ signal is low when a hold acknowledge signal HLDA is generated, only the flip-flop 354 will be set, causing the DMAAK1 output signal to go high. This setting of flip-flop 354 will, after the short delay required for charging of the integration circuit constituted by resistor 360 and capacitor 362, prevent flip-flop 352 from being set by the hold acknowledge signal HLDA until the $\overline{\text{DMARQ1}}$ output signal goes high for indicating that its associated time code/CTL board 142 or 144 is no longer requesting a DMA procedure.

Figure 14:
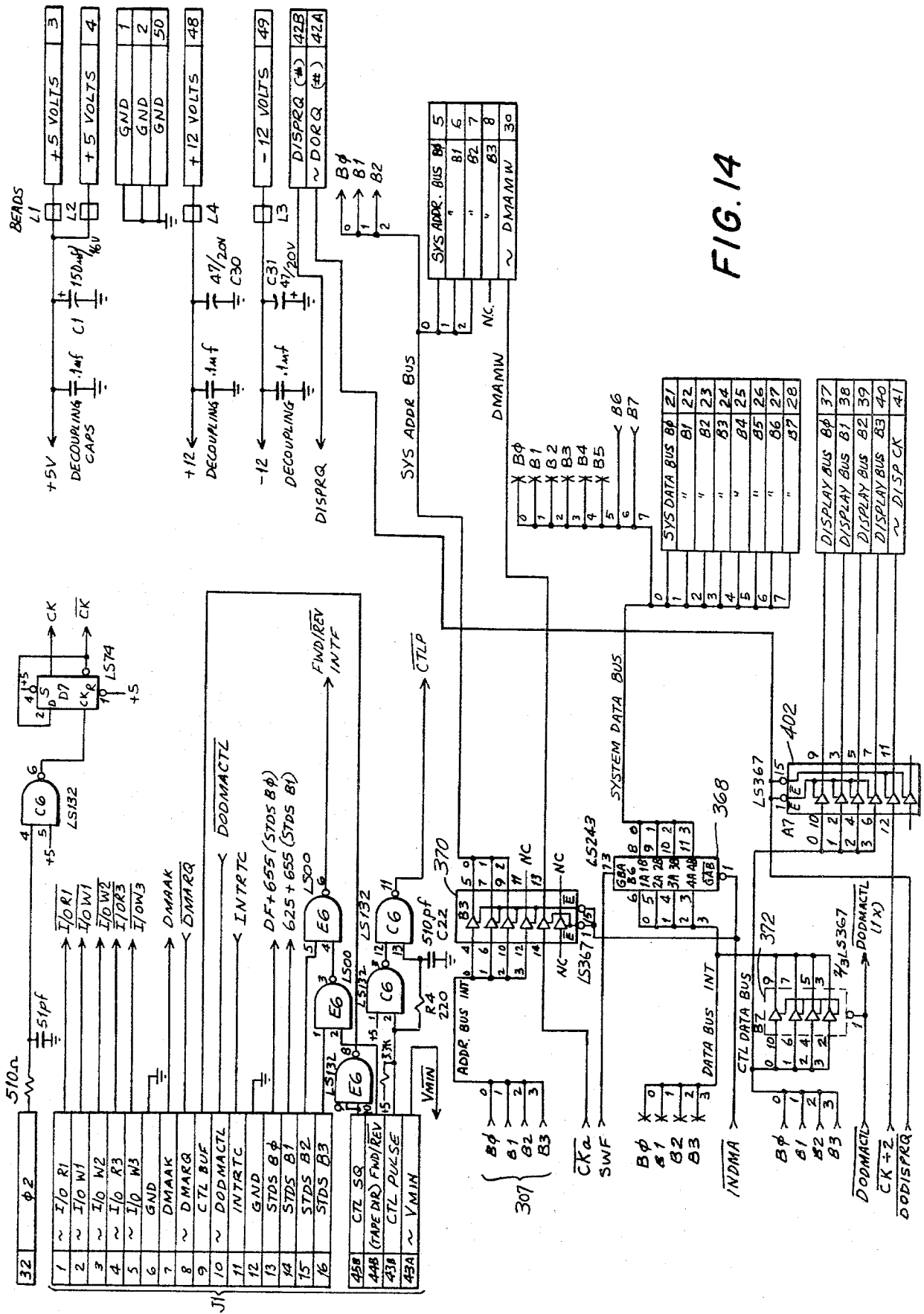
FIG. 14 is a schematic representation of the means by which certain ones of the signals produced by the circuit shown in the preceding Figures are intercoupled therebetween, as used in the present invention.

The Q output of CTL DMA request flip-flop 340 (FIG. 5) is also supplied to a DODMACTL circuit 364 which, as seen on FIG. 10, may include an AND gate L2 and a flip-flop L1. When an output DMAAK signal is generated by the flip-flop 352 or 354 of FIG. 7 associated with one of the time code/CTL boards 142 or 144, that output signal DMAAK is also supplied to one input of the DODMACTL circuit 364 in the respective board 142 or 144. When the Q output of the CTL DMA request flip-flop 340 and the appropriate DMAAK output signals are both high, AND gate L2 (FIG. 10) will have a high output which is supplied to the D input of flip-flop L1. At the end of the cycle of the 16-phase clock signal generated by system clock counter and address generator circuit 308, flip-flop L1 contained within the DODMACTL circuit 364 is clocked thereby causing it to store the value currently being obtained from AND gate L2. Thus, it can be seen that if CTL DMA request flip-flop 340 is set and if a DMAAK signal has been received indicating that the microprocessor on CPU board 148 has ceased its operation and is no longer using the system address or data buses, DODMACTL circuit 364 is set to the DODMACTL state in which its Q output is high and its $\overline{\text{Q}}$ output is low. The low $\overline{\text{Q}}$ output from circuit 364 in the DODMACTL state is supplied to one input of an OR gate 366 (FIGS. 5 and 10) which has both inverting inputs and an inverting output. This low input supplied from circuit 364 to OR gate 366 causes its output also to go low, so that a low signal is generated on an $\overline{\text{INDMA}}$ line. When the signal on the $\overline{\text{INDMA}}$ line is low in the DODMACTL state, a gate 368, shown in detail in FIG. 14 is made to connect the 4-bit internal data bus of the time code/CTL board 142 or 144 to the four lower bits of the 8-bit system data bus of the card bay 112. The $\overline{\text{Q}}$ output of DODMACTL circuit 364 is also connected to a $\overline{\text{DODMACTL}}$ line which is connected to the gating input of a gate 372 as shown on FIG. 14. When the signal on the $\overline{\text{DODMACTL}}$ line goes low, it causes the 4-bit output of latch circuit 304 in the tape position counter 282, which 4-bit output is applied to the CTL data bus, to be connected to the 4-bit internal data bus which, at this same time, is connected to the 4 lower bits of the system data bus. Thus, in the DODMACTL state, the 4-bit output of latch circuit 304 is applied to the 4 lower bits of the system data bus and the three lower bits of the internal address bus are connected to the three lower bits of the system address bus.

Further, in the DODMACTL state, the $\overline{\text{DODMACTL}}$ line signal is low and is supplied to a decoder 374 (FIG. 7) located in the DMA controller on special function board 146. In the DODMACTL state of a specified one of time code/CTL boards 142 and 144, decoder 374 also receives the $\overline{\text{DMAAK}}$ signal associated with the board 142 or 144 which is generating the $\overline{\text{DODMACTL}}$ signal. The decoder 374 also receives the hold acknowledge HLDA signal which is generated throughout the whole DMA process. Thus, decoder 374, which could be comprised of read only memory, responds to the one of its inputs which indicates that a specified one of the two time code/CTL boards 142 or 144 is performing a CTL DMA procedure. Accordingly, decoder 374 generates an output which is supplied as two additional address bits (3) and (4) to the system address bus. The hold acknowledge signal HLDA is also shown to be applied to the gating input G of a gate 376. This gate has eleven fixed inputs, which are not shown, and, when the hold acknowledge signal is generated, the gate 376 provides a fixed set of eleven additional addressing bits (5)–(15) which are supplied to the system address bus. Thus, it can be seen that during DMA, the three low order bits (0)–(2) of the system address bus are determined by system clock counter and address generator 308, that the next two address bits are determined by decoder circuit 374 and that the top eleven bits are fixed by gate 376.

As is shown on FIG. 11, the $\overline{\text{DODMACTL}}$ signal is supplied to system clock and generator circuit 308 at one of the negative or inverted inputs of an OR gate K3 for causing the output of that OR gate to remain high during the entire CTL DMA process during which the $\overline{\text{DODMACTL}}$ signal is low. The output of OR gate K3 is normally passed through multiplexer 309 onto the internal address bus 307 as its high order bit. Thus, during the CTL DMA process, only the top half of tape position buffer 292 has its digits addressed. As each of the three low order bits of the internal address bus is varied at every other phase of the 16-phase clock pulse during the DMA process, a successive one of the eight time code address digits contained in the upper half of tape position buffer 292 is cycled through adder circuit 294, EXCLUSIVE OR circuit 300 and multiplexer 302 to latch circuit 304, where it is latched by the latching signal generated by NORRED AND circuit 310 during the A phases of the 16-phase clock signal. The value latched in circuit 304 is then supplied through CTL data bus, gate 372, the internal data bus and gate 368 to the system data bus for writing at the eight successive 8-bit addresses of the DMA tape position register on the CPU memory board 150 determined by the address comprised of the three low order bits of the address generated by the system clock counter and address generator 308, by the tens bits supplied by the output of decoder circuit 374 on FIG. 7, and by the eleven high-order bits which are fixed by the output of gate circuit 376, also shown on FIG. 7. Thus, in the DODMACTL state, each of the eight digits stored in the upper half of tape position buffer 292, is stored in eight sequential addresses of the CPU memory 150 at an address which is associated, by the bits supplied from the output of gate 376, with DMA information, and which, as a result of the bits produced by decoder 374, is associated with a CTL/DMA procedure coming from its particular time code/CTL board 142 or 144.

It should be noted that during any DMA procedure being performed by one of the time code/CTL boards 142 and 144, no values are written into its tape position buffer 292. This is because the output of OR gate 366 is supplied to one input of the NAND gate 311 which is identified as K11 on FIG. 10. During a DMA procedure, the output of OR gate 366 is low causing the output of the NAND gate K11 to always be high which, in turn, causes the $\overline{\text{WRITE CTL}}$ signal to be high for preventing any values from being written into tape position buffer 292. After the CTL DMA procedure has been underway for approximately one cycle of the 16-phase clock signal from generator 308, that generator 308 causes a gate circuit 378 (FIG. 5) to pass the positive Q output of DODMACTL circuit 364 to the reset input of the CTL DMA request flip-flop 340 for resetting that flip-flop and causing the DODMACTL circuit 364 to be reset at the completion of the cycle of the 16-phase clock signal, thus ending the DODMACTL state. As shown on FIG. 10, gate circuit 378 is actually comprised of a plurality of gates 378A-378D.

After the completion of the CTL DMA procedure which starts shortly after the reading of a control pulse by the respective VTR, the time code DMA procedure is initiated. As was stated earlier, during normal operation of the circuitry of FIG. 5, mode control circuit 338 causes the D input of time code DMA flip-flop 342 to have a positive value and, after the cycle of the 16-phase clock signal during which tape position counter 282 counts a given control pulse, time code DMA flip-flop 342 is set by the output of CTL delay and synchronizing circuit 280 at the same time as is CTL DMA request flip-flop 340. However, the positive Q output which is generated when time code DMA request flip-flop 342 is set, is not sufficient to cause the respective time code/CTL board 142 or 144 to enter the time code DMA procedure. This is because the Q output of time code DMA request flip-flop 342 is supplied as one input to an AND gate 380, and the other two inputs to this AND gate 380 are the $\overline{Q}$ output of CTL DMA request flip-flop 340 and the time code ready signal generated by flip-flop 318.

Thus, the time code/CTL board 142 or 144 of FIG. 5 will not enter the time code DMA procedure until the CTL DMA procedure has been completed, and until a time code ready signal has been generated for indicating that the value read by the time code reader and stored in time code transfer buffer 328 has a high probability of accuracy. Once all of these conditions are met, the output of AND circuit 380 goes high, and this high input is supplied both to NOR gate 348, for causing the generation of a low signal on the $\overline{\text{DMARQ}}$ line, and to a do DMA time code circuit 382. As was discussed above, a low signal on the $\overline{\text{DMARQ}}$ line causes a hold request to be applied to the microprocessor on CPU board 148. As soon as the microprocessor completes its current instruction, it generates a hold acknowledge signal, and, in accordance with the above-described operation of the circuitry shown on FIG. 7, a DMAAK signal is applied to the time code/CTL board 142 or 144 which has generated a request for a DMA procedure. The do DMA time code circuit 382 may be comprised of an AND gate L2 and a flip-flop L1, as can be seen from FIG. 10. Both the DMAAK signal from the circuitry of FIG. 7 and the output of AND gate 380, are supplied to the input of the AND gate L2, and, when both of these signals are high, AND gate L2 presents a positive signal to the D input of flip-flop L1. Just before the beginning of the next cycle of the 16-phase clock signal from generator 308, this positive D input will be latched under the influence of a clocking signal which is supplied to the do DMA time code circuit 382 from generator 308. This causes do DMA time code circuit 382 to enter the do DMA time code state in which the Q output of circuit 382 is high and the $\overline{Q}$ output is low, so as to cause the circuitry shown in FIG. 5 to initiate a time code DMA procedure.

When the $\overline{Q}$ output of circuit 382 is low, it presents a low input to OR gate 366 which, in turn, causes the output $\overline{\text{INDMA}}$ of gate 366 to go low for causing gate 368 to connect the four bits of the internal data bus to the four low-order bits of the system data bus. The low value of output $\overline{\text{INDMA}}$ also causes gate 370 to connect the three low order bits of the 4-bit internal address bus to the three low order bits of the 16-bit system address bus. The operation of gates 368 and 370 is identical in both the CTL DMA procedure and the time code DMA procedure. However, during the time code DMA procedure, the low signal produced by the $\overline{Q}$ output of DO DMA time code circuit 382 is also supplied to an inverting input of a NOR circuit 384 for causing the output of that circuit to go low. The output of NOR circuit 384 is the $\overline{\text{ME T.C.T.B}}$ signal, which is the memory enable input to time code transfer buffer 328, and it causes the data in the buffer 328 addressed by the internal address bus to be placed on the internal data bus when the memory enable input is low.

As is shown in FIG. 11, the $\overline{\text{INDMA}}$ line is connected to one of two NORRED AND gates of a circuit K4, included in generator 308. When the $\overline{\text{INDMA}}$ line is low during either the CTL or time code DMA procedures, it prevents the high order bit of the address generated from the system clock counter and address generator 308 from changing between a high and a low signal state at every clock phase, as it normally does except during DMA procedures. This is of little concern during the CTL DMA procedure, because, as was discussed above, the low $\overline{\text{DODMACTL}}$ signal generated at that time causes the output of OR gate K3 and, thus, the high order address bit to remain high regardless of the output of the circuit K4. However, during the time code DMA procedure, the $\overline{\text{INDMA}}$ signal causes the value of the high order bit generated by counter and address generator 308 to be determined by the AND gate contained within the circuit K4 which receives as its inputs the two signals ADH and DODMATC. The DODMATC signal is the Q output of do DMA time code circuit 382, and it is always high during the time code DMA procedure. The ADH signal is the 6th output bit of mode control latch 338. Normally, the value stored by CPU board 148 in mode control latch 338 is such that the ADH signal is low, so that the fourth bit of the address produced by counter and address generator 308 is low during the time code DMA procedure, and further, so that only the lower half of time code transfer buffer 328 is addressed in such procedure.

Thus, during the time code DMA procedure, each of the time code address digits stored in the lower half of time code transfer buffer 328, is sequentially placed on the four low order bits of the system data bus after passage through internal data bus and gate 368. At the same time that each such time code address digit is placed on the system data bus, the three low order address bits which selected it from the time code transfer buffer 328 are also passed through the internal address bus and gate 370 to the three low order bits of the system address bus. Concurrently with the foregoing, the hold acknowledge HLDA signal generated during a DMA procedure causes gate 376 to supply the eleven fixed DMA high order bits to the system address bus, and decoder 374 supplies two address bits to the system data bus which cause the time code address digits being transferred to be written into eight successive 8-bit addresses of the CPU memory board 150. Such addresses are associated with the VTR for which such a DMA procedure is being undertaken, and further are associated with the time code DMA procedure rather than the CTL DMA procedure, since, at this time, no DODMACTL signal is being supplied to decoder 374. The eight successive 8-bit storage locations on the CPU memory board 150 in which the eight digit value from buffer 328 is stored in the DMA procedure is called the DMA time code register.

Near the end of the 16-phase clock cycle of the time code DMA procedure, a signal emitted by system clock counter and address generator 308 is supplied to gate 378B of gating circuit 378 (FIG. 10). This causes the positive signal on the Q output of DO DMA time code flip-flop circuit 382 to be supplied to the reset input of time code DMA request flip-flop 342, thus resetting the latter flip-flop. This, in turn, causes do DMA time code flip-flop 382 circuit to be reset at the end of the 16-phase clock cycle.

It can be seen that, during the 16-phase clock cycle of the time code DMA procedure, the address generated by system clock counter and address generator 308 causes the eight time code address digits stored in the lower half of time code transfer buffer 328 to be stored in the respective DMA time code register defined by the eight sequential addresses in CPU memory board 150 at a location associated with time code DMA data from the respective time code/CTL board. It should be noted that the CPU board 148 has the capability, if instructed to do so by its program, to cause the eight user digits stored in the upper half of time code transfer buffer 328 to be transferred to the DMA time code register in CPU memory board 150. It can do this by changing the value stored in mode control latch 338, which is shown in greater detail on FIG. 10, so that its sixth, or ADH bit is high. This high ADH bit will be ANDED with the DODMACTL signal which is supplied to the gate K4 of system clock counter and address generator 308, shown in detail on FIG. 11, thereby causing the high order bit of the address generated by circuit 308 to remain high during the time code DMA procedure which will cause the eight user digits in the upper half of buffer 328 to be placed in CPU memory 150 during a time code DMA procedure.

During normal operation of the circuitry shown in FIG. 5, mode control latch 338 is set by CPU board 148, so as to supply a high signal to the D input of compare enable arm flip-flop 344 included within the compare circuitry 287. As a result of the foregoing, flip-flop 344 is normally set simultaneously with setting of the CTL DMA and time code request flip-flops 340 and 342 after tape position counting circuit 282 has had a chance to count a given control pulse from the respective VTR. When flip-flop 344 is set, it supplies a high signal to a do compare circuit 386 also included within the compare circuitry 287. As is shown on FIG. 10, circuit 386 may include a NAND gate J4 and a flip-flop J6, with one input to NAND gate J4 being the Q output of compare enable arm flip-flop 344 and the other input of this gate J4 being normally connected, through a jumpered connection E—E, to the output of an AND circuit 388. AND circuit 388 has three inputs, one of which is the output of OR gate 366 which is only high when neither the CTL nor the time code DMA procedure is underway. The second input to AND gate 388 is the time code ready signal from flip-flop 318, which is only high if there is an indication that the time code address currently stored in the time code transfer buffer 328 was read with a fairly high probability of accuracy. The third input to AND gate 388 comes from the output of a non-compare count circuit 390 which forms part of the compare circuitry 287 and which has a high value only if that circuit has not detected a discontinuity in the time code addresses being read by time code reader 80. Thus, AND gate 388 will only have a positive output when there is no DMA underway in the circuitry shown in FIG. 5, when the time code ready signal indicates that the time code address in transfer buffer 328 is probably accurate, and when non-compare count circuit 390 has not detected a discontinuity in time code addresses. When all of these conditions are met during a time that compare enable arm flip-flop 344 is set, NAND gate J4 will generate a negative signal to the D input of flip-flop J6 in do compare circuit 386. Just before the beginning of the next 16-phase clock cycle from generator 308, this flip-flop J6 will be set to a low lever by a clocking signal from generator 308. When flip-flop J6 within do compare circuit 386 is set low, its Q output goes high for causing the circuitry of FIG. 5 to enter a do compare mode.

In the do compare mode, the high signal generated at the Q output flip-flop J6 in do compare circuit 386 is supplied to NOR circuit 384, which causes the $\overline{ME}$ $\overline{T.C.T.B}$ signal supplied to the read enable input of transfer buffer 328 to go low. This causes the value of each 4-bit digit within buffer 328 which is addressed by the internal address bus to be placed on the internal data bus.

The high signal on the Q output of do compare circuit 286 is also applied to an enabling input of a compare address circuit 392 which is part of the compare circuitry 287 and which is shown in FIG. 11 to include a NAND gate J1, two NAND gates K3, a NOR gate H7 having both inverting inputs and outputs and a flip-flop H3. The flip-flop H3 is fixed in a set mode at all times except when it receives a high signal from the Q output of do compare circuit 386 in the do compare state. Once the do compare state has been entered, flip-flop H3 is free to have its value reset. The NOR gate H7, since it has both inverting inputs and outputs, is the equivalent of an AND gate, and one of its inputs is the output of a compare digit circuit 394, which is also part of compare circuitry 287. As is described below, the compare enable state lasts for one 16-phase clock cycle. During this clock cycle, each of the 16 digits stored in time code transfer buffer 328 is supplied through the internal data bus to one of the ipputs of compare digit circuit 394. During this same interval, the value of each of eight digits which are successively held in latch circuit 304, is supplied to the other input of compare digit circuit 394 over the CTL data bus. During the compare procedure, the 4-bit address signal generated by the system clock counter and address generator circuit 308 has its high order bit varying at twice the rate at which its three low order bits vary, as has been described above with reference to the operation of tape position counter 282. Thus, during the compare procedure, a different digit is supplied through the internal data bus to one input of compare digit circuit 394 from transfer buffer 328 at every clock phase, with time code address digits from the lower half of transfer buffer 328 being supplied during A clock phases and user digits being supplied from the upper half of buffer 328 during B clock phases. However, as was discussed above with regard to the operation of tape position counter 282, latch 304 only stores values that are supplied to it during the A clock phases. Therefore, the values which are supplied from latch 304 through the CTL data bus to the other input of compare digit circuit 394 only vary at every other clock phase, that is, during A clock phases. The output produced by compare digit circuit 394 during the B clock phases is of no importance because, during these clock phases, circuit 394 is comparing user digits from the upper half of time code transfer buffer 328 with time code address digits from tape position buffer 292. It is only during the A phases of the 16-phase clock signal that time code address values are supplied to compare digit circuit 394 from both the lower half of time code transfer buffer 328 and the lower half of tape position buffer 292. The compare address circuit 392 receives a signal $CK_a$ from generator 308 which is high only during a portion of each A phase of the 16-phase clock signal. As is shown in FIG. 11, this signal $CK_a$ is supplied to one input of a NAND gate K3 whose other input is normally high. Thus, the output of this NAND gate which is supplied as the clocking input of the flip-flop H3, only goes high when the $CK_a$ clock signal goes low at an intermediate portion of each A phase of the 16-phase clock signal. As a result, only the outputs of compare digit circuit 394 which result from the comparison of time code address digits from both time code transfer buffer 328 and tape position buffer 292 are supplied to the flip-flop H3 of compare address circuit 392.

The output of compare digit circuit 394 is high only if both of the digits supplied to it are identical. If the two digits supplied to circuit 394 are not identical, its output will be low and the output of gate H7 will be low. If a low value is clocked into flip-flop H3 of circuit 392, the Q output of flip-flop H3 wil go low and, being connected to an input of gate H7, will prevent the latter from having a high output until flip-flop H3 is set by a low signal on the do compare line at the end of a compare procedure. The system clock counter and address generator 308 also supplies a signal to compare address circuit 392 which is low only when all three of the three low order bits of the address generated by generator 308 are low. This signal is supplied to the input of NAND gate K3 other than the input which receives the $CK_a$ signal, and it prevents the output of compare digit circuit 394 from being clocked into flip-flop H3 during the comparison of the least significant digits, that is, the units frame digit, contained in time code transfer buffer 328 and tape position buffer 292. This prevents minor differences in the time codes addresses stored in buffers 328 and 292 from causing compare address circuit 392 to indicate a non-comparison. However, if there is any non-comparison between any of the other seven digits of the time code addresses which are compared during the compare procedure, that NAND gate K3 of circuit 392 (FIG. 11) which has an input pin (6) will generate a negative non-compare signal at its output during the last phase of the 16-phase clock signal of the compare procedure.

The non-compare output of compare address circuit 392 is supplied as an input to non-compare count circuit 390 which, as can be seen from FIG. 11, includes a counter J3, a flip-flop K2, and a plurality of NAND gates and inverters. The counter J3 in non-compare counting circuit 390 counts the non-compare signals which are generated by compare address circuit 392 at the end of each compare procedure. This counter J3 is reset at the end of any compare procedure for which a non-compare signal is not generated. If the counter J3 in non-compare count circuit 390 attains a count of 10, meaning that 10 successive compare procedures have each resulted in the generation of a non-compare signal, counter J3 will cause non-compare count circuit 390 to generate a time code discontinuity signal which is labeled the $\overline{\text{ERROR}}$ signal.

The $\overline{Q}$ output of do compare circuit 386, which is high during the compare procedure, is supplied to one of the input gates 378C of gate circuit 378 (FIG. 10). Near the end of the 16-phase clock cycle, the high signal generated on the $\overline{Q}$ output of do compare circuit 386 is passed through input gate 378C to the reset of compare enable arm flip-flop 344 for causing the latter to be reset. The resulting low value supplied from the Q output of compare enable arm flip-flop 344 to do compare circuit 386, causes the state of circuit 386 to be changed before the beginning of the next 16-phase clock cycle. As a result, the compare procedure ends after exactly one 16-phase clock cycle.

During normal operation of the circuitry shown in FIG. 5, mode control latch 338 is set by the CPU board 148 to provide a high signal to the D input of update enable arm flip-flop 346 which is part of the update control circuitry 283. Thus, flip-flop 346 is normally set as soon after the receipt of each CTL pulse as tape position counter 282 has had time to count such pulse, and CTL DMA request flip-flop 340, time code DMA request flip-flop 342 and compare enable arm flip-flop 344 are similarly set. As soon as flip-flop 346 is set, it provides a positive input to a do update circuit 396 which is part of the update control circuitry 283 and which may be composed of a NAND circuit L5 and a flip-flop J6 (FIG. 10). The NAND circuit L5 has a first input connected to the Q output of update enable flip-flop 346, a second input connected to the output of AND gate 388 and a third input connected to the $\overline{Q}$ output of compare enable arm flip-flop 344. Thus, the output of NAND gate L5 will only go low under the simultaneous attainment of the following conditions: update enable arm flip-flop 346 has been set, as stated above; compare enable flip-flop 344 has been reset indicating that the compare procedure has been finished; there is no DMA procedure underway; there is no time code discontinuity signal being generated from the output of non-compare count circuit 390; and the time code ready signal is being generated by flip-flop 318 for indicating that the time code address digits in time code transfer buffer 328 have a high probability of accuracy. When all of these conditions are met, do update circuit 396 will have its flip-flop J6 reset at the beginning of the next 16-phase clock cycle for initiating an update procedure.

It should be noted at this point that the non-compare signal generated by compare address circuit 392 is applied to a reset input of update enable flip-flop 346. As is shown in detail on FIG. 10, the pin (6) output of NAND gate K3 in circuit 392 on FIG. 11 is connected through an AND gate L7 to the reset input of update enable flip-flop 346. Thus, the update procedure will not be initiated after the counting of a control pulse if the compare procedure which has taken place immediately therebefore has indicated that the most significant seven digits of the time code address in time code transfer buffer 328 differ from the most significant bits of the time code address stored in the lower half of tape position buffer 292.

When flip-flop J6 of do update circuit 396 is reset, it causes the circuitry of FIG. 5 to perform an update procedure. During such update procedure, the $\overline{Q}$ output of do update circuit 396 is high and the Q output of that circuit is low. Such low signal at the Q output is applied to NOR circuit 384, which causes the output of that NOR circuit, that is, the $\overline{\text{ME T.C.T.B.}}$ line or signal to go low, for causing time code transfer buffer 328 to place onto the internal data bus each of the digits which is addressed by the internal address bus. The high signal generated from the $\overline{Q}$ output of do update circuit 396 is applied through multiplexer 312 to the switching input of multiplexer 302, so as to disconnect from latch 304 the output of EXCLUSIVE OR gate 300 which is normally connected to latch 304 and, in its place, to connect to the input of latch 304, the 4-bit internal date bus which carries the output from time code transfer buffer 328. Thus, during the 16-phase clock cycle of the update procedure, each of the sixteen digits stored within time code transfer buffer 328 is addressed by the 4-bit address signal generated by system clock counter and address generator 308 which is connected through multiplexer 309 to the internal address bus. Each of these digits is then supplied through multiplexer 302 to the input of latch 304. However, the timing of the latching signal supplied to latch 304 from generator 308 through the NORRED AND circuit 310, is such that latch 304 only stores the digits which are read during the A clock phases of the 16-phase clock signal, that is, the time code address digits stored in the lower half of time code transfer buffer 328. During each successive A phase of the 16-phase clock signal, a successive one of the digits of the time code address stored in time code transfer buffer 328 is stored in latch 304 and, thus, is supplied as an input to tape position buffer 292 which stores each such digit at the address supplied to it from the internal address bus upon receiving a $\overline{\text{WRITE CTL}}$ signal from NAND gate 311. Thus, it can be seen that, during the update procedure, each of the eight time code address digits stored in the lower half of the time code transfer buffer 328 is transferred into both the bottom eight digits and the top eight digits of tape position buffer 292.

Near the completion of the 16-phase clock cycle of the update procedure, a signal generated by system clock counter and address generator 308 is applied to a gate 378D (FIG. 10) of gate circuit 378. This causes the positive signal at the $\overline{Q}$ output of do update circuit 396 to be passed through gate circuit 378 to the reset input of update enable arm flip-flop 346 for causing the latter flip-flop to be reset and thereby change the state of its input into the do update circuit 396. At the completion of the 16-phase clock cycle of the update procedure, a signal from system clock counter and address generator 308 clocks do update circuit 396 causing it to change states in accordance with the change in state of update enable arm flip-flop 346, thereby causing the $\overline{Q}$ output of circuit 396 to go low while its Q output goes high for terminating the update procedure.

The circuitry shown in FIG. 5 further includes an AND gate 398, a do display flip-flop 400 and a gate 402, all of which are used for automatically updating the value displayed in tape timer registers 248 on console 114 (FIG. 4) from the time code address value stored in the bottom half of tape position buffer 292. The AND gate 398 which, as is shown in FIG. 10, may include a NAND gate L5 and an inverter H6, has a first input from the output of CTL delay and synchronizing circuit 280, which is always high except during the 16-phase clock cycle in which tape position counter 282 responds to a $\overline{\text{COUNT P}}$ pulse by incrementing or decrementing the value in tape position buffer 292. A second input of AND gate 398 is connected to the $\overline{\text{DMARQ}}$ line which extends from the output of NOR gate 348. The signal on the $\overline{\text{DMARQ}}$ line is always high except when a DMA procedure is being requested either by CTL DMA request flip-flop 340 or time code DMA request flip-flop 342. A third input of AND gate 398 is connected to the display request (DISPRQ) line which goes high when circuitry located on special function board 146 is prepared to update the value on the tape timer register 248 on the console 114, which circuitry on the special function board 146 is described in greater detail in copending applications Ser. Nos. 139,444, 139,448 and 139,747, all filed on Apr. 11, 1980 and all having a common assignee herewith. The output of AND gate 398 is supplied to the D input of do display flip-flop 400. The clocking input of flip-flop 400 is connected to the $\overline{7B}$ output of clock counter and address generator 308 which goes low during the clock-phase 7B, that is, the last clock phase of the 16-phase clock signal. Thus, do display flip-flop 400, which is clocked by the rising edge of the signal supplied to its clocking input, is set at the beginning of the first phase of the 16-phase clock cycle, at which time the $\overline{7b}$ output goes high, provided that the high level of output $\overline{7b}$ occurs while a display request signal is being supplied to time code/CTL board 142 or 144 from special function board 146 and while time code/CTL board 142 or 144 is neither requesting nor performing a DMA procedure and also is not counting a control pulse. When do display flip-flop 400 is set, its $\overline{Q}$ output goes low for providing a do display request signal $\overline{\text{DODISPROQ}}$. When the $\overline{\text{DODISPROQ}}$ signal is low, gate 402 is activated for causing the 4-bit CTL data bus to be connected to a 4-bit display bus which is connected to special function board 146. When gate 402 is activated by the $\overline{\text{DODISPRQ}}$ signal, a $\overline{\text{CK 2}}$ signal from clock counter and address generator 308 is also passed through gate 402 as a DISPLAY CK signal. During the ensuing 16-phase clock cycle, each of the 16 digits in tape position buffer 292 will be placed on the display bus which is connected to the output of gate 402. However, since the $\overline{\text{CK 2}}$ signal is high only during A phase clock signals, special function board 146 will only send the eight time code addresses from the lower half of tape position buffer 292 to the tape timer register 248 associated with the time code/CTL board 142 or 144 which is emitting the $\overline{\text{DODISPRQ}}$ signal.

The circuitry of FIG. 5 also includes a CPU write circuit 404 which, as can be seen from FIG. 10, may include two AND gates L9, and NAND gate K8, and a flip-flop K5. The CPU write circuit 404 can be set to a CPU write state when the output of mode control latch 338, which is connected to is input, is set high. The output of latch 338 is set high by CPU board 148 when the latter writes into mode control latch 338 a group of bits which has a high bit at the bit which is associated with the output connected to CPU write circuit 404.

CPU write circuit 404 is shown to be connected to a switching input of multiplexer 309, to one of the two inputs of the AND gate C4 of system clock counter and address generating circuit 308 (FIG. 11), and to the switching input and at least two of the multiplexed inputs of the multiplexer 312. Further, one output of write CPU circuit 404 is connected to one input of NORRED AND circuit 310.

When write CPU circuit 404 is set to the write CPU state by the output of mode control latch 338, circuit 404 generates a low signal to one of the inputs of AND gate C4 in clock counter and address generator 308. This prevents circuit 308 from counting system clock pulses and causes the 16-phase clock signal to cease being generated. The output from CPU write circuit 404 to the switching input of multiplexer 309 disconnects the output of clock counter and address generator 308 from the internal address bus and instead causes multiplexer 309 to connect the three low order bits of the system address bus to the 4-bit internal address bus. At this time, the 4th bit of the internal address bus is held low through a connection supplied to it by multiplexer 309. In the CPU write state, multiplexer 312 is switched by its connection with CPU write circuit 404, so that the Q output of do update flip-flop 396 is disconnected from the switching input of multiplexer 302 and instead a high signal generated by one output of CPU write circuit 404 is applied to multiplexer 302. Similarly, the switching of multiplexer 312 by CPU write circuit 404 causes the output of the NORRED AND circuit 313 to be disconnected from the input to NAND gate 311, which is used to generate the $\overline{\text{WRITE CTL}}$ signal. Instead, an output from CPU write circuit 404 is applied through multiplexer 312 to such input of NAND gate 311. The output from CPU write circuit 404 which is connected to one input of NORRED AND gate 310 causes the output of that NORRED AND gate 310 to go high, and, as a result thereof, latch circuit 304 latches signals which are supplied to it from multiplexer 302.

In the CPU write state, CPU board 148 can directly introduce a time code address into tape position buffer 292. Once CPU board 148 has caused CPU write circuit 404 to be set in the CPU write state, the system address bus, which is connected to the internal address bus through multiplexer 309 and, thus, to the addressing input of tape position buffer 292, can be used by the CPU to address the memory locations in the bottom half of buffer 292. Similarly, in the CPU write state, CPU board 148 can supply a desired digit to the 4-bit input of tape position buffer 292. At this time, the multiplexer 302 receives a switching input from multiplexer 312 which causes multiplexer 302 to pass to latch 304 the four low order bits of the system data bus, the value of which can be controlled by CPU board 148. Latch 304 also receives an output from NORRED AND gate 310 which causes latch 304 to pass to tape position buffer 292 the value received by latch 304 from the system data bus. Through one of its connections to multiplexer 312, CPU write circuit 404 can also cause an input to be supplied through NAND gate 311 to the write enable input of tape position buffer 292, so as to cause the 4-bit digit supplied to buffer 292 to be recorded at the address determined by the three low order bits of the system address bus. Thus, it can be seen that CPU board 148 can, by causing CPU write circuit 404 to enter the CPU write state, write any selected 4-bit digit into any one of the eight digits stored in the lower half of tape position buffer 292.

The CPU memory board 150 is comprised of circuitry which can contain a plurality of 8-bit memory words which are addressable by the CPU board 148, or by the time code/CTL boards 142 or 144 during DMA procedures. The memory circuitry on board 150 is divided into two basic types, Read Only Memory (ROM) from which data can be read, but into which it cannot be written, and Read/Write Memory, which is commonly called RAM, which stands for Random Access Memory. The ROM memory on CPU memory board 150 is used mainly to store the program which the microprocessor of CPU board 148 executes for the purpose of controlling editing system 100. The RAM memory on CPU memory board 150 is used for the storage of numerical and logical values which can change during the program which the CPU board 148 executes.

Included in the RAM memory of CPU memory board 150 are two 8-byte (one byte equals 8 bits) DMA tape position registers. One of these DMA tape position registers referred to as the play DMA tape position register, is associated with play VTR 118, and it receives the 8-digit time code address which is transmitted to CPU memory board 150 by play time code/CTL board 144 from tape position buffer 292 on the time code/CTL board 144 during the CTL DMA procedure discussed above. The other of the DMA tape position registers is referred to as the record DMA tape position register and receives the 8-digit time code address from tape position buffer 292 on the record time code/CTL board 142 associated with record VTR 102.

Similarly, CPU memory board 150 includes two 8-byte DMA time code registers, namely, a play DMA time code register which, during the time code DMA procedure, receives the 8-digit time code address from time code transfer buffer 328 located on the time code/CTL board 144 associated with play VTR 118, and a record DMA time code register which receives the 8-digit time code address from the time code transfer buffer 328 contained on the time code/CTL board 142 associated with record VTR 102 during the time code DMA procedure from the latter board 142.

During normal operation of editor 110, each of the DMA tape position registers and the DMA time code registers in CPU memory board 150 is updated by the CTL and time code DAM procedures every time that the respective time code/CTL board 142 or 144 counts a control pulse reproduced from the tape in the corresponding VTR. Thus, the value in each of the DMA tape position registers within CPU memory board 150 is identical to the 8-digit time code address in the lower half of tape position buffer 292 on the respective time code/CTL board 142 or 144 except for the brief period that the tape position counter 282 is counting a control pulse.

The CPU memory board 150 also contains a plurality of mark time registers, each of which is capable of storing an 8-digit time code address value. As was discussed above, when mark enable push button 250 (FIG. 4) of either play control section 226 or record control section 228 of the console 114 is actuated, that push button 250 will light, indicating that its associated control section is in the mark enable mode. In the mark enable mode of control section 226 or 228, actuation of in-point push button 254 or out-point push button 258 of that control section will cause the display register 252 or 256 to the immediate left of that push button to receive, by transfer, the value contained with that control section's tape timer register 248.

Similarly, if either the event (1) or the event (2) push button 262 or 266 is pressed or actuated at a time when only one of the control sections 226 and 228 is in the mark enable mode, the current value contained in the tape timer register 248 of that control section will be transferred to the display register 260 or 264 to the immediate left of the push button 262 or 266 which has been actuated. Thus, it can be seen that the in-point and out-point push buttons 254 and 258 of play control section 226, the in-point and out-point push buttons 254 and 258 of record control section 228, and the event (1) and event (2) push buttons 262 and 266, constitute marking push buttons, and their corresponding display registers can be considered as mark time display registers.

There is one mark time register contained within CPU memory board 150 for each of the marking push buttons 254, 258, 262 and 266, and its associated mark time display register 252, 256, 260 or 264 on console 114. Thus, there are on board 150, a play in-point mark time register, a play out-point mark time register, a record in-point mark time register, a record out-point mark time register, an event (1) mark time register, and an event (2) mark time register. The value displayed in each of the mark time display registers on console 114 is supplied thereto from the corresponding mark time register in CPU memory board 150 by means of CPU board 148 and the console interface contained in special function board 146, as is explained in greater detail in the copending applications, Ser. Nos. 139,444, 139,448 and 139,747. Thus, normally, the values displayed in mark time display registers 252, 256, 260 and 264 on console 114, are identical with those contained in the corresponding mark time registers contained within CPU memory board 150.

The CPU memory board 150 further contains a group of memory addresses, called a control block, associated with each of the VTRs used by the editing system 100. Each of these control blocks within the CPU memory board 150 contains a control block tape position register for copying and storing a tape position value from the DMA tape position register corresponding to the same VTR. Similarly, each control block contains a control block time code register for copying and storing a time code address value from the DMA time code register associated with the same VTR. Each control block also includes a register for storing a value which, as is explained in greater detail below, is equal to the difference between the value in the control block tape position register and the control block time code register. Each control block also contains a pre-roll address register which is to store the address, located several seconds before the inpoint of an edit, to which a VTR is to search before it performs a preview or edit, so that each VTR involved in an edit will have an opportunity to achieve synchronization with the other VTRs involved in that edit before it reaches the address at which the edit is to begin. The control block also includes each of the mark time registers associated with its VTR and it includes a plurality of single bit variables, called flags, which are capable of indicating whether a given condition is true or false. These flags include a DTC (Discontinuity-Time Code) occurred flag, a DTC expected flag, a DTC error flag, a forward flag, a search error flag, and an address error flag. The function of these flags will be explained below.

Figure 15:
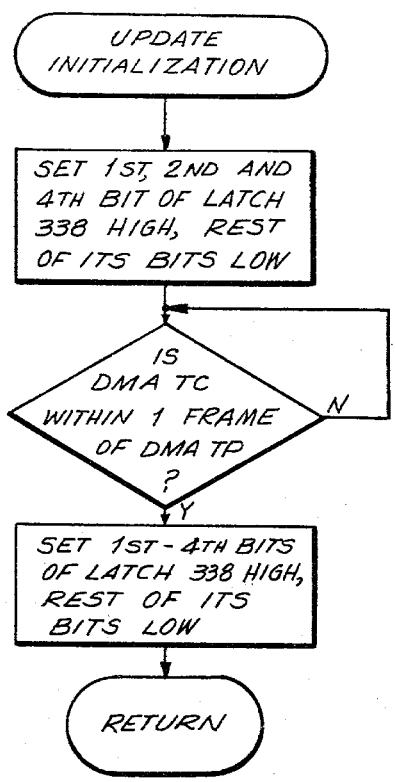
FIG. 15 is a flow chart outlining steps taken by a CPU board of FIG. 3 to initialize the time code/CTL board shown in FIGS. 3 and 5.

Referring now to FIG. 15, a flow chart is there shown wich sets forth a series of steps, or a subroutine, performed by the microprocessor on CPU board 148 under the influence of a program written in the read only memory (ROM) contained in CPU memory board 150. The subroutine, or series of steps shown in FIG. 15, is executed, or called, when a given one of the VTRs in video tape editing system 100 is first set to a play, fast forward, or reverse mode. When this subroutine is called, CPU board 148 causes the six low order bits of the system data bus which it controls to have only bit zero, bit one and bit three high and bit two, bit four and bit five low. At the same time, it causes the $\overline{I/O\ W}_1$ line to briefly change states so as to cause mode control latch 338 on the machine time code/CTL board 142 or 144 to latch the six low order bits on the system data bus. This causes the first, the second, and the fourth bit of the latch 338 to be high, and the remainder of its bits to be low. This, in turn, causes mode control latch 338 to supply a positive signal to the D inputs of CTL DMA request flip-flop 340, time code DMA request flip-flop 342 and update enable arm flip-flop 346, but it causes the D input to compare enable arm flip-flop 344 to be low. As a result of this state in mode control latch 338, the circuitry on the respective time code/CTL board 142 or 144 will be in the update enabled state, but not in the compare enabled state.

In such update enabled state of time code/CTL board 142 or 144, the latter responds to a $\overline{CTLP}$ pulse received from its associated VTR interface board 116 or 126 as a result of the reading of the control pulse on its associated VTR 102 or 118 by counting that $\overline{CTLP}$ pulse in its tape position counter 282, by transferring the value reflecting that counting from tape position buffer 292 to the DMA tape position register contained within CPU memory board 150, and by transferring the value in time code transfer buffer 328 to the DMA time code register within CPU memory board 150 by means of a time code DMA procedure and, if the time code ready signal generated by time code sensing circuit 286 indicates that the value in the time code transfer buffer has a high probability of having been read correctly from the tape in its associated VTR, also to tape position buffer 292 by means of an update procedure. Further, in the update enable state of time code/CTL board 142 or 144, compare circuitry 287 is purposely disabled by the low setting of the third bit of mode control latch 338 in order to keep that compare circuitry 287 from preventing the update procedure in which the value of tape position buffer 292 is set with the address contained within time code transfer buffer 328. When compare circuitry 287 is enabled, the output at the pin (6) of NAND gate K3 (FIG. 11) of compare whole code circuit 392 causes update enable arm flipflop 346 to be reset, thus preventing an update procedure any time that the top seven digits of the time code address contained within time code transfer buffer 328 differ from the top seven bits of the time code address contained within the bottom half of tape position buffer 292. Therefore, at a time when the time code address values contained within time code transfer buffer 328 and tape position buffer 292 differ by a significant amount, such as would normally occur when a video tape was first placed within a VTR associated with time code/CTL board 142 or 144, compare circuitry 287 must be disabled to enable update control circuitry 283 to allow the value in tape position buffer 292 to be initially set to the current time code address contained within time code transfer buffer 328.

As is shown in FIG. 15, once CPU board 148 has set the first, second and fourth bits of mode control latch 338 high and its remaining bits low so as to enable the update procedure but disenable the compare procedure, the CPU then repeatedly compares the values in the DMA time code register and the DMA tape position register on CPU board 150. The CPU continues repeatedly comparing the values in these two DMA registers until they differ by no more than one frame. When this condition is met, it is established that the value in tape position buffer 292 has been updated from the value in time code transfer buffer 328 and compare circuitry 287 can be enabled. Thus, at this point, CPU board 148 writes a new group of bits in mode control latch 338 which causes the first through fourth bits of that latch to be high and the rest of the bits of that latch to be low. This causes the associated time code/CTL board 142 or 144 to be compare enabled as well as update enabled so that upon the subseqent receipt by that time code/CTL board of a $\overline{CTLP}$, the CTL and time code DMA procedures will take place as well as the compare and update procedures. Once mode control latch 338 has been set so that its first four bits are high, the subroutine shown on FIG. 15 is complete and the CPU on board 148 leaves that subroutine by returning to the sequence of steps it was performing before that subroutine was called.

Once a time code/CTL board 142 or 144 has been initialized by the subroutine of FIG. 15, it is in a condition to detect discontinuities in the time code recorded upon a length of video tape in its associated VTR. When the tape in that VTR is moved, one $\overline{CTLP}$ pulse is supplied to the time code/CTL board every time that the tape is moved by one frame in the forward or reverse direction. After the $\overline{CTLP}$ pulse is counted by tape position counter 282 and the values in tape position buffer 292 and time code transfer buffer 328 are transferred by the DMA procedure to CPU memory board 150, circuitry 287 compares the value in time code transfer buffer 328 with the value in tape position buffer 292. If any of the seven most significant digits of the time code address value in buffer 328 differ from the seven most significant digits of the time code address in the bottom half of buffer 292, compare whole code circuit 392 emits a non-compare signal from pin (6) of its NAND gate K3 (FIG. 11). This signal is counted by counter J3 (FIG. 11) of non-compare count circuit 390 and is also supplied as a resetting input to update enable arm flip-flop 346 so as to prevent the update procedure from taking place. Because update enable arm flip-flop 346 is disabled at this time, the time code address in tape position buffer 292 is not updated and it represents a counted tape position value equal to the time code address with time code transfer buffer 382 at the last time an update procedure took place, plus or minus (depending upon the direction of tape travel in the associated VTR) the number of $\overline{CTLP}$ pulses which have been received since that last update procedure.

Figure 16A:
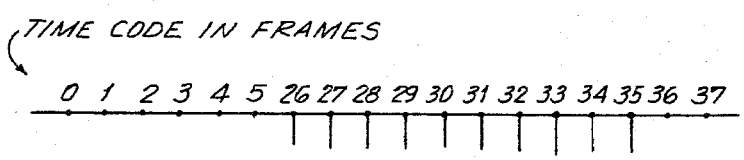
FIGS. 16A and 16B form a graphic representation of time code and tape position values produced by the time code/CTL board of FIGS. 3 and 5 during the detection of time code discontinuity.
Figure 16B:
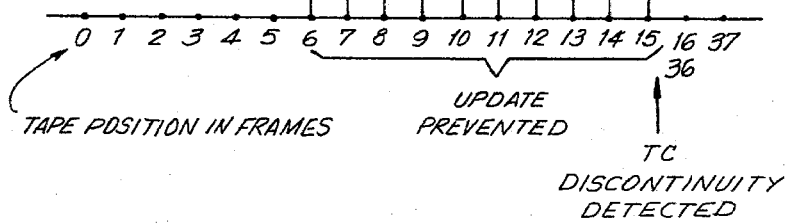

An example of the relationship between the values in time code transfer buffer 328 and tape position buffer 292 during the detection of a time code discontinuity will now be described with reference to FIGS. 16A and 16B which show only the frame numbers of the time code addresses involved in such example. FIG. 16A shows the frame numbers of the time code address in time code transfer buffer 328 and FIG. 16B shows the frame numbers of the time code address in tape position buffer 292. Before a time code discontinuity is encountered, the values in time code transfer buffer 328 and tape position buffer 292 are equal. For example, at the time 01 hours, 00 minutes, 00 seconds and 00 frames, which is identified simply as 0 on FIGS. 16A and 16B, the values in buffers 328 and 292 are 0, that is, these two values are equal. Upon the reading of each successive $\overline{CTLP}$ pulse, the value in tape position buffer 292 is increased by one in response to the counting of that CTLP pulse because, in the present example, the tape is assumed to be moving in a forward direction. Similarly, the time code address in time code transfer buffer 328 is increased by one for each $\overline{CTLP}$ pulse received because the time codes recorded on the tape normally increase by one for each frame. Thus, when comparing circuit 287 compares the seven most significant digits in time code transfer buffer 328 and tape position buffer 292, it determines that those digits are equal and, thus, circuit 287 does not prevent the update procedure from taking place and the value in time code transfer buffer 328 is transferred to tape position buffer 292. Therefore, even if the value in tape position buffer 292 had varied slightly from that in time code transfer buffer 328 before the update procedure, the two values are made to be identical by the update procedure. This procedure continues with the value in tape position buffer 292 being equal, or made to be equal, to the value in time code transfer buffer 328 until a time code discontinuity is encountered. In FIG. 16A, a discontinuity is indicated at the point where the time code address of 01 hours, 00 minutes, 00 seconds, and 26 frames follows immediately after the time code address of 01 hours, 00 minutes, 00 seconds, and 5 frames. Shortly after this discontinuity is encountered, the value in time code transfer buffer 328 will have a frames value of 26 whereas the time code address in tape position buffer will have a value of 6. Since the seven most significant digits of these two time code address values differ, compare circuit 292 emits a non-compare signal from pin (6) of its NAND gate K3 (FIG. 11), and such non-compare signal is counted by count circuit 390 which also prevents update control circuitry 293 from performing an update. Thus, the value in tape position buffer 292 is a counted time code address value counted relative to the time code address (01 hours, 00 minutes, 00 seconds, and 05 frames) supplied to buffer 292 in the last update procedure. As each of the nine succeeding $\overline{CTLP}$ pulses is counted, a non-compare signal is generated by compare circuit 392 so that, throughout this period, the update procedure is prevented and, thus, the value in tape position buffer 292 continues to differ from that in time code transfer buffer 328. After ten non-compare signals have been generated by circuit 392, counter J3 (FIG. 11) within count circuit 390 attains a value of 10 and indicates the detection of a time code discontinuity by generating two time code discontinuity signals, a low signal on the $\overline{ERROR}$ line and a low signal on a time code interrupt line INTRTC.

The purpose of requiring that ten non-compare signals be counted before either of the time code discontinuity signals are generated is to avoid mistaking a temporary misreading of time code values for a time code discontinuity. Only the seven most significant digits of the time code addresses contained within time code transfer buffer 328 and tape position buffer 292 are compared to prevent a false indication of a time code discontinuity upon an occasional miscounting of control pulses, such as may occur if a control pulse is moved past the control pulse reading head of the VTR at a very low speed in the jog mode, or in the process of stopping or starting or reversing the direction of tape movement. The circuitry of FIG. 5 normally requires that the time code addresses in tape position buffer 292 and time code transfer buffer 328 differ by a value of at least ten for a time code discontinuity signal to be generated. It is true that a difference of less than ten can cause a non-compare signal to be generated by circuit 292, but it is unlikely that such smaller difference will cause a non-compare signal to be generated for ten successive frames. For example, if the frames value of the time code address in time code transfer buffer 328 has a value of 10 and the frames value in time code address in the tape position buffer 292 has a value of 09, the tens frame digits of these two addresses are different and, therefore, circuit 392 generates a non-compare signal. However, at the next frame, the value in tape position buffer 292 is incremented by one to the frame value 10, and the value in time code transfer buffer 328 is also incremented by one to the frame value 11 so that no non-compare signal is generated by circuit 392. Since it is unlikely that, under normal operating conditions, an actual time code discontinuity of ten or less frames will occur, the inability of the circuitry of FIG. 5 to respond to such small time code discontinuities is not a significant disadvantage.

When a time code discontinuity is detected by count circuit 390, the low value on the $\overline{\text{ERROR}}$ line prevents do transfer flip-flop 332 from causing any new values to be written into time code transfer buffer 328. The low value on the $\overline{\text{ERROR}}$ line, through its input to the AND gate 388, also prevents the performing of either the compare procedure or the update procedure. Also, the low value on the $\overline{\text{ERROR}}$ line, through its connection to NORRED AND circuit 313, prevents the value in the upper half of tape position buffer 292 from being changed.

The low value provided on the interrupt line INTRTC upon the detection of a time code discontinuity is supplied, as a reset input, to mode control latch 338 and the counter J3 within count circuit 390, as an interrupt signal to the microprocessor on CPU board 148. The resetting of mode control latch 338 as a result of the low value on interrupt line INTRTC prevents CTL and time code DMA procedures and also compare and update procedures from taking place until CPU board 148 has had time to respond to a time code discontinuity signal by storing, in the appropriate control block on CPU memory block 15, the values then appearing in the DMA time code and DMA tape position registers, and further has set the bits in mode control latch 338.

When mode control latch 338 is reset by the low signal on the interrupt line, INTRTC, the resulting low signal on the third output line COMPA (FIG. 10) of latch 338 causes the inverter K1 in counting circuit 390 (FIG. 11) to have a high output, which, in turn, causes the NAND gate K3 to have a low output at the next phase 7a of the 16-phase clock cycle. Such low output from NAND gate K3 resets the flip-flop K2 of counting circuit 390 so that the $\overline{\text{ERROR}}$ line goes high, thereby ending the generation of signals associated with the detection of a time code discontinuity until counter J3 within counting circuit 390 again counts ten non-compare signals.

The low level or interrupt signal provided on line INTRTC by count circuit 390 is also supplied to an interrupt handling circuit located on special function board 146. Such interrupt handling circuit on board 146, may be of a type well known in the art of interfacing microprocessors to peripheral devices. Its function is to receive the interrupt signal from the line INTRTC and to respond to it by providing an interrupt signal and a corresponding subroutine address to the microprocessor on CPU board 148. The interrupt signal from the interrupt handling circuit causes the microprocessor to stop performing the series of instructions then being worked upon at the completion of the instruction then in process, and to start the execution by the microprocessor of the subroutine at the subroutine address also supplied to the microprocessor from the interrupt handling circuit.

Figure 17:
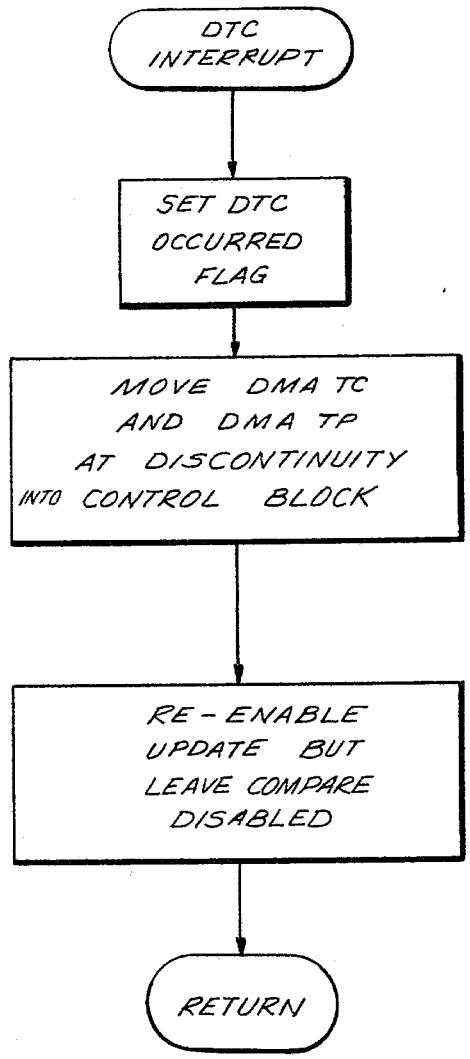
FIG. 17 is a flow chart of an interrupt subroutine which can be carried out by the CPU used with the present invention.
Figure 18:
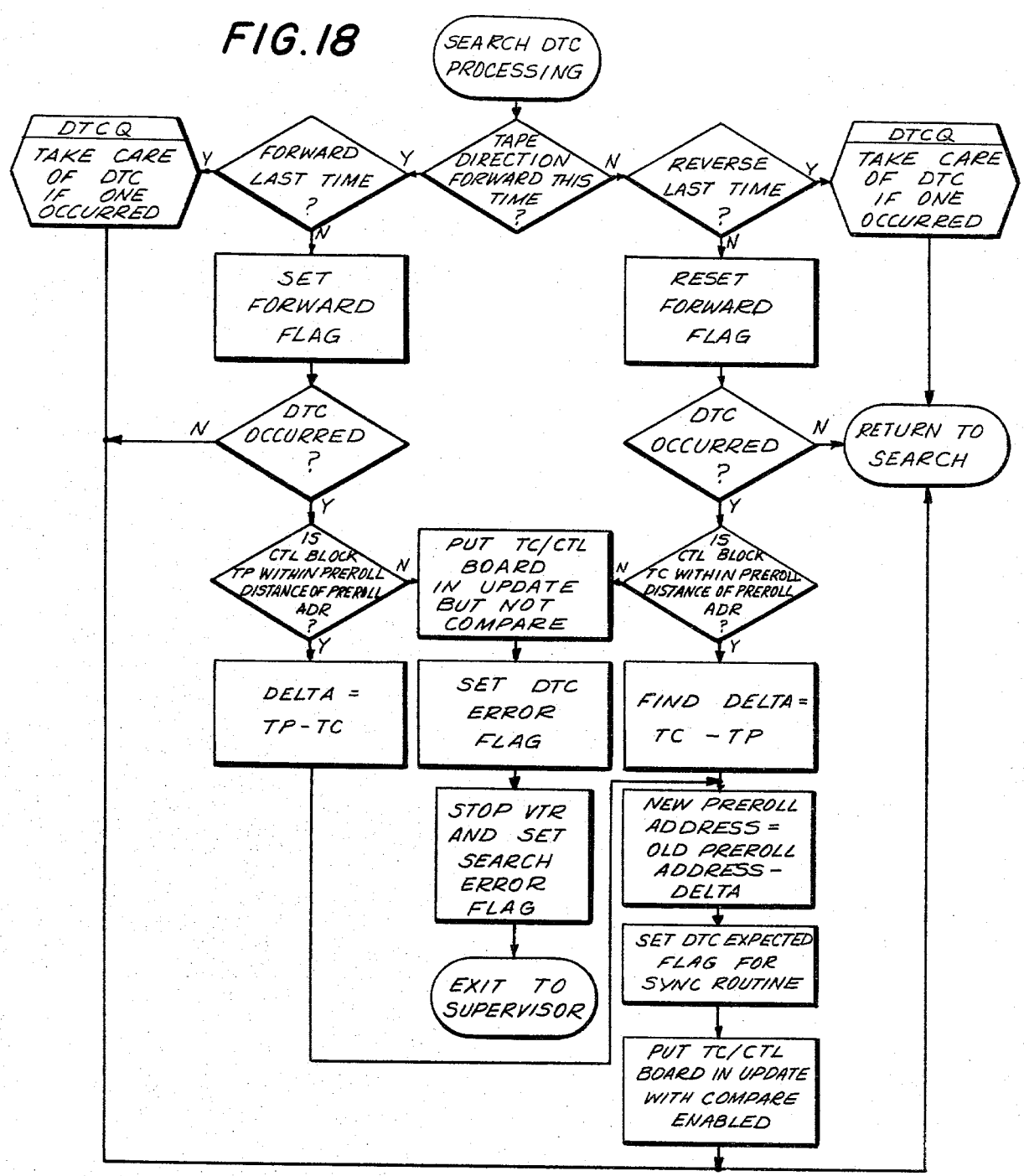
FIG. 18 is a flow chart of a portion of the subroutine carried out by the CPU when executing a pre-roll search, used with the present invention.
Figure 19:
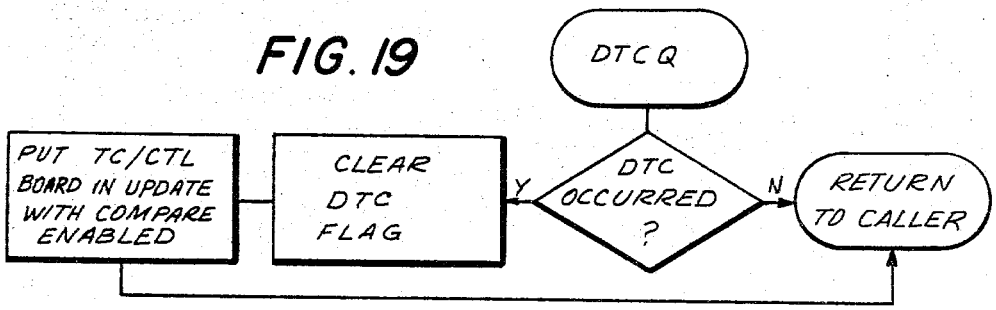
FIG. 19 is a flow chart of another portion of the subroutine carried out in a pre-roll search.

Referring now to FIGS. 17-19, flow charts are there shown which outline steps by which CPU board 148 can use the circuitry of FIG. 5 and the other components of video tape editing system 100 to handle or compensate for time code discontinuities. These flow charts represent only one of the many ways in which the circuitry of FIG. 5 can be used to handle such time code discontinuities.

FIG. 17 outlines the steps which are taken by CPU board 148 in response to the generation of the interrupt signal on line INTRTC at the time that count circuit 390 detects a time code discontinuity. As earlier noted, when such an interrupt signal is generated, the microprocessor on CPU board 148 temporarily stops performing whatever program it was executing, and in response to the subroutine address supplied to it by the interrupt handler on special function board 146, performs the DTC interrupt subroutine shown in FIG. 17.

Upon entering the DTC interrupt subroutine CPU board 148 sets a DTC occurred flag, which is a bit in the control block of CPU memory board 150 which indicates, when it has been set, that a discontinuous time code signal has been generated by the time code/CTL board 142 and 144 associated with the respective control block. Then the CPU moves the values in the DMA time code register and the DMA tape position register to the control block time code register and the control block tape position register, respectively, associated with the same VTR. This is done so that the current time code address contained within time code transfer buffer 328 and the counted tape address contained within tape position buffer 292, and, which both existed just before the generation of the time code discontinuity signal and were stored by the CTL and time code DMA procedures in the DMA tape position and DMA time code registers on CPU memory board 150, can be saved for further calculation by the CPU. Once this has been done, the CPU uses mode control latch 338 to re-enable update control circuitry 283 and to keep compare circuit 287 disabled. Then the CPU returns to the sequence of instructions it was performing before the DTC interrupt occurred. The update control circuitry 283 is re-enabled so that the value in tape position buffer 292 will thereafter reflect the values of each time code address actually being read from its associated video tape by time code reader 80. The compare circuit 287 is not re-enabled at this time, so as to make sure that the values stored in the control block tape position and the time code registers will not be overridden in response to a subsequent DTC interrupt until the CPU has had a chance to process the information currently stored in those registers.

Referring now to FIG. 18, it will be seen that the flow chart thereon illustrates a search DTC processing subroutine. The search DTC processing subroutine is part of the preroll search subroutine which is called by the CPU to cause a VTR to locate itself, before an edit or a preview operation of the editing system 100, at a preroll address a specified preroll distance before the edit in-point selected for that VTR. For example, if an operator of the video editing system 100 has set up an edit by defining a record in-point, a record out-point and a play in-point, and then actuates both preview button 278 and record button 276 on console 114, both the play and the record VTRs 118 and 102 will be made to search to respective preroll points a specified distance before the respective in-points defined by the values in the play in-point mark time register and the record in-point mark time registers contained within the control blocks respectively associated with the play and record VTRs. When the editing system 100 is in the preroll search mode, the CPU will call the preroll search subroutine in association with each VTR approximately once every thirtieth of a second. The preroll search subroutine includes the search DTC processing subroutine on FIG. 18 and a trajectory subroutine (not shown). Briefly described, the trajectory subroutine compares the value in the DMA tape position register associated with the VTR in question with the preroll address contained within the control block associated with that VTR. Based on the difference between these two values, a command is given to the associated VTR which causes it to move toward the preroll address at a speed which decreases as the difference between these two values decreases. For example, if the difference between the preroll address and the value in the DMA tape position register is greater than five minutes, the tape moves toward the preroll address either at fast forward or fast reverse or rewind, and, as the difference between these two values decreases the VTR slows down and finally comes to rest when the difference between these two values approaches zero.

The search DTC processing subroutine outlined in FIG. 18 is designed for use with a video tape which, even at its time code discontinuities, contains only monotonic time codes, that is, a tape in which the time code address of each frame is greater by one or more frames than the time code address of the preceding frame. A tape containing such monotonic time code discontinuities will result if a series of video sequences are assemble edited onto a tape within a given day, using a standard time code generator of the type which is contained in many professional VTRs to generate the time code associated with each video sequence as it is recorded or assembled onto the tape. Most time code video editing systems cannot handle monotonic time code discontinuities at all, but rather can only reliably operate upon video tapes which have been assemble edited in conjunction with a jam sync time code generator that ensures that the time code addresses of each video segment assembled onto a tape are a sequential continuation of the immediately preceding time code address recorded on that tape. Although jam sync time code generators prevent time code discontinuities from arising, they are expensive and complicated pieces of electronic equipment. The standard time code generator which is included in most broadcast quality VTRs does not have the capability of preventing monotonic time code discontinuities from occurring, but it quite easily can be used to ensure that the initial time code address recorded with each additional video sequence on a tape is greater than the last time code address of the video sequence which preceded it.

The first step upon entering the DTC processing subroutine of FIG. 18 involves a determination of whether or not the difference between the preroll address being sought by the preroll search subroutine is greater or less than the current tape position indicated by the value in the DMA tape position register. If the preroll address is greater than the tape position address, the CPU indicates that the VTR should move in a forward direction. If the preroll address is less than the tape position address, the CPU indicates that the VTR should move in a reverse direction. If the value of the preroll address is greater than the value in the DMA tape position register, the CPU then determines whether or not the forward flag is set within the control block associated with the VTR for which the search processing subroutine has been called. If such forward flag has been set, the indication at this point in the flow chart on FIG. 18 is that, if any time code discontinuities have occurred, they are insignificant because the search processing subroutine has no reason to believe that the preroll address contained within the preroll address register cannot be found by continuing in its present direction. Thus, at this point, the DTCQ subroutine of FIG. 19 is called. This subroutine reads the DTC occurred flag to determine if a DTC interrupt has occurred since the last time that the DTC processing subroutine of FIG. 18 was called. If the DTC occurred flag is not set, indicating that no DTC interrupt has occurred since the last time that the search DTC processing subroutine was called, the CPU returns to the caller of the DTCQ subroutine, that is, to the DTC processing subroutine of FIG. 18, at which time the CPU then exits the search DTC processing subroutine by returning to the preroll search subroutine which called the DTC processing subroutine. It should be noted that the above described path through the search DTC processing flow chart in FIG. 18, and in which the CPU determines that the search address is greater than the DMA tape position address, that the forward flag has been set and that, upon calling the DTCQ subroutine, the DTC occurred flag has not been set, is the path which will normally be taken by the CPU when it calls the DTC processing subroutine while a tape is traveling in a forward direction toward a preroll address.

If, however, the DTCQ subroutine of FIG. 19 determines that the DTC occurred flag has been set, that DTC occurred flag is cleared and then the bits within mode control latch 338 are set so that the time code/CTL board 142 or 144 which issued the interrupt signal has both its update control circuit 283 and its compare circuit 287 enabled, whereupon the CPU returns to the caller of the DTCQ subroutine, that is, to the DTC processing subroutine, and then exits from the DTC processing subroutine by returning to the preroll search subroutine. After the return to the preroll search subroutine at this time, the preroll search subroutine calls the trajectory subroutine, which determines if the speed of the VTR should be decreased.

FIGS. 20A and 20B illustrate an example of a situation in which the DTCQ subroutine of FIG. 19 is used to clear a DTC occurred flag after the DTC processing subroutine has determined that a time code discontinuity is insignificant. FIG. 20A represents the seconds values only of time codes which would exist on a video tape in the absence of any discontinuities. FIG. 22B similarly represents the time codes upon a tape in which a discontinuity exists at the address of 05 seconds, that is, the address of 05 seconds is immediately followed by an address of 15 seconds, thereby indicating that a time code gap of ten seconds constitutes the discontinuity. In FIGS. 20A and 20B, it is assumed that the preroll search subroutine is searching for a preroll address calculated in relation to an in-point of 30 seconds. If it is assumed that the video editing system 100 has been set to have a ten second preroll time, then the CPU will calculate the preroll address to be 20 seconds. Therefore, the preroll address register in the control block associated with the VTR having an in-point of 30 seconds will be set to a value of 20 seconds. If, for example, at the time the search commences, the VTR is located at the address of 00 seconds, then, as is indicated on FIG. 20A, if there was no time code discontinuity, the VTR would locate the tape at the address of 20 seconds merely by moving the tape a distance corresponding to 20 seconds. However, as is shown in FIG. 20B, because of the ten-second time code discontinuity located between the address values of 05 seconds and 15 seconds, the actual distance between the preroll address of 20 seconds and the start address of 00 seconds is only a distance corresponding to ten seconds. As the VTR moves the tape during the search program from the location of 00 seconds toward the calculated preroll address of 20 seconds, the CPU will repeatedly find, upon entering the DTC processing subroutine, that the tape direction should be forward and that the forward flag has previously been set. Therefore, the CPU will call the DTCQ subroutine and, in most instances, it will find that no DTC occurred flag has been set and will merely return to the DTC processing subroutine and then, in turn, to the preroll search subroutine. In the course of the preroll search subroutine, the CPU will call the trajectory program to control the speed at which the VTR approaches the search address of 20 seconds. However, when the CPU first enters the DTC processing subroutine after the discontinuity shown in FIG. 20B has caused a DTC interrupt to occur, the CPU will find, upon calling the DTCQ subroutine, that the DTC occurred flag has been set. However, as has been explained above, the CPU will clear that DTC occurred flag and put the time code/CTL board in both the update and the compare modes, so that it can detect any subsequent time code discontinuities. As is shown in FIG. 20B, the DTC occurred flag can be cleared because the discontinuity is of no significance, that is, it does not require that the calculated preroll address contained within the preroll address register of the control block be changed, since it does not indicate that the calculated preroll address does not exist on the video tape.

If, however, upon entering the DTC processing subroutine, the CPU finds that the preroll address is greater than the present DMA tape position register address, but that the forward flag has not previously been set, it is thereby indicated that the trajectory subroutine has caused the VTR to overshoot the calculated preroll address, or that the calculated preroll address does not exist. In each of the foregoing cases, the CPU will cause the forward flag to be set and then will read the DTC occurred flag to determine whether a DTC interrupt has occurred since the last time that the DTC processing subroutine was called. If the DTC occurred flag has not been set, there is an indication that no time code discontinuity exists and thus, the trajectory program has caused the DTR to overshoot the calculated preroll address. If this case has occurred, the CPU returns to the preroll search routine to continue the search under the control of the trajectory subroutine which is called next. If, on the other hand, the DTC occurred flag is set at this point, there is an indication that the calculated preroll address does not exist. Such a situation is demonstrated in FIGS. 21A and 21B, in which FIG. 21A is the same as FIG. 20A, and it is assumed that the desired in-point for the edit is at 30 seconds so that, since the preroll duration for the machine is assumed to be ten seconds, the calculated preroll address is at 20 seconds. FIG. 21B is again a diagram of the time code addresses on a tape containing a ten-second time code discontinuity, or gap, but with such gap being between the addresses of 15 seconds and 25 seconds. Thus, it can be seen that the calculated preroll address of 20 seconds does not exist on the tape shown on FIG. 21B. If it is assumed, for example, that the VTR starts from the address of 40 seconds and attempts to find the calculated preroll address of 20 seconds, the CPU will find, upon entering the DTC processing subroutine, that the preroll address is less than the address contained in the DMA tape position register, and thus, it will indicate that a reverse tape direction is required, and then it will ask whether the forward flag is set or reset. Until the discontinuity shown on FIG. 21B is encountered, the CPU will find on all of its calls to the DTC processing subroutine that the forward flag has been reset and thus it will call the DTCQ subroutine and it will return from that subroutine and then to the preroll search subroutine, so that the trajectory subroutine can be called and so that the speed of the VTR can be controlled as a function of the calculated distance of the preroll address. However, upon crossing of the discontinuity shown in FIG. 21B, a DTC interrupt occurs and the value in tape position register 292 is updated so that the CPU will find, upon entering the DTC processing subroutine, that the address in the DMA tape position register is 15 seconds, which is less than the address of 20 seconds in the preroll address register. Thus, the CPU will determine that the machine should be moving in a forward direction. However, upon reading the forward flag, the CPU will find that such flag is reset indicating that the last time the DTC processing subroutine was called the CPU calculated that the flag should by moving in a reverse direction. At this point, the CPU sets the forward flag and asks whether or not the DTC occurred flag has been set. Since a discontinuity has been detected at this point, the DTC flag will have been set, indicating that the reversal of calculated tape direction is not due to an overshooting of the calculated preroll point, but rather due to the fact that the calculated preroll point is an imaginary address which does not exist because of the detected time code discontinuity.

At this stage, the CPU determines whether the value contained within the control block tape position register is within the preroll distance from the address in the preroll address register. In the present example, this would be a test of whether or not the value in the control block tape position register is within ten seconds of the calculated preroll address of 20 seconds, and such would be the case for the following reasons:

Unlike the value in the DMA tape position register, the value in the control block tape position register is not updated after the DTC interrupt subroutine shown in FIG. 17. Thus, the control block tape position register records the value that the tape position buffer 292 had at the time that the time code discontinuity signal was generated by the count circuit 390. This value is a counted tape position address counted relative to the time code addresses which were read by the time code reader 80 before the time code discontinuity caused non-compare signals to be generated by compare circuit 392. In the present example, the value recorded by the control block tape position register will be an address very close to 25 seconds and will differe by less than ten seconds from the value of 20 seconds contained in the preroll address register.

The CPU makes the above test because, if, after a discontinuity indicating that a calculated preroll address is imaginary, the address contained within the control block tape position register differs from the value in the preroll address register by more than the preroll distance at a time when the VTR is traveling in a reverse direction, then it can be determined that the in-point itself is also imaginary.

FIGS. 22A and 22B ilustrate such an example in which the in-point used in a preroll search is imaginary. FIG. 22A again illustrates the seconds values of the time codes contained on a tape not having a time code discontinuity, and FIG. 22B illustrates the seconds values of time codes on a tape having a time code discontinuity between the addresses of 10 seconds and 40 seconds. The example of FIGS. 22A and 22B assumes that an in-point address of 30 seconds has been selected and that the resulting calculated preroll address is 20 seconds. Upon searching for that preroll address in a reverse direction from a starting address of 50 seconds, and until the time code discontinuity shown on FIG. 22B has been crossed, each call to the DTC processing subroutine will result in a determination that the tape is moving in a reverse direction, that the forward flag has previously been reset, and that no DTC occurred flag has been set. Once the time code discontinuity shown in FIG. 22B has been detected and crossed, the next call to the DTC processing subroutine results in a determination of a forward tape direction, that is, the preroll address is greater than the DMA tape position address, that the forward flag is not set, that the DTC occurred flag was set, and that the value in the control block tape position register, a value close to 40 seconds, is not within 10 seconds of the calculated preroll address of 20 seconds. This last determination indicates that the in-point address of 30 seconds does not exist on the tape shown on FIG. 22B.

The subroutine contained in FIG. 18 is not designed to handle imaginary in-point addresses, because any in-point determined directly by use of marking push buttons 254 on console 114 will necessarily be real in-point addresses. Thus, if the CPU determines at this point that the value contained within the control block tape position register is not within the preroll distance from the preroll address, the time code/CTL board 142 or 144 is placed in the update mode, so that the value in tape position register 292 and shown on associated tape timer register 248 will continue to reflect the time code values read from the tape. However, the CPU does not enable compare circuitry 287, since at this time it it proceeding to abort the preroll search process and, thus, there is no reason to detect further time code discontinuities. The CPU continues to abort the preroll search by setting the DTC error flag, stopping the VTR for which the selected in-point address has been found to be imaginary, and setting the search error flag. After all this has been done, the CPU exits the DTC processing subroutine by jumping, or going directly to, the supervisor program. The DTC error flag and the search error flag are read by the preview/record routine and, in response to those flags, the mark enabled button 250 on console 114 which is associated with the VTR for which the search error has been detected is made to blink for indicating to the operator that the requested preroll search cannot be performed.

However, if, as in the example of FIGS. 21A and 21B, the value in the control block tape position register, after the discontinuity, is within the preroll distance of the preroll address, the CPU will then subtract the address stored in the control block time code register from the address stored in the control block tape position register to produce a value which will be stored in a delta register within the same control block. This value, which is the difference between the current time code address at the time of detection of the time code discontinuity which is stored within the control block time code register and the current counted tape address at the time of the time code discontinuity which is stored in the control block tape position register, indicates the time code address shift which results from the detected discontinuity. In the example of FIGS. 21A and 21B, the value of is ten seconds.

It should be noted that the values stored within the control block tape position and time code registers will normally be ten frames greater or less than, depending on the direction of tape movement, the actual values in tape position buffer 292 and time code transfer buffer 328, respectively, at the actual time code discontinuity. This results from the fact that count circuit 390 does not generate a time code discontinuity signal until ten frames after the first non-compare signal is generated by compare non-compare signal is generated by compare circuit 392. It should be noted that this difference of ten frames is of no significance in the calculation of the value.

Once $\Delta$ has been calculated, the CPU then sets the value in the preroll address register to the old value in that preroll address register minus the value of $\Delta$. As stated above, in the example of FIGS. 21A and 21B, the value of $\Delta$ is 10. Thus, the former preroll address value of 20 seconds is changed to a new preroll address value of 10 seconds. Then, the CPU sets the DTC expected flag for use in a subroutine which is employed during the period in which each of the VTRs moves from its preroll position toward its in-point while the two VTRs involved in an edit seek to attain synchronization with each other. The DTC expected flag is set so that the subroutine will know what a discontinuity occurs between the preroll point and the in-point and can act accordingly. After this has been done, the CPU sets time code/CTL board 142 or 144 so that both update control circuitry 283 and compare circuitry 287 are enabled and, thus, the value in tape position buffer 292 will be an accurate reflection of the time codes being read from the tape and any subsequent discontinuity can be detected. Then the CPU exits from the DTC processing subroutine and retuns to the preroll search subroutine, at which point the trajectory subroutine will be called to make any required corrections in the speed of the VTR.

As can be seen from the flow chart of FIG. 18, the DTC processing subroutine is quite symmetrical with regard to search direction. For example, if a search is being conducted for the calculated preroll point of 20 seconds, as in FIGS. 21A and 21B, starting from a location of 00 seconds, until the discontinuity shown in FIG. 21B is crossed, each time the DTC processing subroutine is called, the CPU will determine that the preroll address is greater than the DMA tape position register address, and that the tape movement should be in the forward direction, and that the forward flag has previously been set. As a result of the foregoing, the CPU will call DTCQ and return to the calling program, so that the tape trajectory subroutine can be called for the purpose of controlling the VTR speed. However, once the discontinuity shown in FIG. 21B is crossed, the CPU will find, upon entering the DTC processing subroutine, that the address in the DMA tape position register is greater than the address in the search address register, indicating that the tape should move in a reverse direction. The CPU will then determine whether the tape was traveling in a reverse direction the last time that the DTC processing subroutine was called. The CPU will do this by determining whether or not the forward flag is reset. In the example of FIGS. 21A and 21B, the forward flag will be set, not reset, indicating that the VTR was formerly moving in the forward direction. Thus, at this point, the CPU will reset the forward flag and will determine whether or not the DTC occurred flag is set. Since a time code discontinuity will have occurred at this point in the example of FIG. 21B and the DTC occurred flag will have been set by the DTC interrupt subroutine shown in FIG. 17, the CPU will then determine whether the value contained within the control block time code register is within the preroll distance from the address in the preroll address register. It should be noted that in the situation presently being considered, when a determination has been made that the calculated preroll address is imaginary at a time when the tape has been moving toward that calculated preroll address in a forward direction, it is the control block time code register address which is tested to see whether it is within the preroll distance from the preroll address value. This is to be distinguished from the testing of the control block tape position register address when an imaginary calculated preroll address is detected with the tape moving toward that preroll address in the reverse direction, as discussed above. The foregoing issues from the fact that, when determining whether or not the address of a selected in-point is real or not, that is, whether or not it is lost within the time code discontinuity which has been detected, one seeks to determine whether the time code address at the side of the time code discontinuity which is nearer the end of the tape, and thus which should have the greater time code value, is within the preroll distance of the preroll address. If it is not, the in-point is imaginary and is lost within the gap occasioned by the detected time code discontinuity. When searching in the forward direction, it is the value in the control block time code register which reflects the address at the side of the discontinuity nearer the end of the tape, whereas, when a search is being conducted in the reverse direction it is the value contained within the control block tape position register which is counted relative to the time code at the side of the discontinuity which is nearer the end of the tape.

If the CPU determines that a preroll address is imaginary while searching for that address in a forward direction and if the CPU also determines that the address contained within the control block time code register is not within the preroll distance of the preroll address from which it follows that the selected in-point also is imaginary, the CPU performs the same steps, as described above, as when a determination is made that a selected in-point is imaginary while searching for a calculated preroll address in the reverse direction.

If, however, the CPU finds that the address contained within the control block time code register is within the preroll distance of the preroll address, indicating that the in-point does not lie within the same time code discontinuity as the calculated preroll address, the CPU calculates the value of $\Delta$ by subtracting a value in the control block tape position register from the value in the control block time code register. It should be noted that this is just the opposite of the subtraction operation which is performed when the calculated preroll address is found to lie within a discontinuity while searching for that preroll address in a reverse direction. This is because, as was just stated above, when a discontinuity is detected while the VTR is moving in a forward direction, the value in the control block time code register reflects the values which exist at the side of the discontinuity which is nearer the end of the tape and the value in the control block tape position register reflects the values which exist at the side of the discontinuity nearer the beginning of the tape. When such a discontinuity is detected while the VTR is moving in a reverse direction, just the opposite is true. Thus, whether the discontinuity shown in FIG. 21B is detected while searching for a calculated preroll point in the forward or reverse direction, the value of $\Delta$ will be identical. In the case of the discontinuity shown in FIG. 21B, $\Delta$ will have the value of ten seconds.

Upon determining that the calculated preroll address is imaginary while searching therefor in the forward direction, the calculation of the value of $\Delta$ is followed by the same steps as when a similar determination is made while searching in the reverse direction for a calculated preroll address which proves imaginary. In other words, the value in the preroll address register is set equal to the old value in the preroll address register minus the value of $\Delta$, the DTC expected flag is set, the time code/CTL board 142 or 144 is set in both the update and the compare modes, and the DTC processing subroutine is exited and a return is made to the preroll search subroutine, which then calls the trajectory subroutine for determining whether or not a change should be effected in the tape speed.

Thus, it can be seen that the DTC processing subroutine, described with reference to FIGS. 18 and 19, enables the video editing system 100 to arrive at a preroll point located shortly before a selected in-point even if one or more monotonic time code discontinuities are crossed during the search for that preroll point. The program just described can do this as long as the address of the in-point itself actually exists upon the tape. The preroll search program just discussed ignores time code discontinuities which do not affect the validity of a calculated preroll address. However, if a time code discontinuity is such that it prevents the calculated preroll address from existing, the DTC processing subroutine causes the value contained in the pre-roll address register to be changed in correspondence to the time code address shift caused by the discontinuity, so that a new preroll address having the proper distance from the selected in-point will be calculated and the tape will be moved thereto. The preroll address can be considered a function invoking address, since it is an address at which the editor 110 will cause a VTR to perform a specified function, in this case, the function of stopping briefly before starting a synchronization procedure in preparation for a video edit.

The circuitry shown on FIG. 5 is designed to prevent both the compare and update procedures at any time that the time code sensing circuit 286 indicates that time code values cannot reliably be read from a VTR. This has the advantage, when time codes cannot be reliably read from a tape, of causing the value contained within tape position buffer 292 to automatically become a counted tape position value relative either to the last time code address value which was placed in it by an update procedure during a period in which time code values could be read from the tape, or a value which has been placed in it by the CPU by means of CPU write circuit 404. During times that time code sensing circuit 286 indicates, by the absence of the time code ready signal which it otherwise supplies to AND gate 388, that time code addresses cannot be reliably read from the tape, compare circuitry 287 is disabled by the low output of AND gate 388 so as to prevent time code discontinuity interrupts from constantly being generated due to the inequality of the undefined values contained within time code transfer buffer 328 and the counted tape position address value contained within tape position buffer 292.

The circuitry of FIG. 5 has been shown to provide a time code discontinuity signal whenever the discontinuity is represented by a gap or interruption in the sequence of the time code addresses. If a tape travels from a region thereof on which time codes appear and can be read, to a region of the tape on which time codes do not appear or cannot be read from the tape, the circuitry of FIG. 5 will not generate a time code discontinuity signal. In order to indicate when such a discontinuity in the time codes exists, the circuitry on each of time code/CTL board 142 and 144 further includes an AND gate 406 (FIG. 10) and a gap detect flip-flop 408 (FIG. 11). More particularly, in order for the circuitry of time code/CTL board 142 or 144 to be able to detect time code discontinuities constituted by an absence of time codes, for example, upon movement from a section of tape upon which time code is recorded to a subsequent section of tape lacking time code, pin (1) of the NAND gate J4 do compare circuit 386 (FIG. 10) is connected through a jumpered connection $\overline{EE}$ to the output of AND gate 406, rather than to the output of AND gate 388 as previously described.

The inputs to AND gate 406 are similar to those supplied to AND gate 388 with the exception that AND gate 406 does not receive, as inputs, the output of time code ready flip-flop 318 or the output of OR gate 366. Instead of these two inputs, AND gate 406 receives a compare enable signal COMPE generated by the output of gap detect flip-flop 408. The flip-flop 408 has a set input which is the $\overline{TCRDY}$ pulse generated when time code sensing circuit 286 detects that a time code has been read with a high degree of reliability. The reset input to flip-flop 408 is the time code discontinuity interrupt signal INTRTC. Thus, the output of gap detect flip-flop 408, which is one of the inputs to AND gate 406, will remain high after time code sensing circuit 286 indicates that a time code has been read with a high degree of reliability until a subsequent time code discontinuity is detected.

It should be noted that even though AND gate 406 does not receive the output of OR gate 366, the simultaneous operation of compare and DMA procedures is prevented by an OR gate 409 shown in FIG. 10. This Or gate 409 resets the flip-flop J6 of do compare circuit 386 whenever the output of OR gate 366 indicates that a DMA procedure is taking place.

The operation of AND gate 406 and gap detect flip-flop 408 will now be described with reference to FIGS. 23A and 23B. FIG. 23A graphically represents the values within time code transfer buffer 328 upon the reading of a tape which contains a segment of twenty frames for which no time code addresses have been recorded. FIGS. 23A and 23B express time code addresses only with regard to the frames values thereof. In FIG. 23A, the segment in which no time code addresses are recorded starts at the address of 10 frames and ends at the address of 40 frames. FIG. 23B shows the time code addresses within time code buffer 292 during a reading of the section of tape containing the twenty frame gap in a forward direction.

As the tap in the VTR moves from the address of 00 frames and until the discontinuity at 10 frames is reached, the values in time code transfer buffer 328 and tape position bufffer 292 should be equal to each other. In this period, time code sensing circuit 286 will be emitting time code ready signals and compare circuitry 287 will not indicate any time code discontinuity, so that, gap detect flip-flop 408 will be set, and further so that, after tape position counter 282 has had a chance to count each $\overline{CTLP}$ pulse and the CTL and time code DMA procedures have been Performed, the output of AND gate 406 in conjunction with the output of compare enable arm flip-flop 344 will cause do compare circuit 386 to initiate a compare operation. However, as has just been stated, the values in time code transfer buffer 328 and tape position buffer 292 are substantially equal at this time and, therefore, no non-compare signals will be generated and an update procedure will take place after each compare operation.

Upon reaching the first frame contained within that portion of the tape for which no time codes have been recorded, the value contained within time code transfer buffer 328 will become undefined and a time code ready signal will not be generated. However, at this time, gap detect flip-flop 408 is still set because no interrupt signal INTRTC has yet been generated. Thus, after the counting of a CTL pulse and the performance of a CTL DMA procedure, the output of AND gate 406, in conjunction with the output of compare enable arm flip-flop 344, will cause do compare circuit 386 to initiate a compare procedure. Because the value in time code transfer buffer 328 is undefined at this time, such compare procedure will result in the generation of a non-compare signal from compare circuit 392. This non-compare signal is counted by count circuit 390 and it prevents update circuitry 283 from writing the undefined address value from time code transfer buffer 328 into tape position buffer 292. As a result, in the example of FIGS. 23A and 23B, the value in tape position buffer 292 at this time will be equal to 11 frames. As the VTR advances through each of the next nine frames shown on FIGS. 23A and 23B, the output of gap detect flip-flop 408 will remain high causing a compare procedure to take place after each $\overline{CTLP}$ pulse. Each of these compare procedures will result in a non-compare signal which is counted by count circuit 390 and which prevents update control circuitry 283 from performing an update. Upon reaching the tenth frame on the portion of tape which lacks time code addresses, ten non-compare signals will have been generated by compare circuit 392 and counted by count circuit 390. At this time, count circuit 390 will indicate the time code discontinuity by generating the time code interrupt signal INTRTC.

The interrupt signal INTRTC resets mode control latch 338 and, after CPU board 148 has responded to the signal INTRTC, that board will normally cause a new set of bits to be written into latch 338 which will enable the compare and update procedures. Besides resetting mode control latch 338, the signal INTRTC will also reset gap detect flip-flop 408 for causing the output of that flip-flop to go low indicating, if it is allowed to remain unset, that a gap in time codes has been detected on a portion of the tape. When the output of flip-flop 408 goes low, its connection to the input of AND gate 406 will prevent do compare circuit 386 from initiating a compare procedure. Thus, throughout the remainder of the time code gap shown between 10 and 40 seconds on FIG. 23A, gap detect flip-flop 408 prevents the time code/CTL board 142 or 144 from performing a compare procedure and from generating any further interrupt signals. It should be noted that, during the entire time code gap, the output of time code sensing circuit 286 prevents update procedures from taking place and thus causes the value in tape position buffer 292 to represent a counted time code address determined relative to the last time code which was placed in it by an update procedure before the time code gap.

Once the tape shown on FIG. 23A reaches the end of the time code gap, time code sensing circuit 286 once again generates a time code ready pulse. This ready pulse causes gap detect flip-flop 408 to be set again, thus allowing the output of AND gate 406 to go high after counting by tape position counter 282 of the $\overline{\text{CTLP}}$ pulse associated with the frame which ends the time code gap. At this time, the value in tape position buffer 292 has the value of 30 frames since, as was stated above, the actual length of the time code gap is assumed to be twenty seconds and the value contained within tape position buffer 292 is a counted address counted relative to the last value (10 frames) placed within that tape position buffer by the update procedure. If it is assumed, as shown on FIG. 23A, that the value of the time code read from the tape at the end of the time code gap is 40 frames rather than 30 frames, indicating that a time code shift of ten frames has taken place in addition to, or as a result of, the time code gap shown on FIG. 23A, the compare procedure which takes place at such time, results in the generation of a non-compare signal from compare circuit 392. This non-compare signal is counted by count circuit 390 and also prevents an update procedure from taking place so that the values in tape position buffer 292 continue to be counted time code address values determined relative to the time codes read before the time code gap of FIG. 23A was encountered. This process of comparing actual with counted time code addresses takes place for ten frames until the count within count circuit 390 attains a value of ten. At such time, a time code discontinuity is indicated by count circuit 390 and a time code interrupt signal INTRTC is generated. In response to such signal INTRTC, gap detect flip-flop 408 is set low, but it should be noted that this has no effect since flip-flop 408 is set again after time code ready pulse produced by time code sensing circuit 286 upon reading of the next time code. Upon generation of signal INTRTC, mode control latch 338 is reset to cause the compare signal generated at the third-bit output of latch 338 to go low. However, after the interrupt is detected by the CPU, the latter causes a new set of bits to be written into mode control latch 338 so as to enable both the compare and the update procedures. Once this has been done, the reading of the next frame which has a time code address of 51 frames (FIG. 23A), will result in an updating of the value in tape position buffer 292 from 41 to 51 frames (FIG. 23B) so that the value in buffer 292 will equal the value in time code transfer buffer 328 and generation of a further discontinuity signal will be prevented.

Thus, it can be seen that gap detect flip-flop 408 and AND circuit 406 provide means for allowing time code discontinuity signals to be generated at the boundaries of a gap in which time code ready signals are not generated while preventing the generation of such discontinuity signals between such boundaries.

The circuitry of each of the time code/CTL boards 142 and 144 also contains a CODE/$\overline{\text{CODE}}$ circuit 410 which is disclosed in detail on FIG. 11. This circuit comprises two flip-flops K5 and D7, and it provides a CODE signal from the Q output of flip-flop D7 during periods in which time code sensing circuit 286 indicates that such time codes cannot be read. As is shown on FIG. 12, the latch A5 contained within user bit latch 34 has its eighth data bit input connected to receive the $\overline{\text{CODE}}$ signal. As can also be seen from FIG. 12, the seventh data bit input to latch A5 of user bit latch 334 is connected to receive the $\overline{\text{FWD/REV TC}}$ signal generated by time code sync word detecting circuit 314 (FIG. 9). As is described above, CPU board 148 has the ability to read the values contained in user bit latch 334 by generating a low signal on the $\overline{\text{I/O R}_3}$ line and then by reading the value on the system data bus which is connected to the output of user bit latch 334.

Figure 24:
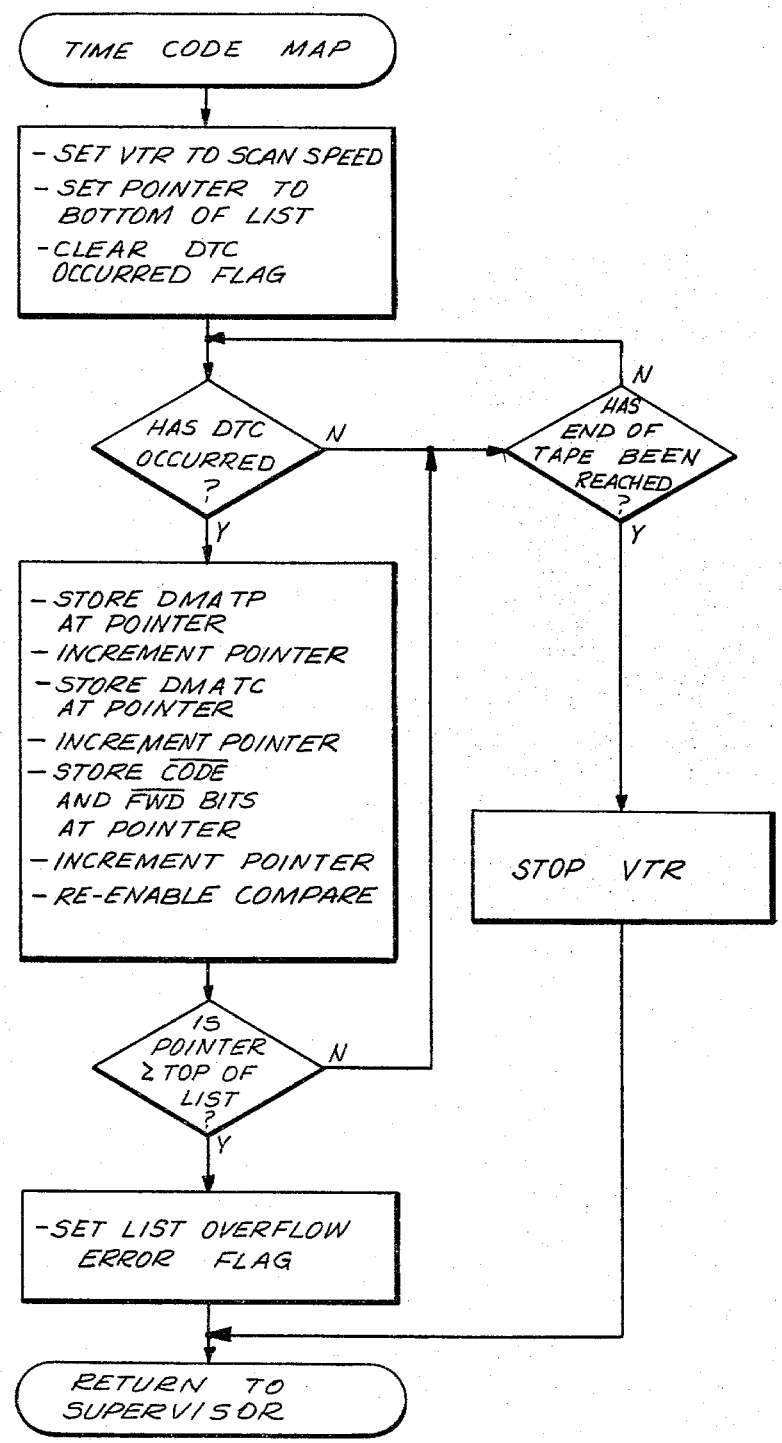
FIG. 24 is a flow chart outlining steps taken by the CPU board of FIG. 3 in making a map of the time code addresses recorded on a video tape.

From the preceding discussion, it is apparent that the circuitry contained within the video editing system 100 has the capability not only to detect time code discontinuities, but also to determine the time code addresses on both sides of each such disontinuity, to calculate the time code address shift caused by such a discontinuity, and to determine whehter such a discontinuity results from a transition from a portion of tape containing time code to one on which no time code is recorded, by having a CPU read the $\overline{\text{CODE}}$ bit contained within the 8th bit of user bit latch 334 once a time code discontinuity interrupt signal INTRTC has been generated. Further, by reading the 7th bit of user bit latch 334 at such time, it can be determined whether the tape was moving in a forward or reverse direction at the time that the discontinuity was detected. Because the circuitry contained within the video editing system 100 has the capability to perform all of the foregoing functions, it can be used to create a time code map of any portion, or of all of a video tape. FIG. 24 illustrates the steps of a subroutine which can be followed by CPU board 148 in order to perform the task of mapping the time codes upon an entire tape. This subroutine requires that CPU memory board 150 has sufficient space or capacity for a predetermined number of discontinuity records, each of which adequately defines the respective discontinuity. For example, CPU memory board 150 may contain space for fifty such discontinuity records at a location called a discontinuity list and, within each discontinuity record, may include a 4-byte tape position register. Since a decimal digit can be represented by 4 bits, it is possible to represent two decimal digits within each 8-bit byte. Therefore, a 4-byte register is sufficient to store a complete 8 digit time code address. Each discontinuity record may also include a 4-byte time code register for storing the value in the time code transfer buffer at a time when a time code discontinuity interrupt is generated. Each of the discontinuity records may further include a byte in which flags can be stored. Among such flags are the $\overline{\text{CODE}}$ and $\overline{\text{FWD}}$ bits from the 8th and 7th output bits, respectively, of user bit latch 334. The CPU memory board 150 should also contain space to store a memory pointer variable and a list overflow error flag, both of which will be described below.

When it is desired to map a tape according to the flow chart of FIG. 24, that tape should be placed in a VTR and instructions should be given to the video editor 110 so that the time code mapping subroutine of FIG. 24 will be called with reference to that VTR. When the time code mapping subroutine of FIG. 24 is called, it sets the tape in the associated VTR to a shuttle speed which is considerably higher than normal play speed, but which is sufficiently low so that CPU board 148 will have time to respond to each time code interrupt signal INTRTC which is generated before the reading of a subsequent frame. At this time, the value of the pointer variable is set to the address of the first memory location contained within the discontinuity list on memory board 150, and the DTC occurred flag is cleared. Then, the CPU performs the task of repeatedly reading the DTC occurred flag to determine if a time code interrupt signal has been generated and the DTC occurred flag has been set by the subroutine described with reference to FIG. 17. If no time code discontinuity has occurred, the CPU will continually repeat the process of checking the DTC occurred flag until the end of the tape has been reached. However, if a DTC occurred flag has been set, the CPU will store the value of the DMA tape position register at the current address of the pointer. The CPU will then increment the pointer to the address following the tape position register contained within the current discontinuity record, and then it will store the value contained within the DMA time code register at the new pointer value. Once that is done, the CPU will increment the value of the pointer to the address of the byte which is used to store the $\overline{\text{CODE}}$ and the $\overline{\text{FWD}}$ bis from time code user latch 334, and the CPU will read the value contained within latch 334 and will store such value at the current pointer address. The pointer will now be incremented to the address following the byte containing the $\overline{\text{CODE}}$ and the $\overline{\text{FWD}}$ flags, so that the next time that a DTC occurred flag is detected, the pointer will be located at the address of the subsequent discontinuity record within the discontinuity list contained in memory board 150. Then the CPU re-enables compare circuitry 287 on the appropriate time code/CTL board 142 or 144 by writing a new set of bits into latch 338.

Once the above has been done, the CPU determines whether the new address of the pointer is greater than the highest allowable address within the discontinuity list. If the new pointer address is higher than the top of the discontinuity list, the CPU sets a list overflow error flag and returns to a supervisor, which is a program indicating that an error has taken place. If the value of the pointer is not greater than the highest allowable address of the discontinuity list, the CPU checks to determine whether or not the end of the tape has been reached. If the tape end has not been reached, then the CPU returns to the process of checking to see if the DTC flag has again been set.

The CPU continues to repeat the process of responding to DTC occurred flags by storing tape position and time code values along with the $\overline{\text{CODE}}$ and $\overline{\text{FWD}}$ bits for each of the time code discontinuities that may be detected, until either a list overflow is generated for indicating that more than fifty discontinuities have been detected, or until the end of the tape has been reached. Once the end of the tape has been reached, the CPU will issue commands through VTR interface board 116 or 126 to stop the motion of the respective VTR and then the CPU will return to the supervisor program, which enables an operator to decide the function to be performed by the video editing system 100.

After a video tape, or a section thereof, has had its time codes mapped, it is possible for CPU board 148 to handle non-monotonic time code discontinuities as well as time code discontinuities constituted by gaps without recorded time code. With such a time code map, the CPU can determine which, if any, time code addresses occur at more than one location upon a mapped video tape. Thus, for example, if an operator commands the tape in a VTR to go to a time code address which exists at more than one location upon the tape, the CPU could generate signals indicating the number and relative positions of the occurrences of that time code address upon the mapped video tape, and thus allow the operator to determine which of the occurrences of that particular address is the one which he desires. In addition, after such a mapping procedure, the CPU can determine the relative positions of time code addresses upon a tape, even though such time code addresses may occur in a non-monotonic order such that, in the absence of mapping, the time code address of a particular frame would not be sufficient to indicate either its order, or position, upon the tape.

Furthermore, in conjunction with such mapping of a video tape, the CPU board 150 could be used to assign address values to video frames for which no time code addresses have been recorded. This can be done by causing each frame on a tape portion from which time codes are missing to have an address value one greater than the time code address of the preceding frame, while the first frame within such a time code gap is given an address value one greater than the time code address recorded on the tape immediately before the gap. It should be noted that these address values are the time code address values which will normally be contained within tape position buffer 292 when such a time code gap is encountered while a tape is traveling in a forward direction. However, when a time code gap is encountered while a tape is traveling in a reverse direction, the values contained within tape position buffer 292 would normally be counted with regard to the time code values recorded at the end of the time code gap which is nearest the end as distinguished from the beginning, of the tape. Unless steps are taken to remedy this situation, this could result in the frames within a time code gap being assigned two different time code addresses, namely, those resulting when the gap is encountered while the tape is moving in a forward direction, and those resulting when the gap is encountered while the tape is moving in a reverse direction. In order to prevent such duplication of time code addresses assigned during time code gaps, CPU board 150 has the capability, as described above, by employing CPU write circuit 404, to place a desired time code address into tape position buffer 292. Thus, once a tape has been mapped and a time code gap is encountered while moving in the reverse direction, the CPU can read the resulting discontinuity list on memory board 150, and determine therefrom the appropriate address value to be written into tape position buffer 292, so that the time code addresses which it assigns to video frames within the time code gap while traveling in the reverse direction correspond to the time code addresses which the tape position buffer 292 will assign to those video frames while traveling in a forward direction.

Although FIGS. 1 and 2A show a video tape provided with so-called longitudinal time code addresses recorded thereon for use in the system 100 according to this invention, it will be appreciated that the invention may be similarly applied to an editing system for use with video tapes provided with vertical interval time codes recorded initially, for example, in portions of the skewed video information record tracks corresponding to the blocking periods.

Having described a specific preferred embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. An apparatus for detecting discontinuities in a sequence of time code addresses recorded on a tape driven by tape drive means, for identifying corresponding information signals which are recorded on said tape along with a series of control pulses recorded in a control track extending lengthwise of the tape for the purpose of synchronizing the motion of said tape relative to transducer means for reading said information signals, said apparatus comprising:
    time code reading means for reading a current time code address on said tape;
    control pulse reading means for reading control pulses which are read as said tape moves in its lengthwise direction;
    counting means for counting said control pulses read by said control pulse reading means and thereby providing a count of said control pulses;
    setting means for establishing a predetermined relationship between said current time code address read by said time code reading means and said count, so that said count represents said current time code address at the time said predetermined relationship is established and so that said count thereafter represents a counted tape address; and
    comparing means for comparing said current time code address with said counted tape address and for producing a non-compare signal in the event of a difference therebetween.

2. An apparatus according to claim 1; wherein said setting means includes means operative for changing said count of the counting means to the value of the then current time code address.

3. An apparatus according to claim 1; further comprising means for repeatedly operating said comparing means; and wherein said comparing means includes means for producing a time code discontinuity signal in response to the production of a predetermined number of the non-compare signals.

4. An apparatus according to claim 3; wherein said comparing means performs a comparison each time one of a plurality of recorded current time code addresses is read by said time code reading means and produces a respective non-compare signal each time said compared current time code address has said difference from said counted tape address, and said means for producing said time code discontinuity signal is operative to produce said time code discontinuity signal when a predetermined number of successive comparisons result in said non-compare signals.

5. An apparatus according to claim 3; wherein said means for producing a time code discontinuity signal produces said time code discontinuity signal only in the event that said current time code address differs from said counted tape address by a predetermined amount greater than one count of said counting means.

6. An apparatus according to claim 3; further comprising means for subtracting one of said current time code address and said counted tape address from the other in response to the generation of said time code discontinuity signal so as to derive a time code address shift value which varies as a function of the difference between said current time code and counted tape addresses.

7. An apparatus according to claim 6; further including memory means for storing a function invoking time code address, and means for altering said function invoking time code address stored in said memory means in correspondence to said time code address shift value.

8. An apparatus according to claim 3; further comprising control means for controlling said tape drive means, said control means including memory means and control circuitry;
    means for storing said current time code address in said memory means;
    means for storing the count provided by said counting means in said memory means; and
    means for supplying said time code discontinuity signal to said control means.

9. An apparatus according to claim 8; further including means for causing said control means to supply a value to said counting means.

10. An apparatus according to claim 8; wherein said control circuitry includes programmable computing means.

11. An apparatus according to claim 10; wherein said means for supplying said time code discontinuity signal to said control means includes means for applying said time code discontinuity signal as an interrupt signal to said programmable computing means.

12. An apparatus according to claim 8; further including time code sensing means for generating a time code available signal when said time code reading means can read a time code address from said tape, and means for enabling said control means to determine whether said time code available signal was generated in conjunction with the generation of said time code discontinuity signal.

13. An apparatus according to claim 3, further comprising storage means for storing said current time code address and said counted tape address in response to the generation of said time code discontinuity signal.

14. An apparatus according to claim 13; wherein said storage means has a capacity for storing said current time code address and a respective paired counted tape address for each of a plurality of times that said time code discontinuity signal is generated; and further comprising means for storing the relative order of the positions along said tape of the paired current time code and counted tape addresses which have been stored in said storage means.

15. An apparatus according to claim 3; further comprising time code sensing means for generating a time code available signal when said time code reading means can read a time code address from said tape.

16. An apparatus according to claim 15; further comprising means for preventing the generation of a second said time code discontinuity signal after the generation of a first said time code discontinuity signal until a time code available signal has been generated after the generation of said first time code discontinuity signal.

17. An apparatus according to claim 15; further comprising means operative, in the presence of said time code available signal after the generation of said time code discontinuity signal, for causing said setting means to re-establish said predetermined relationship between said current time code address and said count; and means for preventing said setting means from re-establishing said predetermined relationship after the generation of said time code discontinuity signal in the absence of said time code available signal.

18. An apparatus according to claim 1; wherein said counting means includes means for incrementing its count in response to control pulses read by said control pulse reading means when said tape is moved in a first direction and for decrementing its count in response to control pulses read by said control pulse reading means when said tape is moved in a second direction.

19. An apparatus according to claim 1;
wherein said counting means alters said count by one in response to the reading by said control pulse reading means of a specified number of control pulses.

20. An apparatus according to claim 19; wherein said setting means includes means for storing said current time code address in said counting means as said count.

21. A method for detecting discontinuities in a sequence of time code addresses recorded on a tape for identifying corresponding information signals which are recorded on said tape along with a series of control pulses recorded in a control track along the length of said tape for the purpose of synchronizing the motion of said tape relative to transducer means which reads said information signals, said method comprising:
moving said tape;
reading a current time code address on said tape;
reading control pulses that pass a fixed point as said tape is moved;
counting said control pulses which are read and thereby providing a count of said control pulses;
establishing a predetermined relationship between said current time code address and said count so that said count represents said current time code address at the time said known relationship is established, and thereafter represents a counted tape address; and
comparing said current time code address with said counted tape address and producing a non-compare signal in the event of a difference therebetween.

22. A method according to claim 21; wherein said establishing of the predetermined relationship includes changing said count to the value of the then current time code address.

23. A method according to claim 21; wherein said comparing is effected each time a current time code address is read and said non-compare signal is produced each time the compared current time code address differs from said counted tape address; and further comprising producing a time code discontinuity signal when a predetermined number of successive comparisons result in non-compare signals.

24. A method according to claim 21; wherein said counting includes incrementing said count in response to said reading of control pulses when said tape is moved in a first direction, and decrementing said count in response to said reading of control pulses when said tape is moved in a second direction.

25. A method according to claim 21; further comprising storing said current time code address and said counted tape address in response to the generation of a predetermined number of said non-compare signals.

26. A method according to claim 25; wherein said storing of a current time code address and a counted tape address which is paired therewith is effected for each of a plurality of times that said predetermined number of said non-compare signals is generated; and
further comprising storing the relative order of the positions along said tape for which the paired current time code and counted tape addresses are stored.

27. A method according to claim 21; further comprising subtracting one of said current time code address and said counted tape address from the other in response to generation of a predetermined number of said non-compare signals so as to derive a time code address shift value which varies as a function of the result of the difference between said current time code and counted tape addresses.

28. A method according to claim 27; further comprising storing a function invoking time code address, a function invoking signal when said current time code address attains a predetermined relationship to said function invoking time code address, and altering said stored function invoking time code address in correspondence to said time code address shift value.

29. A method according to claim 21; further comprising sensing whether a time code address can be read from said tape; generating a no-code signal when said tape has moved a specified distance without sensing that a time code address can be so read from tape; causing said step of establishing said predetermined relationship to occur when a predetermined number of said non-compare signals are generated in the absence of a no-code signal; and preventing said step of establishing said predetermined relationship from occurring when said predetermined number of non-compare signals are generated in conjunction with said no-code signal.

30. A method according to claim 21; wherein said information signals recorded on said tape constitute successive frames of a video signal and said time code addresses designate corresponding individual frames within said video signal in terms of a separate frame number for each individual frame.

31. A method according to claim 30; wherein a specified number of said control pulses are recorded on said tape in conjunction with each of said frames; and
wherein said counting alters said count by one in response to the reading of said specified number of control pulses.

32. A method according to claim 31; wherein each of said time code addresses designates the respective individual frame as a frame number having a specified format which includes digits respectively designating a number of frames, a number of seconds, and a number of minutes;

wherein each of said current time code addresses is read as a frame number having said specified format, and said counting includes storing said count as a frame number having said specified format.

33. A method according to claim 32; wherein said establishing of the predetermined relationship includes storing said current time code address as said count.

34. A method according to claim 33; wherein said frame numbers normally vary sequentially according to a frame counting sequence determining which of the possible frame designations that can be represented by all of the possible combinations of the values of said digits of said specified format are included in said frame counting sequence, and what the order of each such included possible combination is within said counting sequence; and causing said count to vary according to said frame counting sequence in response to the reading of said control pulses.

35. A method according to claim 1; wherein said comparing produces said non-compare signal only in the event of a difference between said current time code address and said counted tape address which exceeds a predetermined value.

* * * * *